(12) United States Patent
Liu et al.

(10) Patent No.: US 12,487,290 B2
(45) Date of Patent: Dec. 2, 2025

(54) CHARGING/DISCHARGING PROTECTION CIRCUIT, TERMINAL DEVICE, AND BATTERY DISCHARGING CONTROL METHOD

(71) Applicant: HONOR DEVICE CO., LTD., Guangdong (CN)

(72) Inventors: Xinyu Liu, Shenzhen (CN); Xialing Zhang, Shenzhen (CN)

(73) Assignee: Honor Device Co., Ltd., Shenzhen (CN)

( * ) Notice: Subject to any disclaimer, the term of this patent is extended or adjusted under 35 U.S.C. 154(b) by 739 days.

(21) Appl. No.: 17/629,109

(22) PCT Filed: Jul. 31, 2020

(86) PCT No.: PCT/CN2020/106094
§ 371 (c)(1),
(2) Date: Jan. 21, 2022

(87) PCT Pub. No.: WO2021/018272
PCT Pub. Date: Feb. 4, 2021

(65) Prior Publication Data
US 2022/0278535 A1    Sep. 1, 2022

(30) Foreign Application Priority Data
Jul. 31, 2019   (CN) .......................... 201910703892.4

(51) Int. Cl.
*G01R 31/374*   (2019.01)
*G01R 31/3842*  (2019.01)
(Continued)

(52) U.S. Cl.
CPC ....... *G01R 31/374* (2019.01); *G01R 31/3842* (2019.01); *H01M 10/443* (2013.01);
(Continued)

(58) Field of Classification Search
CPC ............. G01R 31/374; G01R 31/3842; H01M 10/443; H01M 10/48; H01M 10/486;
(Continued)

(56) References Cited

U.S. PATENT DOCUMENTS 4,849,681 A * 7/1989 Munnig Schmidt ......................... H02J 7/00711
320/133
6,414,465 B1 * 7/2002 Banks ................... H01M 10/48
320/160
(Continued)

FOREIGN PATENT DOCUMENTS

| CN | 1674350 A | 9/2005 |
|---|---|---|
| CN | 101764395 A | 6/2010 |

(Continued)

*Primary Examiner* — John T Trischler
(74) *Attorney, Agent, or Firm* — Leydig, Voit & Mayer, Ltd.

(57) ABSTRACT

The charging/discharging protection circuit comprises a power supply end, a grounding end, and an under-voltage protection threshold control end; the power supply end is connected to a positive electrode of a battery; the grounding end is connected to a negative electrode of the battery; the under-voltage protection threshold control end is configured to receive a first control signal. The charging/discharging protection circuit is configured to reduce an under-voltage protection threshold of the battery under the control of the first control signal when the temperature of the battery is smaller than a set temperature threshold and the discharging current of the battery is greater than a set current threshold.

15 Claims, 9 Drawing Sheets

S1001

Detect a discharging current of a battery 210 in a terminal device 200, and collect statistics on a quantity of charging/discharging cycles of the battery 210

S1002

Reduce an under-voltage protection threshold and a discharging cutoff voltage of the battery 210 when the quantity of charging/discharging cycles of the battery 210 is greater than a set quantity and the discharging current of the battery 210 is greater than a set current threshold

S1003

When the output voltage of the battery 210 is smaller than the discharging cutoff voltage of the battery 210, control the terminal device 200 to be powered off, and increase the under-voltage protection threshold of the battery 210 and the discharging cutoff voltage of the battery 210

(51) Int. Cl.
*H01M 10/44* (2006.01)
*H01M 10/48* (2006.01)
*H02J 7/00* (2006.01)
*H01M 10/42* (2006.01)

(52) U.S. Cl.
CPC ........ *H02J 7/0029* (2013.01); *H02J 7/00306* (2020.01); *H01M 2010/4271* (2013.01); *H01M 10/48* (2013.01); *H01M 10/486* (2013.01); *H02J 7/00304* (2020.01); *H02J 7/00309* (2020.01); *H02J 7/007194* (2020.01)

(58) Field of Classification Search
CPC ....... H01M 2010/4271; H01M 2200/10; H02J 7/0029; H02J 7/00306; H02J 7/00304; H02J 7/00309; H02J 7/007194; H02J 7/00712; Y02E 60/10
USPC ...................................................... 320/134
See application file for complete search history.

(56) References Cited

U.S. PATENT DOCUMENTS

| | | | | |
|---|---|---|---|---|
| 6,563,291 | B2* | 5/2003 | Tamura | H02J 7/00306 320/119 |
| 6,577,104 | B2* | 6/2003 | Sakakibara | H02J 7/0031 320/135 |
| 6,657,415 | B2* | 12/2003 | Saeki | H02J 7/00714 320/152 |
| 6,771,046 | B2* | 8/2004 | Ariga | H02J 7/0071 320/160 |
| 7,348,763 | B1 | 3/2008 | Reinhart et al. | |
| 7,495,416 | B2* | 2/2009 | Sato | H02J 7/342 320/136 |
| 7,508,171 | B2* | 3/2009 | Carrier | H02J 7/00304 320/135 |
| 7,514,905 | B2* | 4/2009 | Kawahara | H02J 7/0048 320/150 |
| 7,521,893 | B2 | 4/2009 | Tsuchiya et al. | |
| 7,570,021 | B2* | 8/2009 | Togashi | B60W 10/26 320/136 |
| 7,602,146 | B2* | 10/2009 | Carrier | H01M 10/486 320/120 |
| 7,629,770 | B2* | 12/2009 | Iida | B60L 58/25 320/135 |
| 7,880,438 | B1* | 2/2011 | Cohen | H02J 7/0048 320/132 |
| 7,990,109 | B2* | 8/2011 | White | H01M 50/574 320/136 |
| 8,004,239 | B2* | 8/2011 | Kawahara | H02J 7/007194 320/128 |
| 8,143,853 | B2* | 3/2012 | Jestin | H01M 10/4257 320/118 |
| 8,288,995 | B2* | 10/2012 | Jimbo | H02J 7/007182 320/147 |
| 8,305,040 | B2* | 11/2012 | Chen | H02J 7/00309 320/132 |
| 8,305,041 | B2* | 11/2012 | Takeda | H01M 10/486 320/134 |
| 8,324,865 | B1* | 12/2012 | Cohen | G01R 31/386 320/132 |
| 8,521,458 | B2* | 8/2013 | Nakanishi | G01R 31/396 320/152 |
| 8,872,451 | B2* | 10/2014 | Ikeda | H01M 10/486 318/34 |
| 8,891,210 | B2* | 11/2014 | Itou | H02P 27/06 320/132 |
| 8,988,045 | B2* | 3/2015 | Klein | H01M 10/448 320/155 |
| 9,018,922 | B2* | 4/2015 | Morita | H02J 7/00 320/167 |
| 9,041,358 | B2* | 5/2015 | Kato | H02J 7/00304 320/136 |
| 9,071,069 | B2* | 6/2015 | Brotto | H02J 7/00041 |
| 9,166,257 | B2* | 10/2015 | Brun-Buisson | H01M 10/44 |
| 9,413,088 | B2* | 8/2016 | Brotto | H02J 7/00041 |
| 9,438,050 | B2* | 9/2016 | Takeda | H02J 7/0031 |
| 9,653,931 | B2* | 5/2017 | Liu | H02J 7/00711 |
| 9,692,157 | B2* | 6/2017 | Brotto | H02J 7/00034 |
| 9,746,894 | B1* | 8/2017 | Rajagopalan | G06F 1/28 |
| 9,787,106 | B2* | 10/2017 | Maleki | H02J 7/0048 |
| 10,065,523 | B2* | 9/2018 | Wood | H02J 7/1423 |
| 10,211,659 | B2* | 2/2019 | Tian | H02J 7/00714 |
| 10,320,202 | B2* | 6/2019 | Le | H02J 7/1446 |
| 10,424,958 | B2* | 9/2019 | Tian | H01M 10/44 |
| 10,491,018 | B2* | 11/2019 | Lai | H02J 7/00 |
| 10,553,913 | B2* | 2/2020 | Kanomata | H02J 7/0049 |
| 10,601,083 | B2* | 3/2020 | Komiyama | H01M 10/448 |
| 10,608,442 | B1* | 3/2020 | Parmar | H02J 7/0014 |
| 10,668,825 | B2* | 6/2020 | Wood | B60L 50/40 |
| 10,742,058 | B2* | 8/2020 | Du | H02J 7/007194 |
| 10,782,354 | B2* | 9/2020 | Hsu | H02J 7/00309 |
| 10,886,766 | B2* | 1/2021 | Luo | H02J 7/007194 |
| 10,910,860 | B2* | 2/2021 | Fu | H01M 10/44 |
| 10,965,138 | B2* | 3/2021 | Du | H02J 7/00712 |
| 10,971,939 | B2* | 4/2021 | Parmar | H01M 10/441 |
| 11,063,306 | B2* | 7/2021 | Yebka | H02J 7/00716 |
| 11,063,447 | B2* | 7/2021 | Kim | H02J 7/0031 |
| 11,183,859 | B2* | 11/2021 | Kim | H02J 7/0029 |
| 11,190,026 | B2* | 11/2021 | Le | H02J 7/1423 |
| 11,213,178 | B2* | 1/2022 | Lee | A47L 9/2878 |
| 11,322,967 | B2* | 5/2022 | Komiyama | H01M 10/486 |
| 11,381,094 | B2* | 7/2022 | Park | H02J 7/0048 |
| 11,437,838 | B2* | 9/2022 | Du | H02J 7/0048 |
| 11,476,695 | B2* | 10/2022 | Jeong | H02J 7/007194 |
| 11,569,541 | B2* | 1/2023 | Osborne | H01M 50/211 |
| 11,837,690 | B2* | 12/2023 | Osborne | H01M 50/516 |
| 11,863,009 | B2* | 1/2024 | Matsumura | H02J 7/007182 |
| 11,888,340 | B2* | 1/2024 | Nagabhushanrao | H02J 7/0047 |
| 12,046,724 | B2* | 7/2024 | Zheng | H02J 7/00302 |
| 12,276,704 | B2* | 4/2025 | Lee | H01M 10/42 |
| 12,342,761 | B2* | 7/2025 | Liu | A01D 34/78 |
| 2002/0097022 | A1* | 7/2002 | Saeki | H02J 7/007182 320/125 |
| 2002/0149346 | A1* | 10/2002 | Sakakibara | H02J 7/0031 320/162 |
| 2003/0015995 | A1* | 1/2003 | Tamura | H02J 7/0014 320/162 |
| 2003/0044689 | A1* | 3/2003 | Miyazaki | B60L 58/19 320/134 |
| 2003/0169017 | A1* | 9/2003 | Ariga | H02J 7/007182 320/125 |
| 2005/0077878 | A1 | 4/2005 | Carrier et al. | |
| 2005/0127879 | A1 | 6/2005 | Sato et al. | |
| 2005/0206348 | A1* | 9/2005 | Tsuchiya | H02J 7/007184 320/156 |
| 2007/0075686 | A1* | 4/2007 | Togashi | B60L 58/12 320/130 |
| 2007/0126404 | A1* | 6/2007 | Iida | B60L 58/21 320/136 |
| 2007/0145954 | A1* | 6/2007 | Kawahara | B60L 58/25 320/150 |
| 2008/0180059 | A1* | 7/2008 | Carrier | H02J 7/00304 320/112 |
| 2008/0309289 | A1* | 12/2008 | White | H02J 7/0063 320/136 |
| 2009/0146614 | A1* | 6/2009 | Carrier | H01M 50/583 320/152 |
| 2009/0160405 | A1* | 6/2009 | Takeda | H02J 7/0031 320/152 |
| 2009/0174369 | A1* | 7/2009 | Kawahara | H02J 7/0013 320/150 |
| 2010/0023285 | A1* | 1/2010 | Nakanishi | G01R 31/3835 702/179 |
| 2010/0090648 | A1* | 4/2010 | Jestin | H01M 10/4257 180/65.29 |
| 2010/0327810 | A1* | 12/2010 | Jimbo | H02J 7/0071 320/126 |
| 2011/0169459 | A1* | 7/2011 | Chen | H02J 7/0069 320/160 |

(56) References Cited

U.S. PATENT DOCUMENTS

| | | | |
|---|---|---|---|
| 2011/0248653 A1* | 10/2011 | Brotto | H01R 13/112 318/139 |
| 2012/0098470 A1* | 4/2012 | Itou | H02P 29/0241 307/9.1 |
| 2012/0181992 A1* | 7/2012 | Brun-Buisson | G06F 9/02 320/153 |
| 2012/0212184 A1* | 8/2012 | Klein | H02J 7/007194 320/134 |
| 2013/0026997 A1* | 1/2013 | Takeda | H01M 10/46 320/134 |
| 2013/0038253 A1* | 2/2013 | Ikeda | G01R 19/16542 318/139 |
| 2013/0154571 A1* | 6/2013 | Hou | H02J 7/0063 320/136 |
| 2013/0154579 A1* | 6/2013 | Morita | H02J 7/00308 320/166 |
| 2013/0257379 A1* | 10/2013 | Kato | H02J 7/00304 327/564 |
| 2014/0077769 A1* | 3/2014 | Maleki | H02J 7/0014 320/136 |
| 2015/0137715 A1* | 5/2015 | Brotto | H02J 7/0019 318/139 |
| 2015/0162772 A1* | 6/2015 | Peterson | H01M 4/40 320/135 |
| 2015/0236530 A1* | 8/2015 | Kato | G01R 31/388 320/137 |
| 2015/0380697 A1* | 12/2015 | Osborne | H01M 50/502 429/153 |
| 2016/0089992 A1* | 3/2016 | Le | H02J 7/00032 320/109 |
| 2016/0095488 A1* | 4/2016 | Lee | A47L 9/2831 15/319 |
| 2016/0149423 A1* | 5/2016 | Liu | H02J 7/00714 320/134 |
| 2016/0243960 A1 | 8/2016 | Wood | H02J 7/345 |
| 2016/0315489 A1* | 10/2016 | Brotto | G01R 31/374 |
| 2016/0344219 A1* | 11/2016 | Lee | H02J 7/0069 |
| 2016/0359347 A1* | 12/2016 | Huang | H02J 7/007 |
| 2017/0025865 A1* | 1/2017 | Imazaki | H01M 10/399 |
| 2017/0271903 A1* | 9/2017 | Tian | H02J 7/007182 |
| 2017/0352926 A1* | 12/2017 | Kanomata | H01M 10/44 |
| 2018/0048171 A1* | 2/2018 | Lai | H02J 7/0068 |
| 2018/0205236 A1* | 7/2018 | Fu | H02J 7/00712 |
| 2018/0316206 A1* | 11/2018 | Luo | H01M 10/0525 |
| 2018/0358661 A1* | 12/2018 | Yebka | H01M 10/44 |
| 2019/0023148 A1* | 1/2019 | Komiyama | H02J 7/0048 |
| 2019/0097432 A1* | 3/2019 | Du | H02J 7/0071 |
| 2019/0123570 A1* | 4/2019 | Tian | H02J 7/00712 |
| 2019/0176650 A1* | 6/2019 | Wood | B60L 50/40 |
| 2019/0181659 A1* | 6/2019 | Kim | H02J 7/00306 |
| 2019/0198940 A1* | 6/2019 | Komiyama | H01M 10/448 |
| 2019/0296561 A1* | 9/2019 | Le | H02J 7/00047 |
| 2019/0305574 A1* | 10/2019 | Matsumura | H02J 7/007184 |
| 2020/0099232 A1* | 3/2020 | Parmar | H01M 10/425 |
| 2020/0116796 A1* | 4/2020 | Hsu | H02J 7/00309 |
| 2020/0127483 A1* | 4/2020 | Kim | H02J 7/0029 |
| 2020/0185932 A1* | 6/2020 | Parmar | H02J 7/007184 |
| 2020/0185950 A1* | 6/2020 | Jeong | H02J 7/00714 |
| 2020/0244075 A1* | 7/2020 | Park | H01M 10/425 |
| 2020/0335984 A1* | 10/2020 | Du | H01M 4/525 |
| 2022/0045394 A1* | 2/2022 | Osborne | H01M 10/482 |
| 2022/0123578 A1* | 4/2022 | Du | H02J 7/007188 |
| 2022/0149447 A1* | 5/2022 | Zheng | H02J 7/00302 |
| 2022/0181889 A1* | 6/2022 | Choi | H01M 10/425 |
| 2022/0181897 A1* | 6/2022 | Nagabhushanrao | H02J 7/0047 |
| 2022/0344733 A1* | 10/2022 | Zhou | H01M 10/44 |
| 2023/0225252 A1* | 7/2023 | Liu | A01D 34/78 56/11.9 |
| 2023/0261272 A1* | 8/2023 | Osborne | H01M 10/482 429/153 |
| 2023/0261273 A1* | 8/2023 | Osborne | H01M 50/209 429/153 |
| 2023/0266402 A1* | 8/2023 | Lee | H01M 10/052 324/434 |
| 2023/0314516 A1* | 10/2023 | Lee | H02J 7/0048 320/132 |
| 2024/0006907 A1* | 1/2024 | Jeong | H02J 7/0048 |
| 2024/0120761 A1* | 4/2024 | Nagabhushanrao | H02J 7/007194 |
| 2024/0134540 A1* | 4/2024 | Huang | G06F 3/0625 |
| 2024/0204735 A1* | 6/2024 | Zhang | H04R 3/00 |
| 2024/0388109 A1* | 11/2024 | Cao | H02J 7/007182 |
| 2025/0183388 A1* | 6/2025 | Cui | H01M 10/44 |

FOREIGN PATENT DOCUMENTS

| | | |
|---|---|---|
| CN | 103035969 A | 4/2013 |
| CN | 105742738 A | 7/2016 |
| CN | 106299513 A | 1/2017 |
| CN | 108511827 A | 9/2018 |
| EP | 2565661 A1 | 3/2013 |

* cited by examiner

CHARGING/DISCHARGING PROTECTION CIRCUIT, TERMINAL DEVICE, AND BATTERY DISCHARGING CONTROL METHOD

CROSS-REFERENCE TO RELATED APPLICATIONS

This application is a national stage of International Application No. PCT/CN2020/106094, filed on Jul. 31, 2020, which claims priority of Chinese Patent Application No. 201910703892.4, filed with the China National Intellectual Property Administration on Jul. 31, 2019. Both of them are hereby incorporated by reference in its entirety.

TECHNICAL FIELD

This application relates to the field of battery management technologies, and in particular, to a charging/discharging protection circuit, a terminal device, and a battery discharging control method.

BACKGROUND

A battery is stable and reliable in performance, and may stably supply power in a long time. Moreover, the battery is simple in structure and simple and convenient in charging/discharging operation, and is widely applied to various portable terminal devices such as mobile phones, tablet computers, cameras, and notebook computers. During discharging, an output voltage of a battery is gradually reduced, and when the output voltage of the battery is smaller than a specific threshold, the battery is damaged, or even a safety problem such as explosion or fire breakout occurs. To ensure the service safety and the service life of the battery, the battery is usually connected to a charging/discharging protection circuit during actual application, the charging/discharging protection circuit usually has an under-voltage protection (over-discharging protection) function, and when the output voltage of the battery is smaller than a set under-voltage protection threshold, a discharging loop of the battery is switched off.

The under-voltage protection function of the charging/discharging protection circuit connected to the battery may fail. Therefore, to further improve the safety and the service life of the battery, a discharging cutoff voltage is further set in a terminal device. When the output voltage of the battery is smaller than the discharging cutoff voltage, a power consumption load connected to the battery is disconnected, where the discharging cutoff voltage is greater than the under-voltage protection threshold.

However, currently, the under-voltage protection threshold and the discharging cutoff voltage of the battery are both set according to the performance of the battery at the normal temperature. Compared with the electric quantity of the battery remaining when the battery changes from the output voltage to the discharging cutoff voltage at the normal temperature, when the battery works in a low temperature environment and the output voltage of the battery reaches the discharging cutoff voltage of the battery that is set at the normal temperature, the battery further has a more electric quantity, but the power consumption load connected to the battery cannot continue to obtain electric energy from the battery. As a result, the electric quantity of the battery cannot be effectively utilized.

SUMMARY

This application provides a charging/discharging protection circuit, a terminal device, and a battery discharging control method, for use in solving the problem that the electric quantity of a battery cannot be effectively utilized in a low temperature environment.

According to a first aspect, this application provides a charging/discharging protection circuit. The charging/discharging protection circuit includes a power supply end, a grounding end, and an under-voltage protection threshold control end; the power supply end is connected to a positive electrode of a battery; the grounding end is connected to a negative electrode of the battery; and the under-voltage protection threshold control end is configured to receive a first control signal. The charging/discharging protection circuit is configured to reduce an under-voltage protection threshold of the battery under the control of the first control signal when the temperature of the battery is smaller than a set temperature threshold and the discharging current of the battery is greater than a set current threshold.

Through the foregoing solution, when the temperature of the battery is smaller than the set temperature threshold and the discharging current of the battery is greater than the set current threshold, the charging/discharging protection circuit reduces the under-voltage protection threshold of the battery, to enable the battery to continue to discharge, until the output voltage of the battery is smaller than the reduced under-voltage protection threshold; and therefore, before the under-voltage protection threshold of the battery is adjusted, the electric quantity in the battery that cannot continue to be used because of the low temperature can be released and utilized by a power consumption load connected to the charging/discharging protection circuit.

In a possible implementation, the under-voltage protection threshold control end is further configured to receive a second control signal; and the charging/discharging protection circuit is further configured to increase the under-voltage protection threshold of the battery under the control of the second control signal when an output voltage of the battery is smaller than a discharging cutoff voltage of the battery.

When the output voltage of the battery is smaller than the discharging cutoff voltage of the battery, the power consumption load connected to the charging/discharging protection circuit cannot work, but the battery still continues to discharge. Therefore, when the output voltage of the battery is smaller than the discharging cutoff voltage of the battery, the under-voltage protection threshold of the battery is increased to prevent the battery from being damaged, thereby ensuring the service life and the service safety of the battery. If the under-voltage protection threshold of the battery is not increased, the battery may be damaged in a scenario where the battery cannot be charged in time.

In a possible implementation, the charging/discharging protection circuit further includes a discharging control end, where the discharging control end is configured to output a third control signal. The charging/discharging protection circuit is further configured to: compare the output voltage of the battery and the under-voltage protection threshold of the battery and output the third control signal according to a comparison result, where the third control signal is used for controlling a discharging loop of the battery to be switched on or switched off. When the output voltage of the battery is greater than the under-voltage protection threshold of the battery, the third control signal is used for controlling the discharging loop of the battery to be switched on; and when the output voltage of the battery is smaller than the under-voltage protection threshold of the battery, the third control signal is used for controlling the discharging loop of the battery to be switched off, to perform under-voltage protection.

In a possible implementation, the charging/discharging protection circuit includes a battery voltage sampling circuit, a reference voltage circuit, and a comparator, where the battery sampling circuit is connected to each of the power supply end, the grounding end, the under-voltage protection threshold control end, and a first input end of the comparator, the reference voltage circuit is connected to a second input end of the comparator, and an output end of the comparator is connected to the discharging control end. The battery voltage sampling circuit is configured to sample the output voltage of the battery and increase a sampling voltage under the control of the first control signal; an output voltage of the reference voltage circuit is used for representing the under-voltage protection threshold of the battery; and the comparator is configured to compare the output voltage of the reference voltage circuit and the increased sampling voltage and output the third control signal according to a comparison result.

In a possible implementation, the battery voltage sampling circuit includes a first voltage divider resistor, a second voltage divider resistor, and a switch resistor array, the switch resistor array includes a plurality of branches connected to each other in parallel, and each branch includes a third voltage divider resistor and a switch connected to the third voltage divider resistor in series. A first end of the first voltage divider resistor is connected to each of the power supply end and a first end of the switch resistor array, a second end of the first voltage divider resistor is connected to each of a first end of the second voltage divider resistor, a second end of the switch resistor array, and the first input end of the comparator, control ends of switches in the switch resistor array are connected to the under-voltage protection threshold control end, and a second end of the second voltage divider resistor is connected to the grounding end; and the first control signal is used for controlling at least one switch in the switch resistor array to switch from a switched-off state to a switched-on state.

In a possible implementation, the reference voltage circuit is a voltage source.

In a possible implementation, the charging/discharging protection circuit includes a battery voltage sampling circuit, a reference voltage circuit, and a comparator, where the battery sampling circuit is connected to each of the power supply end, the grounding end, and a first input end of the comparator, and the reference voltage circuit is connected to each of a second input end of the comparator and the under-voltage protection threshold control end. The battery voltage sampling circuit is configured to sample the output voltage of the battery; the reference voltage circuit is configured to reduce an output voltage of the reference voltage circuit under the control of the first control signal, where the output voltage of the reference voltage circuit is used for representing the under-voltage protection threshold of the battery; and the comparator is configured to compare an output voltage of the battery voltage sampling circuit and the output voltage of the reference voltage circuit and output the third control signal according to a comparison result.

In a possible implementation, the battery voltage sampling circuit includes a first sampling resistor and a second sampling resistor, where a first end of the first voltage divider resistor is connected to the power supply end, a second end of the first voltage divider resistor is connected to each of a first end of the second voltage divider resistor and the first input end of the comparator, and a second end of the second voltage divider resistor is connected to the grounding end.

In a possible implementation, the reference voltage circuit includes a plurality of branches connected to each other in parallel, and each branch includes a voltage source and a switch connected to the voltage source in series. A first end of the reference voltage circuit is grounded, a second end of the reference voltage circuit is connected to the second input end of the comparator, and control ends of the switches in the reference voltage circuit are connected to the under-voltage protection threshold control end; and the first control signal is used for controlling a first switch in the reference voltage circuit to switch from a switched-on state to a switched-off state and controlling a second switch in the reference voltage circuit to switch from a switched-off state to a switched-on state, and a voltage of a voltage source connected to the first switch in series is greater than a voltage of a voltage source connected to the second switch in series.

According to a second aspect, this application provides a terminal device. The terminal device includes a processor and a charging/discharging protection circuit, where the charging/discharging protection circuit includes a power supply end, a grounding end, and an under-voltage protection threshold control end, where the power supply end is connected to a positive electrode of a battery, the grounding end is connected to a negative electrode of the battery, and the under-voltage protection threshold control end is connected to the processor. The processor is configured to: when a temperature of the battery is smaller than a set temperature threshold and a discharging current of the battery is greater than a set current threshold, reduce a discharging cutoff voltage of the battery and send a first control signal; and the charging/discharging protection circuit is configured to receive the first control signal through the under-voltage protection threshold control end and reduce an under-voltage protection threshold of the battery under the control of the first control signal.

Through the foregoing solution, when the temperature of the battery is smaller than the set temperature threshold and the discharging current of the battery is greater than the set current threshold, the terminal device reduces the under-voltage protection threshold of the battery and the discharging cutoff voltage of the battery, to enable the battery to continue to discharge, until the output voltage of the battery is smaller than the reduced under-voltage protection threshold; and therefore, before the under-voltage protection threshold of the battery is adjusted, the electric quantity in the battery that cannot continue to be used because of the low temperature can be released, so that the terminal device may continue to work, thereby improving the endurance capability of the terminal device.

In a possible implementation, the processor is further configured to: when an output voltage of the battery is smaller than the discharging cutoff voltage of the battery, control the terminal device to be powered off, increase the discharging cutoff voltage of the battery, and send a second control signal; and the charging/discharging protection circuit is further configured to increase the under-voltage protection threshold of the battery under the control of the second control signal.

The electric energy in the battery is still consumed after the terminal device is powered off. If the under-voltage protection threshold and the discharging cutoff voltage of the battery are increased when the terminal device is powered off, the battery can be prevented from being damaged, thereby ensuring the service life and the service safety of the battery. If the under-voltage protection threshold of the battery and the discharging cutoff voltage of the battery are not increased, the battery may be damaged in a scenario where the battery cannot be charged in time.

In a possible implementation, the charging/discharging protection circuit further includes a discharging control end. The charging/discharging protection circuit is further configured to: compare the output voltage of the battery and the under-voltage protection threshold of the battery and output a third control signal through the discharging control end according to a comparison result, where the third control signal is used for controlling a discharging loop of the battery to be switched on or switched off. When the output voltage of the battery is greater than the under-voltage protection threshold of the battery, the third control signal is used for controlling the discharging loop of the battery to be switched on; and when the output voltage of the battery is smaller than the under-voltage protection threshold of the battery, the third control signal is used for controlling the discharging loop of the battery to be switched off, to perform under-voltage protection.

In a possible implementation, the charging/discharging protection circuit includes a battery voltage sampling circuit, a reference voltage circuit, and a comparator, where the battery sampling circuit is connected to each of the power supply end, the grounding end, the under-voltage protection threshold control end, and a first input end of the comparator, the reference voltage circuit is connected to a second input end of the comparator, and an output end of the comparator is connected to the discharging control end. The battery voltage sampling circuit is configured to sample the output voltage of the battery and increase a sampling voltage under the control of the first control signal; an output voltage of the reference voltage circuit is used for representing the under-voltage protection threshold of the battery; and the comparator is configured to compare the output voltage of the reference voltage circuit and the increased sampling voltage and output the third control signal according to a comparison result.

In a possible implementation, the battery voltage sampling circuit includes a first voltage divider resistor, a second voltage divider resistor, and a switch resistor array, the switch resistor array includes a plurality of branches connected to each other in parallel, and each branch includes a third voltage divider resistor and a switch connected to the third voltage divider resistor in series. A first end of the first voltage divider resistor is connected to each of the power supply end and a first end of the switch resistor array, a second end of the first voltage divider resistor is connected to each of a first end of the second voltage divider resistor, a second end of the switch resistor array, and the first input end of the comparator, control ends of switches in the switch resistor array are connected to the under-voltage protection threshold control end, and a second end of the second voltage divider resistor is connected to the grounding end; and the first control signal is used for controlling at least one switch in the switch resistor array to switch from a switched-off state to a switched-on state.

In a possible implementation, the reference voltage circuit is a voltage source.

In a possible implementation, the charging/discharging protection circuit includes a battery voltage sampling circuit, a reference voltage circuit, and a comparator, where the battery sampling circuit is connected to each of the power supply end, the grounding end, and a first input end of the comparator, the reference voltage circuit is connected to each of a second input end of the comparator and the under-voltage protection threshold control end, and an output end of the comparator is connected to the discharging control end. The battery voltage sampling circuit is configured to sample the voltage of the battery; the reference voltage circuit is configured to reduce an output voltage of the reference voltage circuit under the control of the first control signal, where the output voltage of the reference voltage circuit is used for representing the under-voltage protection threshold of the battery; and the comparator is configured to compare an output voltage of the battery voltage sampling circuit and the output voltage of the reference voltage circuit and output the third control signal according to a comparison result.

In a possible implementation, the battery voltage sampling circuit includes a first sampling resistor and a second sampling resistor. A first end of the first voltage divider resistor is connected to the power supply end, a second end of the first voltage divider resistor is connected to each of a first end of the second voltage divider resistor and the first input end of the comparator, and a second end of the second voltage divider resistor is connected to the grounding end.

In a possible implementation, the reference voltage circuit includes a plurality of branches connected to each other in parallel, and each branch includes a voltage source and a switch connected to the voltage source in series. A first end of the reference voltage circuit is grounded, a second end of the reference voltage circuit is connected to the second input end of the comparator, and control ends of the switches in the reference voltage circuit are connected to the under-voltage protection threshold control end; and the first control signal is used for controlling a first switch in the reference voltage circuit to switch from a switched-on state to a switched-off state and controlling a second switch in the reference voltage circuit to switch from a switched-off state to a switched-on state, and a voltage of a voltage source connected to the first switch in series is greater than a voltage of a voltage source connected to the second switch in series.

According to a third aspect, this application further provides a charging/discharging protection circuit. The charging/discharging protection circuit includes: a power supply end, a grounding end, a temperature sampling end, a current sampling end, a controller, and an under-voltage protection control circuit, where the power supply end is connected to a positive electrode of the battery, the grounding end is connected to a negative electrode of the battery, and the controller is connected to each of the under-voltage protection control circuit, the temperature sampling end, and the current sampling end. The controller is configured to obtain a temperature of the battery through the temperature sampling end and obtain a discharging current of the battery through the current sampling end; and send a first control signal when the temperature of the battery is smaller than a set temperature threshold and the discharging current of the battery is greater than a set current threshold; and the under-voltage protection control circuit is configured to reduce an under-voltage protection threshold of the battery under the control of the first control signal.

Through the foregoing solution, when the temperature of the battery is smaller than the set temperature threshold and the discharging current of the battery is greater than the set current threshold, the charging/discharging protection circuit reduces the under-voltage protection threshold of the battery, to enable the battery to continue to discharge, until the output voltage of the battery is smaller than the reduced under-voltage protection threshold; and therefore, before the under-voltage protection threshold of the battery is adjusted, the electric quantity in the battery that cannot continue to be used because of the low temperature can be released and utilized by a power consumption load connected to the charging/discharging protection circuit.

In a possible implementation, the controller is further configured to send a second control signal when an output voltage of the battery is smaller than a discharging cutoff voltage of the battery; and the under-voltage protection control circuit is further configured to increase the under-voltage protection threshold of the battery under the control of the second control signal.

When the output voltage of the battery is smaller than the discharging cutoff voltage of the battery, the power consumption load connected to the charging/discharging protection circuit cannot work, but the battery still continues to discharge. Therefore, when the output voltage of the battery is smaller than the discharging cutoff voltage of the battery, the under-voltage protection threshold of the battery is increased to prevent the battery from being damaged, thereby ensuring the service life and the service safety of the battery. If the under-voltage protection threshold of the battery is not increased, the battery may be damaged in a scenario where the battery cannot be charged in time.

In a possible implementation, the charging/discharging protection circuit further includes a discharging control end, where the discharging control end is connected to the under-voltage protection control circuit. The under-voltage protection control circuit is further configured to: compare the output voltage of the battery and the under-voltage protection threshold of the battery and output a third control signal through the discharging control end according to a comparison result, where the third control signal is used for controlling a discharging loop of the battery to be switched on or switched off. When the output voltage of the battery is greater than the under-voltage protection threshold of the battery, the third control signal is used for controlling the discharging loop of the battery to be switched on; and when the output voltage of the battery is smaller than the under-voltage protection threshold of the battery, the third control signal is used for controlling the discharging loop of the battery to be switched off, to perform under-voltage protection.

In a possible implementation, the under-voltage protection control circuit includes a battery voltage sampling circuit, a reference voltage circuit, and a comparator, where the battery sampling circuit is connected to each of the power supply end, the grounding end, the under-voltage protection threshold control end, and a first input end of the comparator, the reference voltage circuit is connected to a second input end of the comparator, and an output end of the comparator is connected to the discharging control end. The battery voltage sampling circuit is configured to sample the output voltage of the battery and increase a sampling voltage under the control of the first control signal; an output voltage of the reference voltage circuit is used for representing the under-voltage protection threshold of the battery; and the comparator is configured to compare the output voltage of the reference voltage circuit and the increased sampling voltage and output the third control signal according to a comparison result.

In a possible implementation, the battery voltage sampling circuit includes a first voltage divider resistor, a second voltage divider resistor, and a switch resistor array, the switch resistor array includes a plurality of branches connected to each other in parallel, and each branch includes a third voltage divider resistor and a switch connected to the third voltage divider resistor in series. A first end of the first voltage divider resistor is connected to each of the power supply end and a first end of the switch resistor array, a second end of the first voltage divider resistor is connected to each of a first end of the second voltage divider resistor, a second end of the switch resistor array, and the first input end of the comparator, control ends of switches in the switch resistor array are connected to the under-voltage protection threshold control end, and a second end of the second voltage divider resistor is connected to the grounding end; and the first control signal is used for controlling at least one switch in the switch resistor array to switch from a switched-off state to a switched-on state.

In a possible implementation, the reference voltage circuit is a voltage source.

In a possible implementation, the under-voltage protection control circuit includes a battery voltage sampling circuit, a reference voltage circuit, and a comparator, where the battery sampling circuit is connected to each of the power supply end, the grounding end, and a first input end of the comparator, and the reference voltage circuit is connected to each of a second input end of the comparator and the under-voltage protection threshold control end. The battery voltage sampling circuit is configured to sample the output voltage of the battery; the reference voltage circuit is configured to reduce an output voltage of the reference voltage circuit under the control of the first control signal; and an output voltage of the reference voltage circuit is used for representing the under-voltage protection threshold of the battery; and the comparator is configured to compare the output voltage of the reference voltage circuit and an output voltage of the battery voltage sampling circuit and output the third control signal according to a comparison result.

In a possible implementation, the battery voltage sampling circuit includes a first sampling resistor and a second sampling resistor. A first end of the first voltage divider resistor is connected to the power supply end, a second end of the first voltage divider resistor is connected to each of a first end of the second voltage divider resistor and the first input end of the comparator, and a second end of the second voltage divider resistor is connected to the grounding end.

In a possible implementation, the reference voltage circuit includes a plurality of branches connected to each other in parallel, and each branch includes a voltage source and a switch connected to the voltage source in series. A first end of the reference voltage circuit is grounded, a second end of the reference voltage circuit is connected to the second input end of the comparator, and control ends of the switches in the reference voltage circuit are connected to the under-voltage protection threshold control end; and the first control signal is used for controlling a first switch in the reference voltage circuit to switch from a switched-on state to a switched-off state and controlling a second switch in the reference voltage circuit to switch from a switched-off state to a switched-on state, and a voltage of a voltage source connected to the first switch in series is greater than a voltage of a voltage source connected to the second switch in series.

According to a fourth aspect, this application further provides a terminal device. The terminal device includes a processor and a charging/discharging protection circuit. The processor is configured to reduce a discharging cutoff voltage of a battery connected to the charging/discharging protection circuit when a temperature of the battery is smaller than a set temperature threshold and a discharging current of the battery is greater than a set current threshold; and the charging/discharging protection circuit is configured to reduce an under-voltage protection threshold of the battery when the temperature of the battery is smaller than a set temperature threshold and the discharging current of the battery is greater than a set current threshold.

Through the foregoing solution, when the temperature of the battery is smaller than the set temperature threshold and the discharging current of the battery is greater than the set current threshold, the terminal device reduces the under-voltage protection threshold of the battery and the discharging cutoff voltage of the battery, to enable the battery to continue to discharge, until the output voltage of the battery is smaller than the reduced under-voltage protection threshold; and therefore, before the under-voltage protection threshold of the battery is adjusted, the electric quantity in the battery that cannot continue to be used because of the low temperature can be released, so that the terminal device may continue to work, thereby improving the endurance capability of the terminal device.

In a possible implementation, the processor is further configured to: when an output voltage of the battery is smaller than the discharging cutoff voltage of the battery, control the terminal device to be powered off, and increase the discharging cutoff voltage of the battery; and the charging/discharging protection circuit is further configured to increase the under-voltage protection threshold of the battery when an output voltage of the battery is smaller than a discharging cutoff voltage of the battery and after the terminal device is powered off.

The electric energy in the battery is still consumed after the terminal device is powered off. If the under-voltage protection threshold and the discharging cutoff voltage of the battery are increased when the terminal device is powered off, the battery can be prevented from being damaged, thereby ensuring the service life and the service safety of the battery. If the under-voltage protection threshold of the battery and the discharging cutoff voltage of the battery are not increased, the battery may be damaged in a scenario where the battery cannot be charged in time.

In a possible implementation, the charging/discharging protection circuit includes: a power supply end, a grounding end, a temperature sampling end, a current sampling end, a controller, and an under-voltage protection control circuit, where the power supply end is connected to a positive electrode of the battery, the grounding end is connected to a negative electrode of the battery, and the controller is connected to each of the under-voltage protection control circuit, the temperature sampling end, and the current sampling end. The controller is configured to obtain a temperature of the battery through the temperature sampling end and obtain a discharging current of the battery through the current sampling end; and send a first control signal when the temperature of the battery is smaller than a set temperature threshold and the discharging current of the battery is greater than a set current threshold; and the under-voltage protection control circuit is configured to reduce an under-voltage protection threshold of the battery under the control of the first control signal.

In a possible implementation, the charging/discharging protection circuit further includes a discharging control end. The under-voltage protection control circuit is further configured to: compare the output voltage of the battery and the under-voltage protection threshold of the battery and output a third control signal through the discharging control end according to a comparison result, where the third control signal is used for controlling a discharging loop of the battery to be switched on or switched off.

In a possible implementation, the under-voltage protection control circuit includes a battery voltage sampling circuit, a reference voltage circuit, and a comparator, where the battery sampling circuit is connected to each of the power supply end, the grounding end, the under-voltage protection threshold control end, and a first input end of the comparator, the reference voltage circuit is connected to a second input end of the comparator, and an output end of the comparator is connected to the discharging control end. The battery voltage sampling circuit is configured to sample the output voltage of the battery and increase a sampling voltage under the control of the first control signal; an output voltage of the reference voltage circuit is used for representing the under-voltage protection threshold of the battery; and the comparator is configured to compare the output voltage of the reference voltage circuit and the increased sampling voltage and output the third control signal according to a comparison result.

In a possible implementation, the battery voltage sampling circuit includes a first voltage divider resistor, a second voltage divider resistor, and a switch resistor array, the switch resistor array includes a plurality of branches connected to each other in parallel, and each branch includes a third voltage divider resistor and a switch connected to the third voltage divider resistor in series. A first end of the first voltage divider resistor is connected to each of the power supply end and a first end of the switch resistor array, a second end of the first voltage divider resistor is connected to each of a first end of the second voltage divider resistor, a second end of the switch resistor array, and the first input end of the comparator, control ends of switches in the switch resistor array are connected to the under-voltage protection threshold control end, and a second end of the second voltage divider resistor is connected to the grounding end; and the first control signal is used for controlling at least one switch in the switch resistor array to switch from a switched-off state to a switched-on state.

In a possible implementation, the reference voltage circuit is a voltage source.

In a possible implementation, the under-voltage protection control circuit includes a battery voltage sampling circuit, a reference voltage circuit, and a comparator, where the battery sampling circuit is connected to each of the power supply end, the grounding end, and a first input end of the comparator, the reference voltage circuit is connected to each of a second input end of the comparator and the under-voltage protection threshold control end, and an output end of the comparator is connected to the discharging control end. The battery voltage sampling circuit is configured to sample the voltage of the battery; the reference voltage circuit is configured to reduce an output voltage of the reference voltage circuit under the control of the first control signal, where the output voltage of the reference voltage circuit is used for representing the under-voltage protection threshold of the battery; and the comparator is configured to compare the output voltage of the reference voltage circuit and an output voltage of the battery voltage sampling circuit and output the third control signal according to a comparison result.

In a possible implementation, the battery voltage sampling circuit includes a first sampling resistor and a second sampling resistor, where a first end of the first voltage divider resistor is connected to the power supply end, a second end of the first voltage divider resistor is connected to each of a first end of the second voltage divider resistor and the first input end of the comparator, and a second end of the second voltage divider resistor is connected to the grounding end.

In a possible implementation, the reference voltage circuit includes a plurality of branches connected to each other in parallel, and each branch includes a voltage source and a switch connected to the voltage source in series. A first end of the reference voltage circuit is grounded, a second end of the reference voltage circuit is connected to the second input end of the comparator, and control ends of the switches in the reference voltage circuit are connected to the under-voltage protection threshold control end; and the first control signal is used for controlling a first switch in the reference voltage circuit to switch from a switched-on state to a switched-off state and controlling a second switch in the reference voltage circuit to switch from a switched-off state to a switched-on state, and a voltage of a voltage source connected to the first switch in series is greater than a voltage of a voltage source connected to the second switch in series.

According to a fifth aspect, this application further provides a battery discharging control method. The method includes: detecting, by a terminal device, a temperature of a battery in the terminal device and a discharging current of the battery; and reducing an under-voltage protection threshold of the battery and a discharging cutoff voltage of the battery when the temperature of the battery is smaller than a set temperature threshold and the discharging current of the battery is greater than a set current threshold.

Through the foregoing method, when the temperature of the battery is smaller than the set temperature threshold and the discharging current of the battery is greater than the set current threshold, the terminal device reduces the under-voltage protection threshold of the battery and the discharging cutoff voltage of the battery, to enable the battery to continue to discharge, until the output voltage of the battery is smaller than the reduced under-voltage protection threshold; and therefore, before the under-voltage protection threshold of the battery is adjusted, the electric quantity in the battery that cannot continue to be used because of the low temperature can be released, so that the terminal device may continue to work, thereby improving the endurance capability of the terminal device.

In a possible implementation, when an output voltage of the battery is smaller than the discharging cutoff voltage of the battery, the terminal device controls the terminal device to be powered off, and increases the under-voltage protection threshold of the battery and the discharging cutoff voltage of the battery.

The electric energy in the battery is still consumed after the terminal device is powered off. If the under-voltage protection threshold and the discharging cutoff voltage of the battery are increased when the terminal device is powered off, the battery can be prevented from being damaged, thereby ensuring the service life and the service safety of the battery. If the under-voltage protection threshold of the battery and the discharging cutoff voltage of the battery are not increased, the battery may be damaged in a scenario where the battery cannot be charged in time.

In a possible implementation, the terminal device further compares the output voltage of the battery and the under-voltage protection threshold of the battery, and controls, according to a comparison result, a discharging loop of the battery to be switched on or switched off. When the output voltage of the battery is greater than the under-voltage protection threshold of the battery, the terminal device controls the discharging loop of the battery to be switched on; and when the output voltage of the battery is smaller than the under-voltage protection threshold of the battery, the terminal device controls the discharging loop of the battery to be switched off, to perform under-voltage protection.

According to a sixth aspect, this application further provides a battery discharging control method. The method includes: receiving, by a charging/discharging protection circuit, a first control signal when a temperature of a battery connected to the charging protection circuit is smaller than a set temperature threshold and a discharging current of the battery is greater than a set current threshold, and reducing an under-voltage protection threshold of the battery under the control of the first control signal.

Through the foregoing method, when the temperature of the battery is smaller than the set temperature threshold and the discharging current of the battery is greater than the set current threshold, the charging/discharging protection circuit reduces the under-voltage protection threshold of the battery, to enable the battery to continue to discharge, until the output voltage of the battery is smaller than the reduced under-voltage protection threshold; and therefore, before the under-voltage protection threshold of the battery is adjusted, the electric quantity in the battery that cannot continue to be used because of the low temperature can be released and utilized by a power consumption load connected to the charging/discharging protection circuit.

In a possible implementation, the charging/discharging protection circuit further receives a second control signal when an output voltage of the battery is smaller than a discharging cutoff voltage of the battery and increases the under-voltage protection threshold of the battery under the control of the second control signal.

When the output voltage of the battery is smaller than the discharging cutoff voltage of the battery, the power consumption load connected to the charging/discharging protection circuit cannot work, but the battery still continues to discharge. Therefore, when the output voltage of the battery is smaller than the discharging cutoff voltage of the battery, the under-voltage protection threshold of the battery is increased to prevent the battery from being damaged, thereby ensuring the service life and the service safety of the battery. If the under-voltage protection threshold of the battery is not increased, the battery may be damaged in a scenario where the battery cannot be charged in time.

In a possible implementation, the charging/discharging protection circuit further compares the output voltage of the battery and the under-voltage protection threshold of the battery and outputs a third control signal according to a comparison result, where the third control signal is used for controlling a discharging loop of the battery to be switched off or switched on. When the output voltage of the battery is greater than the under-voltage protection threshold of the battery, the third control signal is used for controlling the discharging loop of the battery to be switched on; and when the output voltage of the battery is smaller than the under-voltage protection threshold of the battery, the third control signal is used for controlling the discharging loop of the battery to be switched off, to perform under-voltage protection.

According to a seventh aspect, this application further provides a battery discharging control method. The method includes: obtaining, by a charging/discharging protection circuit, a temperature of a battery connected to the charging protection circuit and a discharging current of the battery, and reducing an under-voltage protection threshold of the battery when the temperature of the battery is smaller than a set temperature threshold and the discharging current of the battery is greater than a set current threshold.

Through the foregoing method, when the temperature of the battery is smaller than the set temperature threshold and the discharging current of the battery is greater than the set current threshold, the charging/discharging protection circuit reduces the under-voltage protection threshold of the battery, to enable the battery to continue to discharge, until the output voltage of the battery is smaller than the reduced under-voltage protection threshold; and therefore, before the under-voltage protection threshold of the battery is adjusted, the electric quantity in the battery that cannot continue to be used because of the low temperature can be released and utilized by a power consumption load connected to the charging/discharging protection circuit.

In a possible implementation, the charging/discharging protection circuit further increases the under-voltage protection threshold of the battery when an output voltage of the battery is smaller than a discharging cutoff voltage of the battery.

When the output voltage of the battery is smaller than the discharging cutoff voltage of the battery, the power consumption load connected to the charging/discharging protection circuit cannot work, but the battery still continues to discharge. Therefore, when the output voltage of the battery is smaller than the discharging cutoff voltage of the battery, the under-voltage protection threshold of the battery is increased to prevent the battery from being damaged, thereby ensuring the service life and the service safety of the battery. If the under-voltage protection threshold of the battery is not increased, the battery may be damaged in a scenario where the battery cannot be charged in time.

In a possible implementation, the charging/discharging protection circuit further compares the output voltage of the battery and the under-voltage protection threshold of the battery and outputs a third control signal according to a comparison result, where the third control signal is used for controlling a discharging loop of the battery to be switched off or switched on. When the output voltage of the battery is greater than the under-voltage protection threshold of the battery, the third control signal is used for controlling the discharging loop of the battery to be switched on; and when the output voltage of the battery is smaller than the under-voltage protection threshold of the battery, the third control signal is used for controlling the discharging loop of the battery to be switched off, to perform under-voltage protection.

According to an eighth aspect, this application further provides a charging/discharging protection circuit. The charging/discharging protection circuit includes a power supply end, a grounding end, and an under-voltage protection threshold control end; the power supply end is connected to a positive electrode of a battery; the grounding end is connected to a negative electrode of the battery; the under-voltage protection threshold control end is configured to receive a first control signal. The charging/discharging protection circuit is configured to reduce an under-voltage protection threshold of the battery under the control of the first control signal when a quantity of charging/discharging cycles of the battery is greater than a set quantity and a discharging current of the battery is greater than a set current threshold.

Through the foregoing solution, when the quantity of charging/discharging cycles of the battery is greater than the set quantity, that is, the battery is aging, and the discharging current of the battery is greater than the set current threshold, the charging/discharging protection circuit reduces the under-voltage protection threshold of the battery, to enable the battery to continue to discharge, until the output voltage of the battery is smaller than the reduced under-voltage protection threshold; and therefore, before the under-voltage protection threshold of the battery is adjusted, the electric quantity in the battery that cannot continue to be used because of the aging can be released and utilized by a power consumption load connected to the charging/discharging protection circuit.

In a possible implementation, the under-voltage protection threshold control end is further configured to receive a second control signal; and the charging/discharging protection circuit is further configured to increase the under-voltage protection threshold of the battery under the control of the second control signal when an output voltage of the battery is smaller than a discharging cutoff voltage of the battery.

When the output voltage of the battery is smaller than the discharging cutoff voltage of the battery, the power consumption load connected to the charging/discharging protection circuit cannot work, but the battery still continues to discharge. Therefore, when the output voltage of the battery is smaller than the discharging cutoff voltage of the battery, the under-voltage protection threshold of the battery is increased to prevent the battery from being damaged, thereby ensuring the service life and the service safety of the battery. If the under-voltage protection threshold of the battery is not increased, the battery may be damaged in a scenario where the battery cannot be charged in time.

In a possible implementation, the charging/discharging protection circuit further includes a discharging control end, where the discharging control end is configured to output a third control signal. The charging/discharging protection circuit is further configured to: compare the output voltage of the battery and the under-voltage protection threshold of the battery and output the third control signal according to a comparison result, where the third control signal is used for controlling a discharging loop of the battery to be switched on or switched off. When the output voltage of the battery is greater than the under-voltage protection threshold of the battery, the third control signal is used for controlling the discharging loop of the battery to be switched on; and when the output voltage of the battery is smaller than the under-voltage protection threshold of the battery, the third control signal is used for controlling the discharging loop of the battery to be switched off, to perform under-voltage protection.

In a possible implementation, the charging/discharging protection circuit includes a battery voltage sampling circuit, a reference voltage circuit, and a comparator, where the battery sampling circuit is connected to each of the power supply end, the grounding end, the under-voltage protection threshold control end, and a first input end of the comparator, the reference voltage circuit is connected to a second input end of the comparator, and an output end of the comparator is connected to the discharging control end. The battery voltage sampling circuit is configured to sample the output voltage of the battery and increase a sampling voltage under the control of the first control signal; an output voltage of the reference voltage circuit is used for representing the under-voltage protection threshold of the battery; and the comparator is configured to compare the output voltage of the reference voltage circuit and the increased sampling voltage and output the third control signal according to a comparison result.

In a possible implementation, the battery voltage sampling circuit includes a first voltage divider resistor, a second voltage divider resistor, and a switch resistor array, the switch resistor array includes a plurality of branches connected to each other in parallel, and each branch includes a third voltage divider resistor and a switch connected to the third voltage divider resistor in series. A first end of the first voltage divider resistor is connected to each of the power supply end and a first end of the switch resistor array, a second end of the first voltage divider resistor is connected to each of a first end of the second voltage divider resistor, a second end of the switch resistor array, and the first input end of the comparator, control ends of switches in the switch resistor array are connected to the under-voltage protection threshold control end, and a second end of the second voltage divider resistor is connected to the grounding end; and the first control signal is used for controlling at least one switch in the switch resistor array to switch from a switched-off state to a switched-on state.

In a possible implementation, the reference voltage circuit is a voltage source.

In a possible implementation, the charging/discharging protection circuit includes a battery voltage sampling circuit, a reference voltage circuit, and a comparator, where the battery sampling circuit is connected to each of the power supply end, the grounding end, and a first input end of the comparator, and the reference voltage circuit is connected to each of a second input end of the comparator and the under-voltage protection threshold control end. The battery voltage sampling circuit is configured to sample the output voltage of the battery; the reference voltage circuit is configured to reduce an output voltage of the reference voltage circuit under the control of the first control signal; and an output voltage of the reference voltage circuit is used for representing the under-voltage protection threshold of the battery; and the comparator is configured to compare the output voltage of the reference voltage circuit and an output voltage of the battery voltage sampling circuit and output the third control signal according to a comparison result.

In a possible implementation, the battery voltage sampling circuit includes a first sampling resistor and a second sampling resistor. A first end of the first voltage divider resistor is connected to the power supply end, a second end of the first voltage divider resistor is connected to each of a first end of the second voltage divider resistor and the first input end of the comparator, and a second end of the second voltage divider resistor is connected to the grounding end.

In a possible implementation, the reference voltage circuit includes a plurality of branches connected to each other in parallel, and each branch includes a voltage source and a switch connected to the voltage source in series. A first end of the reference voltage circuit is grounded, a second end of the reference voltage circuit is connected to the second input end of the comparator, and control ends of the switches in the reference voltage circuit are connected to the under-voltage protection threshold control end; and the first control signal is used for controlling a first switch in the reference voltage circuit to switch from a switched-on state to a switched-off state and controlling a second switch in the reference voltage circuit to switch from a switched-off state to a switched-on state, and a voltage of a voltage source connected to the first switch in series is greater than a voltage of a voltage source connected to the second switch in series.

According to a ninth aspect, this application further provides a terminal device. The terminal device includes a processor and a charging/discharging protection circuit, where the charging/discharging protection circuit includes a power supply end, a grounding end, and an under-voltage protection threshold control end, where the power supply end is connected to a positive electrode of a battery, the grounding end is connected to a negative electrode of the battery, and the under-voltage protection threshold control end is connected to the processor. The processor is configured to: when a quantity of charging/discharging cycles of the battery is greater than a set quantity and a discharging current of the battery is greater than a set current threshold, reduce a discharging cutoff voltage of the battery and send a first control signal; and the charging/discharging protection circuit is configured to reduce an under-voltage protection threshold of the battery under the control of the first control signal.

Through the foregoing solution, when the quantity of charging/discharging cycles of the battery is greater than the set quantity, that is, the battery is aging, and the discharging current of the battery is greater than the set current threshold, the terminal device reduces the under-voltage protection threshold of the battery and the discharging cutoff voltage of the battery, to enable the battery to continue to discharge, until the output voltage of the battery is smaller than the reduced under-voltage protection threshold; and therefore, before the under-voltage protection threshold of the battery is adjusted, the electric quantity in the battery that cannot continue to be used because of the aging can be released, so that the terminal device may continue to work, thereby improving the endurance capability of the terminal device.

In a possible implementation, the processor is further configured to: when an output voltage of the battery is smaller than the discharging cutoff voltage of the battery, control the terminal device to be powered off, increase the discharging cutoff voltage of the battery, and send a second control signal; and the charging/discharging protection circuit is further configured to increase the under-voltage protection threshold of the battery under the control of the second voltage signal.

The electric energy in the battery is still consumed after the terminal device is powered off. If the under-voltage protection threshold and the discharging cutoff voltage of the battery are increased when the terminal device is powered off, the battery can be prevented from being damaged, thereby ensuring the service life and the service safety of the battery. If the under-voltage protection threshold of the battery and the discharging cutoff voltage of the battery are not increased, the battery may be damaged in a scenario where the battery cannot be charged in time.

In a possible implementation, the charging/discharging protection circuit further includes a discharging control end. The charging/discharging protection circuit is further configured to: compare the output voltage of the battery and the under-voltage protection threshold of the battery and output a third control signal through the discharging control end according to a comparison result, where the third control signal is used for controlling a discharging loop of the battery to be switched on or switched off. When the output voltage of the battery is greater than the under-voltage protection threshold of the battery, the third control signal is used for controlling the discharging loop of the battery to be switched on; and when the output voltage of the battery is smaller than the under-voltage protection threshold of the battery, the third control signal is used for controlling the discharging loop of the battery to be switched off, to perform under-voltage protection.

In a possible implementation, the charging/discharging protection circuit includes a battery voltage sampling circuit, a reference voltage circuit, and a comparator, where the battery sampling circuit is connected to each of the power supply end, the grounding end, the under-voltage protection threshold control end, and a first input end of the comparator, the reference voltage circuit is connected to a second input end of the comparator, and an output end of the comparator is connected to the discharging control end. The battery voltage sampling circuit is configured to sample the output voltage of the battery and increase a sampling voltage under the control of the first control signal; an output voltage of the reference voltage circuit is used for representing the under-voltage protection threshold of the battery; and the comparator is configured to compare the output voltage of the reference voltage circuit and the increased sampling voltage and output the third control signal according to a comparison result.

In a possible implementation, the battery voltage sampling circuit includes a first voltage divider resistor, a second voltage divider resistor, and a switch resistor array, the switch resistor array includes a plurality of branches connected to each other in parallel, and each branch includes a third voltage divider resistor and a switch connected to the third voltage divider resistor in series. A first end of the first voltage divider resistor is connected to each of the power supply end and a first end of the switch resistor array, a second end of the first voltage divider resistor is connected to each of a first end of the second voltage divider resistor, a second end of the switch resistor array, and the first input end of the comparator, control ends of switches in the switch resistor array are connected to the under-voltage protection threshold control end, and a second end of the second voltage divider resistor is connected to the grounding end; and the first control signal is used for controlling at least one switch in the switch resistor array to switch from a switched-off state to a switched-on state.

In a possible implementation, the reference voltage circuit is a voltage source.

In a possible implementation, the charging/discharging protection circuit includes a battery voltage sampling circuit, a reference voltage circuit, and a comparator, where the battery sampling circuit is connected to each of the power supply end, the grounding end, and a first input end of the comparator, the reference voltage circuit is connected to each of a second input end of the comparator and the under-voltage protection threshold control end, and an output end of the comparator is connected to the discharging control end. The battery voltage sampling circuit is configured to sample the voltage of the battery; the reference voltage circuit is configured to reduce an output voltage of the reference voltage circuit under the control of the first control signal, where the output voltage of the reference voltage circuit is used for representing the under-voltage protection threshold of the battery; and the comparator is configured to compare the output voltage of the reference voltage circuit and an output voltage of the battery voltage sampling circuit and output the third control signal according to a comparison result.

In a possible implementation, the battery voltage sampling circuit includes a first sampling resistor and a second sampling resistor, where a first end of the first voltage divider resistor is connected to the power supply end, a second end of the first voltage divider resistor is connected to each of a first end of the second voltage divider resistor and the first input end of the comparator, and a second end of the second voltage divider resistor is connected to the grounding end.

In a possible implementation, the reference voltage circuit includes a plurality of branches connected to each other in parallel, and each branch includes a voltage source and a switch connected to the voltage source in series. A first end of the reference voltage circuit is grounded, a second end of the reference voltage circuit is connected to the second input end of the comparator, and control ends of the switches in the reference voltage circuit are connected to the under-voltage protection threshold control end; and the first control signal is used for controlling a first switch in the reference voltage circuit to switch from a switched-on state to a switched-off state and controlling a second switch in the reference voltage circuit to switch from a switched-off state to a switched-on state, and a voltage of a voltage source connected to the first switch in series is greater than a voltage of a voltage source connected to the second switch in series.

According to a tenth aspect, this application further provides a charging/discharging protection circuit. The charging/discharging protection circuit includes: a power supply end, a grounding end, a current sampling end, a controller, and an under-voltage protection control circuit, where the power supply end is connected to a positive electrode of the battery, the grounding end is connected to a negative electrode of the battery, and the controller is connected to each of the under-voltage protection control circuit and the current sampling end. The controller is configured to collect statistics on a quantity of charging/discharging cycles of the battery and obtain a discharging current of the battery through the current sampling end; and send a first control signal when the quantity of charging/discharging cycles of the battery is greater than a set quantity and the discharging current of the battery is greater than a set current threshold; and the under-voltage protection control circuit is configured to reduce an under-voltage protection threshold of the battery under the control of the first control signal.

Through the foregoing solution, when the quantity of charging/discharging cycles of the battery is greater than the set quantity, that is, the battery is aging, and the discharging current of the battery is greater than the set current threshold, the charging/discharging protection circuit reduces the under-voltage protection threshold of the battery, to enable the battery to continue to discharge, until the output voltage of the battery is smaller than the reduced under-voltage protection threshold; and therefore, before the under-voltage protection threshold of the battery is adjusted, the electric quantity in the battery that cannot continue to be used because of the aging can be released and utilized by a power consumption load connected to the charging/discharging protection circuit.

In a possible implementation, the controller is further configured to send a second control signal when an output voltage of the battery is smaller than a discharging cutoff voltage of the battery; and the under-voltage protection control circuit is further configured to increase the under-voltage protection threshold of the battery under the control of the second control signal.

When the output voltage of the battery is smaller than the discharging cutoff voltage of the battery, the power consumption load connected to the charging/discharging protection circuit cannot work, but the battery still continues to discharge. Therefore, when the output voltage of the battery is smaller than the discharging cutoff voltage of the battery, the under-voltage protection threshold of the battery is increased to prevent the battery from being damaged, thereby ensuring the service life and the service safety of the battery. If the under-voltage protection threshold of the battery is not increased, the battery may be damaged in a scenario where the battery cannot be charged in time.

In a possible implementation, the charging/discharging protection circuit further includes a discharging control end, where the discharging control end is connected to the under-voltage protection control circuit. The under-voltage protection control circuit is further configured to: compare the output voltage of the battery and the under-voltage protection threshold of the battery and output a third control signal through the discharging control end according to a comparison result, where the third control signal is used for controlling a discharging loop of the battery to be switched on or switched off. When the output voltage of the battery is greater than the under-voltage protection threshold of the battery, the third control signal is used for controlling the discharging loop of the battery to be switched on; and when the output voltage of the battery is smaller than the under-voltage protection threshold of the battery, the third control signal is used for controlling the discharging loop of the battery to be switched off, to perform under-voltage protection.

In a possible implementation, the under-voltage protection control circuit includes a battery voltage sampling circuit, a reference voltage circuit, and a comparator, where the battery sampling circuit is connected to each of the power supply end, the grounding end, the under-voltage protection threshold control end, and a first input end of the comparator, the reference voltage circuit is connected to a second input end of the comparator, and an output end of the comparator is connected to the discharging control end. The battery voltage sampling circuit is configured to sample the output voltage of the battery and increase a sampling voltage under the control of the first control signal; an output voltage of the reference voltage circuit is used for representing the under-voltage protection threshold of the battery; and the comparator is configured to compare the output voltage of the reference voltage circuit and the increased sampling voltage and output the third control signal according to a comparison result.

In a possible implementation, the battery voltage sampling circuit includes a first voltage divider resistor, a second voltage divider resistor, and a switch resistor array, the switch resistor array includes a plurality of branches connected to each other in parallel, and each branch includes a third voltage divider resistor and a switch connected to the third voltage divider resistor in series. A first end of the first voltage divider resistor is connected to each of the power supply end and a first end of the switch resistor array, a second end of the first voltage divider resistor is connected to each of a first end of the second voltage divider resistor, a second end of the switch resistor array, and the first input end of the comparator, control ends of switches in the switch resistor array are connected to the under-voltage protection threshold control end, and a second end of the second voltage divider resistor is connected to the grounding end; and the first control signal is used for controlling at least one switch in the switch resistor array to switch from a switched-off state to a switched-on state.

In a possible implementation, the reference voltage circuit is a voltage source.

In a possible implementation, the under-voltage protection control circuit includes a battery voltage sampling circuit, a reference voltage circuit, and a comparator, where the battery sampling circuit is connected to each of the power supply end, the grounding end, and a first input end of the comparator, and the reference voltage circuit is connected to each of a second input end of the comparator and the under-voltage protection threshold control end. The battery voltage sampling circuit is configured to sample the output voltage of the battery; the reference voltage circuit is configured to reduce an output voltage of the reference voltage circuit under the control of the first control signal, where the output voltage of the reference voltage circuit is used for representing the under-voltage protection threshold of the battery; and the comparator is configured to compare the output voltage of the reference voltage circuit and an output voltage of the battery voltage sampling circuit and output the third control signal according to a comparison result.

In a possible implementation, the battery voltage sampling circuit includes a first sampling resistor and a second sampling resistor. A first end of the first voltage divider resistor is connected to the power supply end, a second end of the first voltage divider resistor is connected to each of a first end of the second voltage divider resistor and the first input end of the comparator, and a second end of the second voltage divider resistor is connected to the grounding end.

In a possible implementation, the reference voltage circuit includes a plurality of branches connected to each other in parallel, and each branch includes a voltage source and a switch connected to the voltage source in series. A first end of the reference voltage circuit is grounded, a second end of the reference voltage circuit is connected to the second input end of the comparator, and control ends of the switches in the reference voltage circuit are connected to the under-voltage protection threshold control end; and the first control signal is used for controlling a first switch in the reference voltage circuit to switch from a switched-on state to a switched-off state and controlling a second switch in the reference voltage circuit to switch from a switched-off state to a switched-on state, and a voltage of a voltage source connected to the first switch in series is greater than a voltage of a voltage source connected to the second switch in series.

According to an eleventh aspect, this application further provides a terminal device. The terminal device includes a processor and a charging/discharging protection circuit. The processor is configured to reduce a discharging cutoff voltage of a battery connected to the charging/discharging protection circuit when a quantity of charging/discharging cycles of the battery is greater than a set quantity and a discharging current of the battery is greater than a set current threshold; and the charging/discharging protection circuit is configured to reduce an under-voltage protection threshold of the battery when the quantity of charging/discharging cycles of the battery is greater than the set quantity and the discharging current of the battery is greater than the set current threshold.

Through the foregoing solution, when the quantity of charging/discharging cycles of the battery is greater than the set quantity, that is, the battery is aging, and the discharging current of the battery is greater than the set current threshold, the terminal device reduces the under-voltage protection threshold of the battery and the discharging cutoff voltage of the battery, to enable the battery to continue to discharge, until the output voltage of the battery is smaller than the reduced under-voltage protection threshold; and therefore, before the under-voltage protection threshold of the battery is adjusted, the electric quantity in the battery that cannot continue to be used because of the aging can be released, so that the terminal device may continue to work, thereby improving the endurance capability of the terminal device.

In a possible implementation, the processor is further configured to: when an output voltage of the battery is smaller than the discharging cutoff voltage of the battery, control the terminal device to be powered off, and increase the discharging cutoff voltage of the battery; and the charging/discharging protection circuit is further configured to increase the under-voltage protection threshold of the battery when an output voltage of the battery is smaller than a discharging cutoff voltage of the battery and after the terminal device is powered off.

The electric energy in the battery is still consumed after the terminal device is powered off. If the under-voltage protection threshold and the discharging cutoff voltage of the battery are increased when the terminal device is powered off, the battery can be prevented from being damaged, thereby ensuring the service life and the service safety of the battery. If the under-voltage protection threshold of the battery and the discharging cutoff voltage of the battery are not increased, the battery may be damaged in a scenario where the battery cannot be charged in time.

In a possible implementation, the charging/discharging protection circuit includes: a power supply end, a grounding end, a current sampling end, a controller, and an under-voltage protection control circuit, where the power supply end is connected to a positive electrode of the battery, the grounding end is connected to a negative electrode of the battery, and the controller is connected to each of the under-voltage protection control circuit and the current sampling end. The controller is configured to collect statistics on a quantity of charging/discharging cycles of the battery and obtain a discharging current of the battery through the current sampling end; and send a first control signal when the quantity of charging/discharging cycles of the battery is greater than a set quantity and the discharging current of the battery is greater than a set current threshold; and the under-voltage protection control circuit is configured to reduce an under-voltage protection threshold of the battery under the control of the first control signal.

In a possible implementation, the charging/discharging protection circuit further includes a discharging control end. The charging/discharging protection circuit is further configured to: compare the output voltage of the battery and the under-voltage protection threshold of the battery and output a third control signal through the discharging control end according to a comparison result, where the third control signal is used for controlling a discharging loop of the battery to be switched on or switched off. When the output voltage of the battery is greater than the under-voltage protection threshold of the battery, the third control signal is used for controlling the discharging loop of the battery to be switched on; and when the output voltage of the battery is smaller than the under-voltage protection threshold of the battery, the third control signal is used for controlling the discharging loop of the battery to be switched off, to perform under-voltage protection.

In a possible implementation, the under-voltage protection control circuit includes a battery voltage sampling circuit, a reference voltage circuit, and a comparator, where the battery sampling circuit is connected to each of the power supply end, the grounding end, the under-voltage protection threshold control end, and a first input end of the comparator, the reference voltage circuit is connected to a second input end of the comparator, and an output end of the comparator is connected to the discharging control end. The battery voltage sampling circuit is configured to sample the output voltage of the battery and increase a sampling voltage under the control of the first control signal; an output voltage of the reference voltage circuit is used for representing the under-voltage protection threshold of the battery; and the comparator is configured to compare the output voltage of the reference voltage circuit and the increased sampling voltage and output the third control signal according to a comparison result.

In a possible implementation, the battery voltage sampling circuit includes a first voltage divider resistor, a second voltage divider resistor, and a switch resistor array, the switch resistor array includes a plurality of branches connected to each other in parallel, and each branch includes a third voltage divider resistor and a switch connected to the third voltage divider resistor in series. A first end of the first voltage divider resistor is connected to each of the power supply end and a first end of the switch resistor array, a second end of the first voltage divider resistor is connected to each of a first end of the second voltage divider resistor, a second end of the switch resistor array, and the first input end of the comparator, control ends of switches in the switch resistor array are connected to the under-voltage protection threshold control end, and a second end of the second voltage divider resistor is connected to the grounding end; and the first control signal is used for controlling at least one switch in the switch resistor array to switch from a switched-off state to a switched-on state.

In a possible implementation, the reference voltage circuit is a voltage source.

In a possible implementation, the under-voltage protection control circuit includes a battery voltage sampling circuit, a reference voltage circuit, and a comparator, where the battery sampling circuit is connected to each of the power supply end, the grounding end, and a first input end of the comparator, the reference voltage circuit is connected to each of a second input end of the comparator and the under-voltage protection threshold control end, and an output end of the comparator is connected to the discharging control end. The battery voltage sampling circuit is configured to sample the voltage of the battery; the reference voltage circuit is configured to reduce an output voltage of the reference voltage circuit under the control of the first control signal, where the output voltage of the reference voltage circuit is used for representing the under-voltage protection threshold of the battery; and the comparator is configured to compare the output voltage of the reference voltage circuit and an output voltage of the battery voltage sampling circuit and output the third control signal according to a comparison result.

In a possible implementation, the battery voltage sampling circuit includes a first sampling resistor and a second sampling resistor. A first end of the first voltage divider resistor is connected to the power supply end, a second end of the first voltage divider resistor is connected to each of a first end of the second voltage divider resistor and the first input end of the comparator, and a second end of the second voltage divider resistor is connected to the grounding end.

In a possible implementation, the reference voltage circuit includes a plurality of branches connected to each other in parallel, and each branch includes a voltage source and a switch connected to the voltage source in series. A first end of the reference voltage circuit is grounded, a second end of the reference voltage circuit is connected to the second input end of the comparator, and control ends of the switches in the reference voltage circuit are connected to the under-voltage protection threshold control end; and the first control signal is used for controlling a first switch in the reference voltage circuit to switch from a switched-on state to a switched-off state and controlling a second switch in the reference voltage circuit to switch from a switched-off state to a switched-on state, and a voltage of a voltage source connected to the first switch in series is greater than a voltage of a voltage source connected to the second switch in series.

According to a twelfth aspect, this application further provides a battery discharging control method. The method includes: detecting, by a terminal device, a discharging current of a battery in the terminal device, and collecting statistics on a quantity of charging/discharging cycles of the battery; and reducing an under-voltage protection threshold of the battery and a discharging cutoff voltage of the battery when the quantity of charging/discharging cycles of the battery is greater than a set quantity and the discharging current of the battery is greater than a set current threshold.

Through the foregoing method, when the quantity of charging/discharging cycles of the battery is greater than the set quantity, that is, the battery is aging, and the discharging current of the battery is greater than the set current threshold, the terminal device reduces the under-voltage protection threshold of the battery and the discharging cutoff voltage of the battery, to enable the battery to continue to discharge, until the output voltage of the battery is smaller than the reduced under-voltage protection threshold; and therefore, before the under-voltage protection threshold of the battery is adjusted, the electric quantity in the battery that cannot continue to be used because of the aging can be released, so that the terminal device may continue to work, thereby improving the endurance capability of the terminal device.

In a possible implementation, when an output voltage of the battery is smaller than the discharging cutoff voltage of the battery, the terminal device controls the terminal device to be powered off, and increases the under-voltage protection threshold of the battery and the discharging cutoff voltage of the battery.

The electric energy in the battery is still consumed after the terminal device is powered off. If the under-voltage protection threshold and the discharging cutoff voltage of the battery are increased when the terminal device is powered off, the battery can be prevented from being damaged, thereby ensuring the service life and the service safety of the battery. If the under-voltage protection threshold of the battery and the discharging cutoff voltage of the battery are not increased, the battery may be damaged in a scenario where the battery cannot be charged in time.

In a possible implementation, the terminal device compares the output voltage of the battery and the under-voltage protection threshold of the battery, and controls, according to a comparison result, a discharging loop of the battery to be switched on or switched off. When the output voltage of the battery is greater than the under-voltage protection threshold of the battery, the terminal device controls the discharging loop of the battery to be switched on; and when the output voltage of the battery is smaller than the under-voltage protection threshold of the battery, the terminal device controls the discharging loop of the battery to be switched off, to perform under-voltage protection.

According to a thirteenth aspect, this application further provides a battery discharging control method. The method includes: receiving, by a charging/discharging protection circuit, a first control signal when a quantity of charging/discharging cycles of a battery connected to the charging protection circuit is greater than a set quantity and a discharging current of the battery is greater than a set current threshold, and reducing an under-voltage protection threshold of the battery under the control of the first control signal.

Through the foregoing method, when the quantity of charging/discharging cycles of the battery is greater than the set quantity, that is, the battery is aging, and the discharging current of the battery is greater than the set current threshold, the charging/discharging protection circuit reduces the under-voltage protection threshold of the battery, to enable the battery to continue to discharge, until the output voltage of the battery is smaller than the reduced under-voltage protection threshold; and therefore, before the under-voltage protection threshold of the battery is adjusted, the electric quantity in the battery that cannot continue to be used because of the aging can be released and utilized by a power consumption load connected to the charging/discharging protection circuit.

In a possible implementation, the charging/discharging protection circuit receives a second control signal when an output voltage of the battery is smaller than a discharging cutoff voltage of the battery and increases the under-voltage protection threshold of the battery under the control of the second control signal, to prevent the battery from being damaged, thereby ensuring the service life and the service safety of the battery.

In a possible implementation, the charging/discharging protection circuit compares the output voltage of the battery and the under-voltage protection threshold of the battery and outputs a third control signal according to a comparison result, where the third control signal is used for controlling a discharging loop of the battery to be switched off or switched on. When the output voltage of the battery is greater than the under-voltage protection threshold of the battery, the third control signal is used for controlling the discharging loop of the battery to be switched on; and when the output voltage of the battery is smaller than the under-voltage protection threshold of the battery, the third control signal is used for controlling the discharging loop of the battery to be switched off, to perform under-voltage protection.

According to a fourteenth aspect, this application further provides a battery discharging control method. The method includes: obtaining, by a charging/discharging protection circuit, a quantity of charging/discharging cycles of a battery connected to the charging protection circuit and a discharging current of the battery, and reducing an under-voltage protection threshold of the battery when the quantity of charging/discharging cycles of the battery is greater than a set quantity and the discharging current of the battery is greater than a set current threshold.

Through the foregoing method, when the quantity of charging/discharging cycles of the battery is greater than the set quantity, that is, the battery is aging, and the discharging current of the battery is greater than the set current threshold, the charging/discharging protection circuit reduces the under-voltage protection threshold of the battery, to enable the battery to continue to discharge, until the output voltage of the battery is smaller than the reduced under-voltage protection threshold; and therefore, before the under-voltage protection threshold of the battery is adjusted, the electric quantity in the battery that cannot continue to be used because of the aging can be released and utilized by a power consumption load connected to the charging/discharging protection circuit.

In a possible implementation, the charging/discharging protection circuit increases the under-voltage protection threshold of the battery when an output voltage of the battery is smaller than a discharging cutoff voltage of the battery.

When the output voltage of the battery is smaller than the discharging cutoff voltage of the battery, the power consumption load connected to the charging/discharging protection circuit cannot work, but the battery still continues to discharge. Therefore, when the output voltage of the battery is smaller than the discharging cutoff voltage of the battery, the under-voltage protection threshold of the battery is increased to prevent the battery from being damaged, thereby ensuring the service life and the service safety of the battery. If the under-voltage protection threshold of the battery is not increased, the battery may be damaged in a scenario where the battery cannot be charged in time.

In a possible implementation, the charging/discharging protection circuit compares the output voltage of the battery and the under-voltage protection threshold of the battery and outputs a third control signal according to a comparison result, where the third control signal is used for controlling a discharging loop of the battery to be switched off or switched on. When the output voltage of the battery is greater than the under-voltage protection threshold of the battery, the third control signal is used for controlling the discharging loop of the battery to be switched on; and when the output voltage of the battery is smaller than the under-voltage protection threshold of the battery, the third control signal is used for controlling the discharging loop of the battery to be switched off, to perform under-voltage protection.

It may be understood that, the connection in the foregoing technical solutions may be a direct connection or may be an indirect connection.

DESCRIPTION OF EMBODIMENTS

During discharging, an output voltage of a battery is gradually reduced, and when the output voltage of the battery is smaller than a specific threshold, the battery is damaged, or even a safety problem such as explosion or fire breakout occurs. To ensure the service safety and the service life of the battery, a discharging cutoff voltage and an under-voltage protection threshold need to be set to perform discharging protection on the battery.

Figure 1:
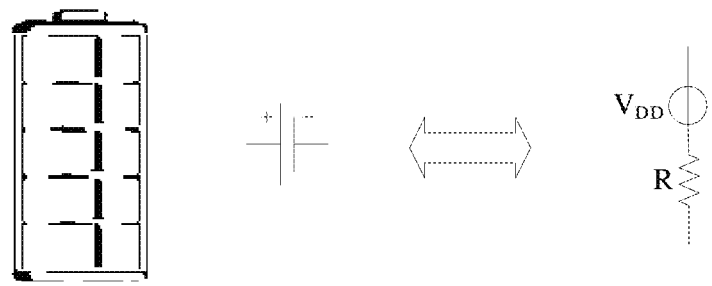
FIG. 1 is a schematic diagram of an equivalent circuit of a battery according to an embodiment of this application.

As shown in FIG. 1, an equivalent model of a battery is a structure where a voltage source and a resistor are connected in series, where a voltage of the voltage source is an open-circuit voltage of the battery, and a resistance is an internal resistance of the battery. An output voltage of the battery is $U_o=V_{DD}-IR$, where $V_{DD}$ is the open-circuit voltage of the battery, I is a discharging current of the battery, and R is the internal resistance of the battery. Relative to a normal temperature environment, in a low temperature environment, the internal resistance of the battery R is increased, and then the output voltage of the battery is reduced. However, currently, the under-voltage protection threshold and the discharging cutoff voltage of the battery are both set according to the performance of the battery at the normal temperature. Compared with the electric quantity of the battery remaining when the battery changes from the output voltage to the discharging cutoff voltage at the normal temperature, when the battery works in a low temperature environment and the output voltage of the battery reaches the discharging cutoff voltage of the battery that is set at the normal temperature, the battery further has a more electric quantity, but the power consumption load connected to the battery cannot continue to obtain electric energy from the battery. As a result, the electric quantity of the battery cannot be effectively utilized. For example, when photographing is performed with a mobile phone outdoors in winter, the mobile phone is suddenly powered off although the mobile phone still has a specific electric quantity.

To resolve the foregoing problem, embodiments of this application provide a charging/discharging protection circuit, a terminal device, and a battery discharging control method. A method and an apparatus may be based on a same inventive concept. Because the method and the apparatus resolve the problem in similar principles, reference may be made to each other for implementations of the method and the apparatus, and repetitions are not described.

In addition, it should be understood that in descriptions of the embodiments of this application, a plurality of refers to two or more; and terms such as "first" and "second" are merely used for distinguishing descriptions, and cannot be understood as an indication or implication of relative importance, or an indication or implication of a sequence.

Figure 2:
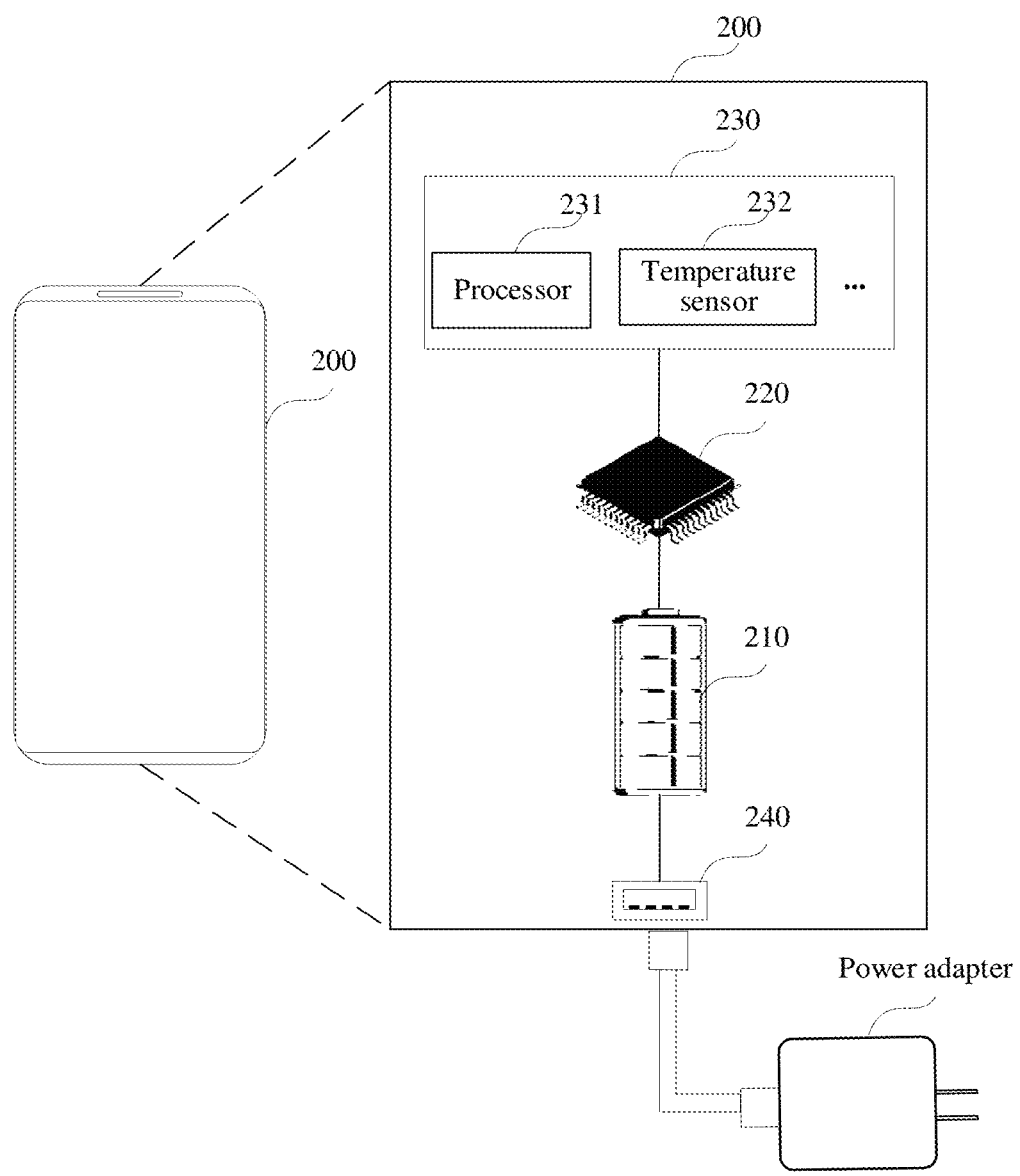
FIG. 2 is a first schematic structural diagram of a terminal device according to an embodiment of this application.

FIG. 2 is a hardware architecture diagram of a terminal device to which an embodiment of this application is applicable. The terminal device may be a device powered up through a battery, such as a mobile phone, a tablet computer, or a notebook computer. As shown in FIG. 2, the terminal device 200 includes a battery 210, a charging/discharging protection circuit 220, and a power consumption load 230. The charging/discharging protection circuit 220 may alternatively be monolithically integrated to form a charging/discharging protection chip.

Figure 3:
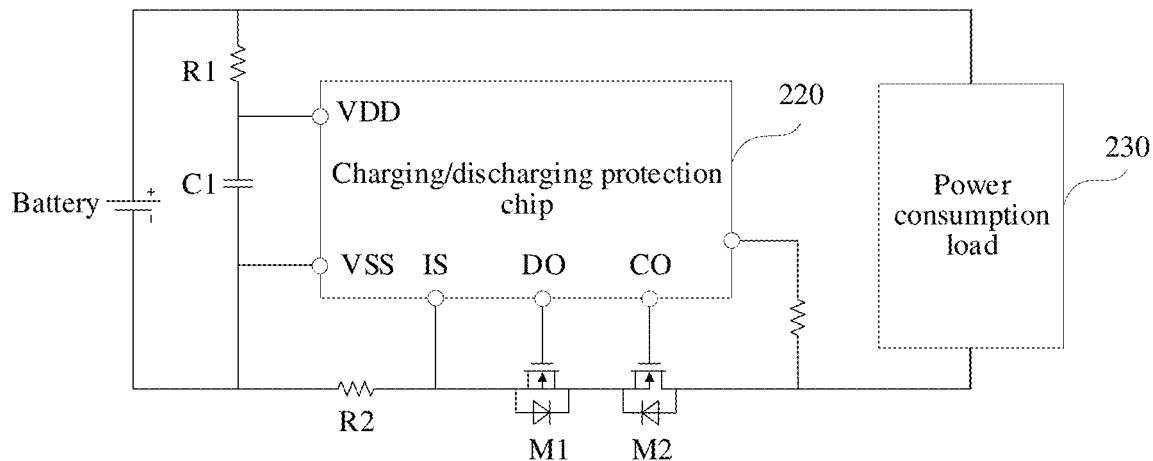
FIG. 3 is a schematic structural diagram of a charging/discharging protection chip according to an embodiment of this application.

The battery 210 is configured to store and release electric energy. The charging/discharging protection circuit 220 is configured to protect the battery 210, and may prevent over-charging and/or over-discharging from occurring in the battery 210. For example, as shown in FIG. 3, a charging/discharging protection circuit 220 includes a power supply end VDD, a grounding end VSS, a current sampling end IS, and a discharging control end DO. The power supply end VDD is connected to each of one end of a capacitor C1 and one end of a resistor R1, the other end of the resistor R1 is connected to a positive electrode of a battery, the grounding end VSS is connected to each of the other end of the capacitor C1, one end of a sampling resistor R2, and a negative electrode of the battery, the current sampling end IS is connected to each of the other end of the current sampling resistor R2 and a source of a metal oxide semiconductor field-effect transistor (metal oxide semiconductor, MOS) M1, the discharging control end DO is connected to a gate of the MOS transistor M1, a charging control end CO is connected to a gate of a MOS transistor M2, and a drain of the MOS transistor M1 is connected to a drain of the MOS transistor M2. When the battery 210 normally works, the charging/discharging protection circuit 220 controls, through the discharging control end DO and the charging control end CO, the MOS transistor M1 and the MOS transistor M2 respectively to be in a switched-on state. When detecting that the battery 210 is in an over-discharging state (when the battery 210 discharges, the output voltage of the battery 210 is gradually reduced, and when the output voltage of the battery 210 is reduced to an over-discharging protection voltage (that is, under-voltage protection threshold), the battery 210 is in the over-discharging state), the charging/discharging protection circuit 220 controls, through the discharging control end DO, the MOS transistor M1 to be switched off, a discharging loop of the battery 210 is cut off, and the battery 210 stops discharging. When detecting that the battery 210 is in an over-charging state (when the battery 210 is charged, the output voltage of the battery 210 is gradually increased, and when the output voltage of the battery 210 is increased to an over-charging protection voltage, the battery 210 is in the over-charging state), the charging/discharging protection circuit 220 controls, through the charging control end CO, the MOS transistor M2 to be switched off, a charging loop of the battery 210 is cut off, and the battery 210 is stopped from being charged.

Figure 4:
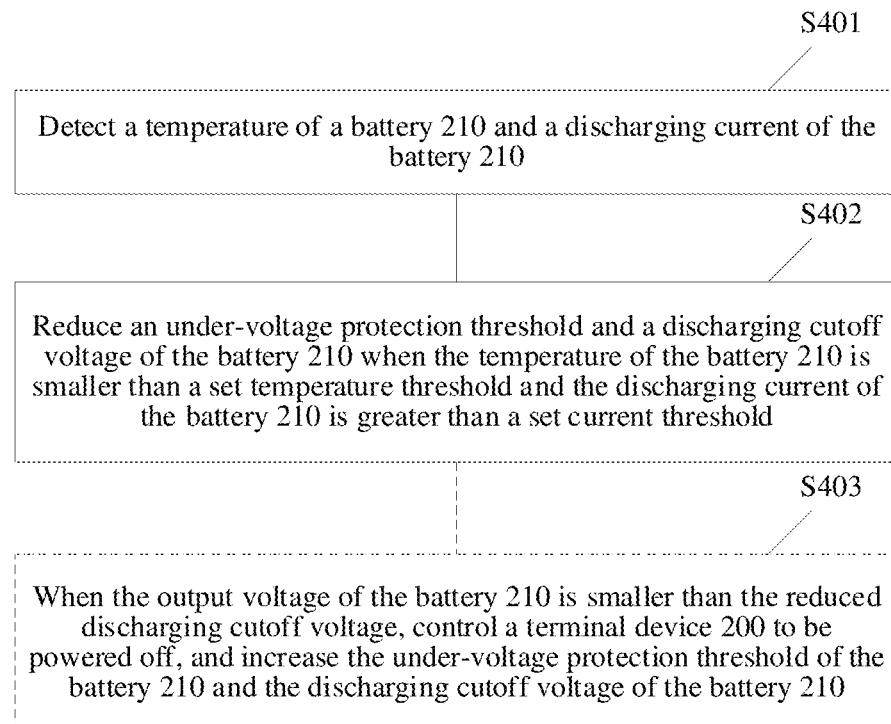
FIG. 4 is a schematic flowchart of a first battery discharging control method according to an embodiment of this application.

The power consumption load 230 is electronic components in the terminal device 200 whose functions are implemented in need of utilizing the electric energy provided by the battery 210, for example, a processor 231, sensors such as a temperature sensor 232, a gravity sensor, a distance sensor, and a fingerprint sensor, a display screen, and a radio frequency chip (not shown in FIG. 4).

Additionally, the terminal device 200 may further include a charging interface 240 connected to a corresponding power adapter, and obtain electric energy from an external power supply through the power adapter, to charge the battery 210. The charging interface 240 may be specifically a micro USB (abbreviation of universal serial bus) interface, a Type-C interface, a lightning (lightning) interface, or the like.

As shown in FIG. 4, an embodiment of this application provides a battery discharging control method, applicable to the terminal device shown in FIG. 2, and the method mainly includes the following steps:

S401: A terminal device 200 detects a temperature of a battery 210 and a discharging current of the battery 210.

S402: The terminal device 200 reduces an under-voltage protection threshold and a discharging cutoff voltage of the battery 210 when the temperature of the battery 210 is smaller than a set temperature threshold and the discharging current of the battery 210 is greater than a set current threshold.

The under-voltage protection threshold of the battery 210 is smaller than the discharging cutoff voltage of the battery 210, and the set temperature threshold may be 10° C. or may be 2° C. or 0° C. When the temperature of the battery 210 is smaller than the set temperature threshold and the discharging current of the battery 210 is greater than the set current threshold, the battery 210 discharges in a low temperature environment, and the output voltage of the battery 210 is close to the current set discharging cutoff voltage. If the under-voltage protection threshold and the discharging cutoff voltage of the battery 210 are not adjusted, the power consumption load 230 connected to the battery 210 is disconnected, and the power consumption load 230 cannot continue to work.

Further, after performing step S402, the terminal device 200 further performs step S403: When the output voltage of the battery 210 is smaller than the discharging cutoff voltage, control the terminal device 200 to be powered off (that is, disconnect the power consumption load 230 connected to the battery 210), and increase the under-voltage protection threshold of the battery 210 and the discharging cutoff voltage of the battery 210, to prevent the battery 210 from being damaged, thereby ensuring the service life and the service safety of the battery 210.

After the battery 210 in the terminal device 200 is disconnected from the power consumption load 230, the terminal device 200 is in a powered-off state, but the terminal device 200 still consumes the electric energy in the battery 210. If the under-voltage protection threshold of the battery 210 and the discharging cutoff voltage of the battery 210 are not increased, the battery 210 may be damaged in a scenario where the battery cannot be charged in time. Additionally, after the battery 210 is charged, the temperature of the battery 210 and/or the discharging current of the battery 210 is changed, and it is necessary to again determine, according to the current temperature of the battery 210 and the discharging current of the battery 210, whether the under-voltage protection threshold and the discharging cutoff voltage of the battery 210 need to be adjusted. For example, after the battery 210 is fully charged, if the discharging current of the battery 210 is relatively small, even if the temperature of the battery 210 is quite low, the under-voltage protection threshold and the discharging cutoff voltage of the battery 210 may not be adjusted.

Specifically, in step S403, the terminal device 200 may adjust the under-voltage protection threshold of the battery 210 to a first default value, and adjust the discharging cutoff voltage of the battery 210 to a second default value. The first default value is usually set to the under-voltage protection threshold of the battery 210 at the normal temperature, and the second default value is usually set to the discharging cutoff voltage of the battery 210 at the normal temperature.

Additionally, the terminal device 200 further compares the output voltage of the battery 210 and the under-voltage protection threshold of the battery 210, and controls, according to a comparison result, a discharging loop of the battery 210 to be switched on or switched off. When the output voltage of the battery 210 is greater than the under-voltage protection threshold of the battery 210, the terminal device 200 controls the discharging loop of the battery 210 to be switched on; and when the output voltage of the battery 210 is smaller than the under-voltage protection threshold of the battery 210, the terminal device 200 controls the discharging loop of the battery 210 to be switched off, to perform under-voltage protection.

Figure 5:
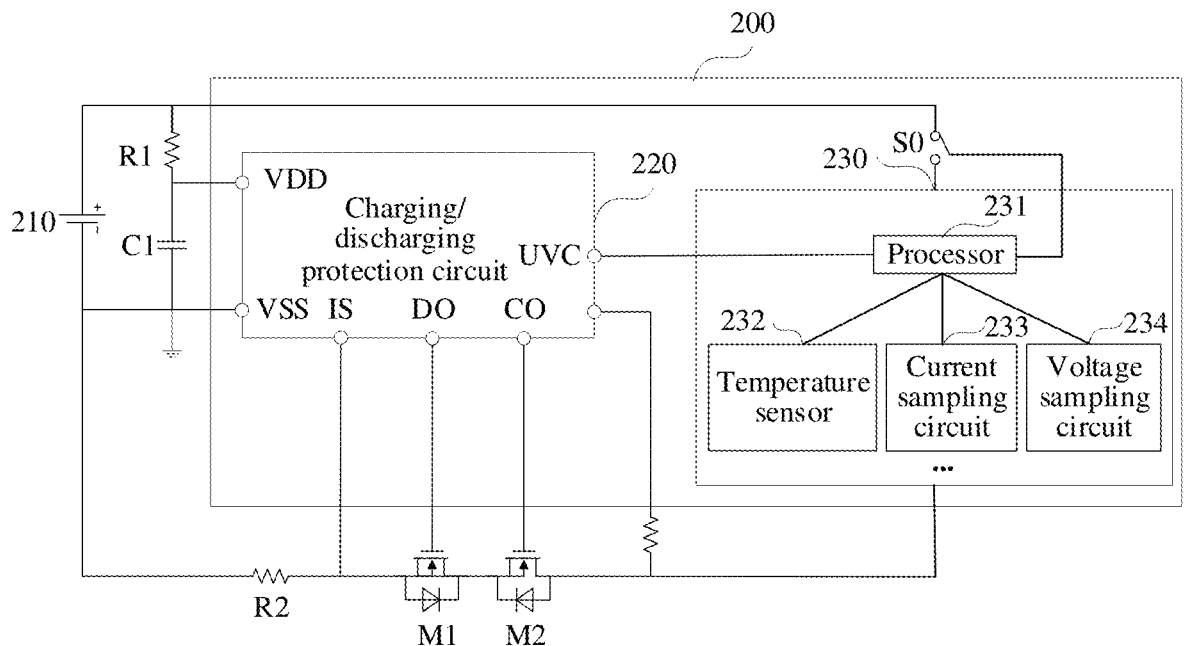
FIG. 5 is a second schematic structural diagram of a terminal device according to an embodiment of this application.

In a specific implementation, the terminal device 200 may control, through a processor 231 in the terminal device 200, a charging/discharging protection circuit 220 to adjust the under-voltage protection threshold of the battery 210, and adjust the discharging cutoff voltage of the battery 210 through the processor 231 in the terminal device. In this case, the terminal device 200 includes the processor 231 and the charging/discharging protection circuit 220. The charging/discharging protection circuit 220 includes a power supply end VDD, a grounding end VSS, and an under-voltage protection threshold control end UVC, where the power supply end VDD is connected to a positive electrode of the battery 210, the grounding end VSS is connected to a negative electrode of the battery 210, and the under-voltage protection threshold control end UVC is connected to the processor 231, as shown in FIG. 5.

The processor 231 is configured to: when a temperature of the battery 210 is smaller than a set temperature threshold and a discharging current of the battery 210 is greater than a set current threshold, reduce a discharging cutoff voltage of the battery and send a first control signal. Specifically, the processor 231 may reduce the discharging cutoff voltage of the battery 210 in the following manner: The processor 231 modifies a value of the stored discharging cutoff voltage from a first value to a second value, where the second value is smaller than the first value.

The charging/discharging protection circuit 220 is configured to receive the first control signal through the under-voltage protection threshold control end UVC and reduce an under-voltage protection threshold of the battery 210 under the control of the first control signal.

Specifically, the terminal device 200 further includes a temperature sensor 232 and a current sampling circuit 233. The processor 231 obtains the temperature of the battery 210 through the temperature sensor 232, obtains the discharging current of the battery 210 through the current sampling circuit 233, determines, according to the obtained temperature of the battery 210, whether the temperature of the battery 210 is smaller than the set temperature threshold, and determines, according to the obtained discharging current of the battery 210, whether the discharging current of the battery 210 is greater than the set current threshold.

Alternatively, when the charging/discharging protection circuit 220 includes a current sampling end IS and a current output end, the processor 231 may obtain, from the charging/discharging protection circuit 220 through the current output end on the charging/discharging protection circuit 220, the discharging current of the battery 210 detected by the current sampling end IS of the charging/discharging protection circuit 220. When the charging/discharging protection circuit 220 includes a temperature sampling end TS and a temperature output end, the processor 231 may alternatively obtain, from the charging/discharging protection circuit 220 through the temperature output end on the charging/discharging protection circuit 220, the temperature of the battery 210 detected by the temperature sampling end TS of the charging/discharging protection circuit 220.

Further, the processor 231 is further configured to: when an output voltage of the battery 210 is smaller than the discharging cutoff voltage of the battery 210, control the terminal device 200 to be powered off, increase the discharging cutoff voltage of the battery 210, and send a second control signal; and the charging/discharging protection circuit 220 is further configured to increase the under-voltage protection threshold of the battery 210 under the control of the second control signal.

Further, the charging/discharging protection circuit 220 further includes a discharging control end DO, and the charging/discharging protection circuit 220 is further configured to: compare the output voltage of the battery 210 and the under-voltage protection threshold of the battery 210 and output a third control signal through the discharging control end DO according to a comparison result, where the third control signal is used for controlling a discharging loop of the battery 210 to be switched on or switched off. When the output voltage of the battery 210 is greater than the under-voltage protection threshold of the battery 210, the third control signal is used for controlling the discharging loop of the battery 210 to be switched on; and when the output voltage of the battery 210 is smaller than the under-voltage protection threshold of the battery 210, the third control signal is used for controlling the discharging loop of the battery 210 to be switched off, to perform under-voltage protection.

Specifically, a switch S1 is connected to a path between the power consumption load 230 and the battery 210, and when the output voltage of the battery 210 is smaller than the discharging cutoff voltage of the battery 210, the terminal device 200 controls the switch S0 to be off, to disconnect the power consumption load 230 connected to the battery 210, and the terminal device 200 is powered off.

Figure 6A:
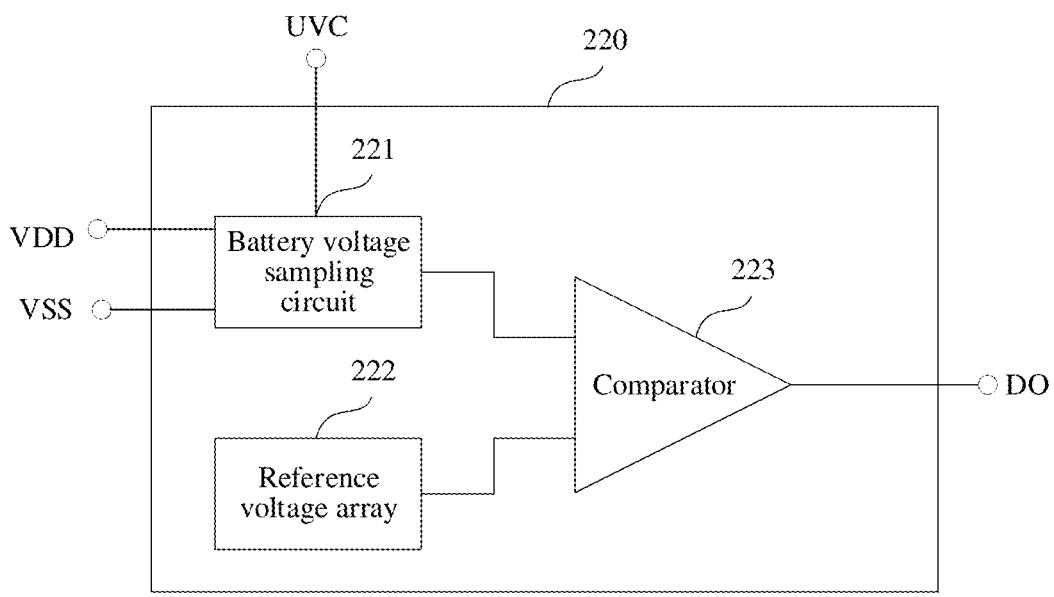
FIG. 6A is a first schematic structural diagram of a charging/discharging protection circuit according to an embodiment of this application.

In a specific implementation, the charging/discharging protection circuit 220 may be implemented in, but not limited to, any one of the following two manners:

First manner, as shown in FIG. 6A, the charging/discharging protection circuit includes a battery voltage sampling circuit 221, a reference voltage circuit 222, and a comparator 223, where the battery sampling circuit 221 is connected to each of the power supply end VDD, the grounding end VSS, the under-voltage protection threshold control end UVC, and a first input end of the comparator 223, the reference voltage circuit 222 is connected to a second input end of the comparator 223, and an output end of the comparator 223 is connected to the discharging control end DO.

The battery voltage sampling circuit 221 is configured to sample the output voltage of the battery 210 and increase a sampling voltage under the control of the first control signal;

an output voltage of the reference voltage circuit 222 is used for representing the under-voltage protection threshold of the battery 210; and the comparator 223 is configured to compare the output voltage of the reference voltage circuit 222 and the increased sampling voltage and output the third control signal according to a comparison result. Specifically, when the output voltage of the reference voltage circuit 222 is smaller than the increased sampling voltage, the third control signal is used for controlling the discharging loop of the battery 210 to be switched on; and when the output voltage of the reference voltage circuit 222 is greater than the increased sampling voltage, the third control signal is used for controlling the discharging loop of the battery 210 to be switched off.

The output voltage of the reference voltage circuit 222 is unchanged, while the output voltage of the battery voltage sampling circuit 221 (the sampling voltage of the battery 210) is increased. Therefore, the battery 210 may continue to discharge, until the increased sampling voltage of the battery 210 is smaller than the output voltage of the reference voltage circuit 222, which is equivalent to reducing the under-voltage protection threshold; and therefore, before the under-voltage protection threshold of the battery 210 is adjusted, the electric quantity in the battery 210 that cannot continue to be used because of the low temperature can be released and utilized by a power consumption load connected to the charging/discharging protection circuit 220.

When the output voltage of the battery 210 is smaller than the discharging cutoff voltage of the battery 210, the battery voltage sampling circuit 221 is further configured to reduce the sampling voltage under the control of the second control signal.

Figure 6B:
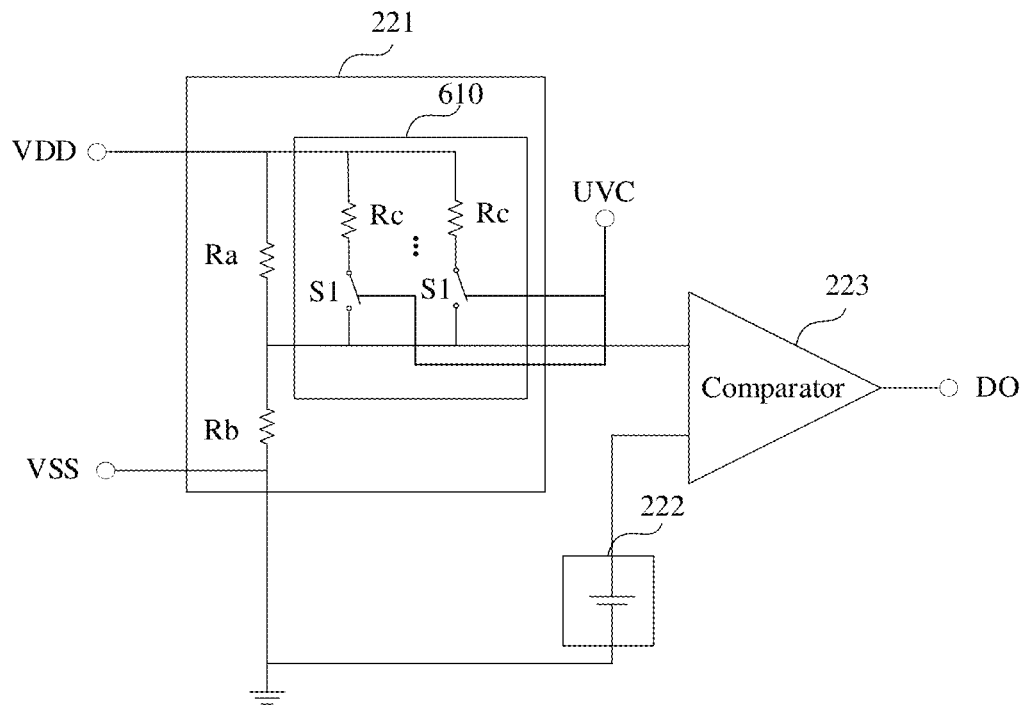
FIG. 6B is a second schematic structural diagram of a charging/discharging protection circuit according to an embodiment of this application.

Further, as shown in FIG. 6B, the battery voltage sampling circuit 221 may include a first voltage divider resistor Ra, a second voltage divider resistor Rb, and a switch resistor array 610, the switch resistor array 610 includes a plurality of branches connected to each other in parallel, and each branch includes a third voltage divider resistor Rc and a switch S1 connected to the third voltage divider resistor Rc in series. A first end of the first voltage divider resistor Ra is connected to each of the power supply end VDD and a first end of the switch resistor array 610, a second end of the first voltage divider resistor Ra is connected to each of a first end of the second voltage divider resistor Rb, a second end of the switch resistor array 610, and a first input end of a comparator 223, control ends of switches S1 in the switch resistor array 610 are connected to the under-voltage protection threshold control end UVC, and a second end of the second voltage divider resistor Rb is connected to the grounding end VSS; and the first control signal is used for controlling at least one switch S1 in the switch resistor array 610 to switch from a switched-off state to a switched-on state. After the at least one switch S1 in the switch resistor array 610 switches from the switched-off state to the switched-on state, the equivalent resistance of the switch resistor array 610 is reduced, a voltage between two ends of the second voltage divider resistor Rb is increased, and then the sampling voltage of the battery 210 is increased.

The second control signal is used for controlling at least one switch S1 in the switch resistor array 610 to switch from a switched-on state to a switched-off state. After the at least one switch S1 in the switch resistor array 610 switches from the switched-on state to the switched-off state, the equivalent resistance of the switch resistor array 610 is increased, a voltage between two ends of the second voltage divider resistor Rb is reduced, and then the sampling voltage of the battery 210 is reduced.

It should be noted that, each of the first voltage divider resistor Ra, the second voltage divider resistor Rb, and the third voltage divider resistor Rc involved in FIG. 6B may be a single resistor or may be obtained by connecting a plurality of resistors in series, in parallel, or in series and parallel, and third voltage divider resistors Rc included in all branches in the switch resistor array 610 may be the same or different in size. The switch S1 involved in FIG. 6B may be a controllable switch such as a triode or a MOS transistor. Additionally, the plurality of branches in the switch resistor array 610 may alternatively share a single-pole multi-throw switch.

Further, as shown in FIG. 6B, the reference voltage circuit 222 may be a voltage source.

Figure 7A:
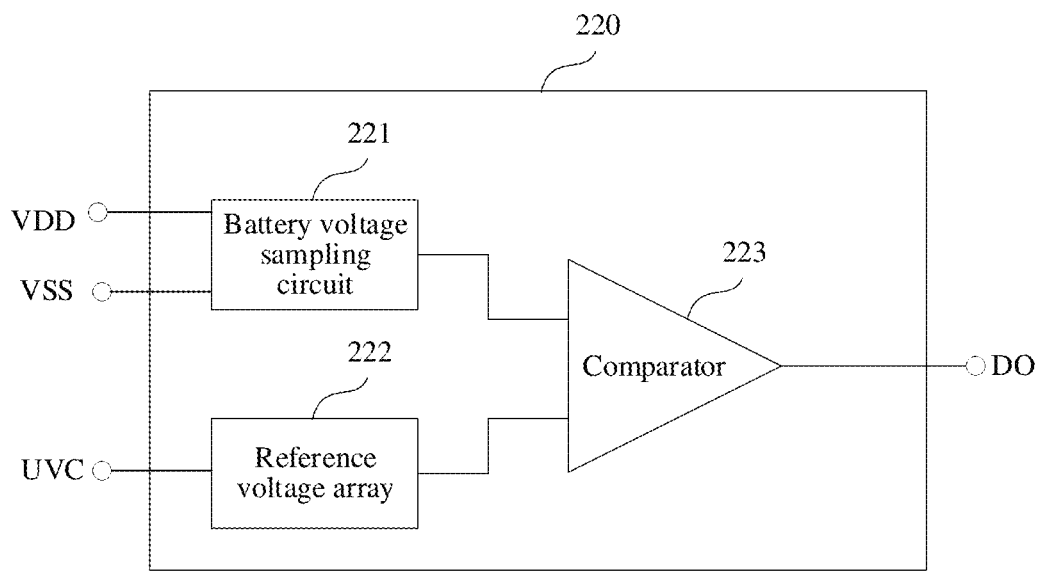
FIG. 7A is a third schematic structural diagram of a charging/discharging protection circuit according to an embodiment of this application.

Second manner, as shown in FIG. 7A, the under-voltage protection control circuit 220 includes a battery voltage sampling circuit 221, a reference voltage circuit 222, and a comparator 223, where the battery sampling circuit 221 is connected to each of the power supply end VDD, the grounding end VSS, and a first input end of the comparator 223, the reference voltage circuit 222 is connected to each of a second input end of the comparator 223 and the under-voltage protection threshold control end UVC, and an output end of the comparator is connected to the discharging control end.

The battery voltage sampling circuit 221 is configured to sample the voltage of the battery 210.

The reference voltage circuit 222 is configured to reduce an output voltage of the reference voltage circuit 222 under the control of the first control signal, where the output voltage of the reference voltage circuit 222 is used for representing the under-voltage protection threshold of the battery 210.

The comparator 223 is configured to compare an output voltage of the battery voltage sampling circuit 221 and the output voltage of the reference voltage circuit 222 and output the third control signal according to a comparison result. Specifically, when the output voltage of the battery voltage sampling circuit 221 is greater than the output voltage of the reference voltage circuit 222, the third control signal is used for controlling the discharging loop of the battery 210 to be switched on; and when the output voltage of the battery voltage sampling circuit 221 is smaller than the output voltage of the reference voltage circuit 222, the third control signal is used for controlling the discharging loop of the battery 210 to be switched off.

The output voltage of the reference voltage circuit 222 is reduced under the control of the first control signal. Therefore, the battery 210 may continue to discharge until the output voltage of the battery voltage sampling circuit 221 is smaller than the output voltage of the reference voltage circuit 222; and therefore, before the under-voltage protection threshold of the battery 210 is adjusted, the electric quantity in the battery 210 that cannot continue to be used because of the low temperature can be released and utilized by a power consumption load connected to the charging/discharging protection circuit 220.

When the output voltage of the battery 210 is smaller than the discharging cutoff voltage of the battery 210, the reference voltage circuit 222 is further configured to increase the output voltage of the reference voltage circuit 222 under the control of the second control signal.

Figure 7B:
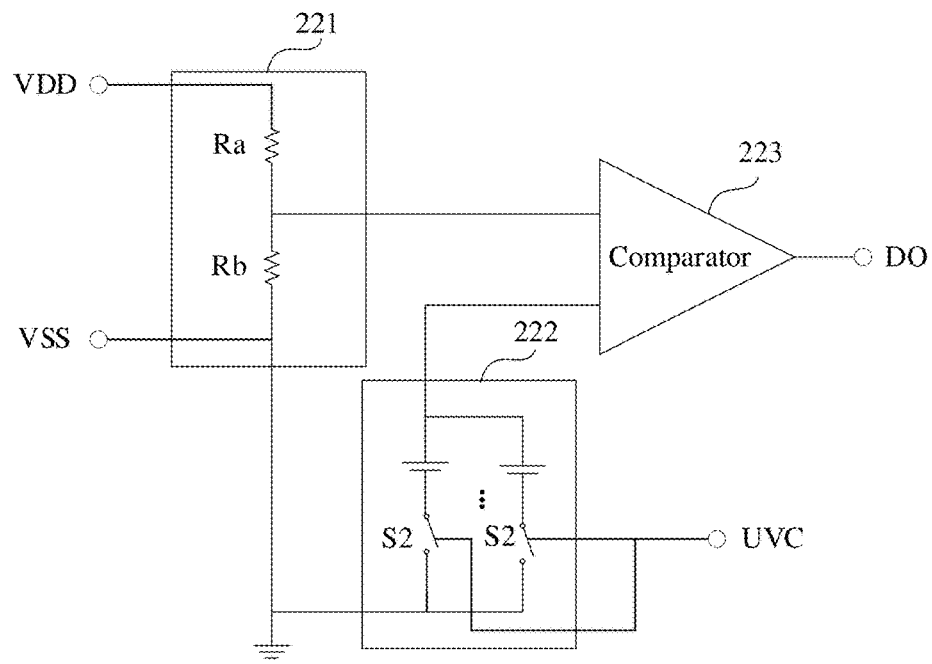
FIG. 7B is a fourth schematic structural diagram of a charging/discharging protection circuit according to an embodiment of this application.

Further, as shown in FIG. 7B, the battery voltage sampling circuit 221 includes a first sampling resistor Ra and a second sampling resistor Rb, where a first end of the first voltage divider resistor Ra is connected to the power supply end VDD, a second end of the first voltage divider resistor Ra is connected to each of a first end of the second voltage divider resistor Rb and a first input end of a comparator 223, and a second end of the second voltage divider resistor Rb is connected to the grounding end VSS.

Further, as shown in FIG. 7B, the reference voltage circuit 222 includes a plurality of branches connected to each other in parallel, and each branch includes a voltage source and a switch S2 connected to the voltage source in series. A first end of the reference voltage circuit 222 is grounded, a second end of the reference voltage circuit 222 is connected to the second input end of the comparator 223, and control ends of the switches in the reference voltage circuit 222 are connected to the under-voltage protection threshold control end UVC; and the first control signal is used for controlling a first switch in the reference voltage circuit 222 to switch from a switched-on state to a switched-off state and controlling a second switch in the reference voltage circuit 222 to switch from a switched-off state to a switched-on state, and a voltage of a voltage source connected to the first switch in series is greater than a voltage of a voltage source connected to the second switch in series.

The second control signal is used for controlling the first switch in the reference voltage circuit 222 to switch from the switched-off state to the switched-on state and controlling the second switch in the reference voltage circuit 222 to switch from the switched-on state to the switched-off state.

It should be noted that, each of the first voltage divider resistor Ra and the second voltage divider resistor Rb involved in FIG. 7B may be a single resistor or may be obtained by connecting a plurality of resistors in series, in parallel, or in series and parallel. The switch S2 involved in FIG. 7B may be a controllable switch such as a triode or a MOS transistor. Additionally, the plurality of branches in the reference voltage circuit 222 may alternatively share a single-pole multi-throw switch.

In another specific implementation, the terminal device 200 may adjust the under-voltage protection threshold of the battery 210 through the charging/discharging protection circuit 220 in the terminal device, and adjust the discharging cutoff voltage of the battery 210 through the processor 231. In this case, the terminal device 200 includes the processor 231 and the charging/discharging protection circuit 220, where the processor 231 is configured to reduce a discharging cutoff voltage of the battery 210 when a temperature of the battery 210 is smaller than a set temperature threshold and a discharging current of the battery 210 is greater than a set current threshold; and the charging/discharging protection circuit 220 is configured to reduce an under-voltage protection threshold of the battery 210 connected to the charging/discharging protection circuit 220 when the temperature of the battery 210 is smaller than the set temperature threshold and the discharging current of the battery 210 is greater than the set current threshold, as shown in FIG. 8.

Further, the processor 231 is further configured to: when an output voltage of the battery 210 is smaller than the discharging cutoff voltage of the battery 210, control the terminal device 200 to be powered off, and increase the discharging cutoff voltage of the battery 210; and the charging/discharging protection circuit 220 is further configured to increase the under-voltage protection threshold of the battery 210 when an output voltage of the battery 210 is smaller than a discharging cutoff voltage of the battery 210 and after the terminal device 200 is powered off.

Figure 8:
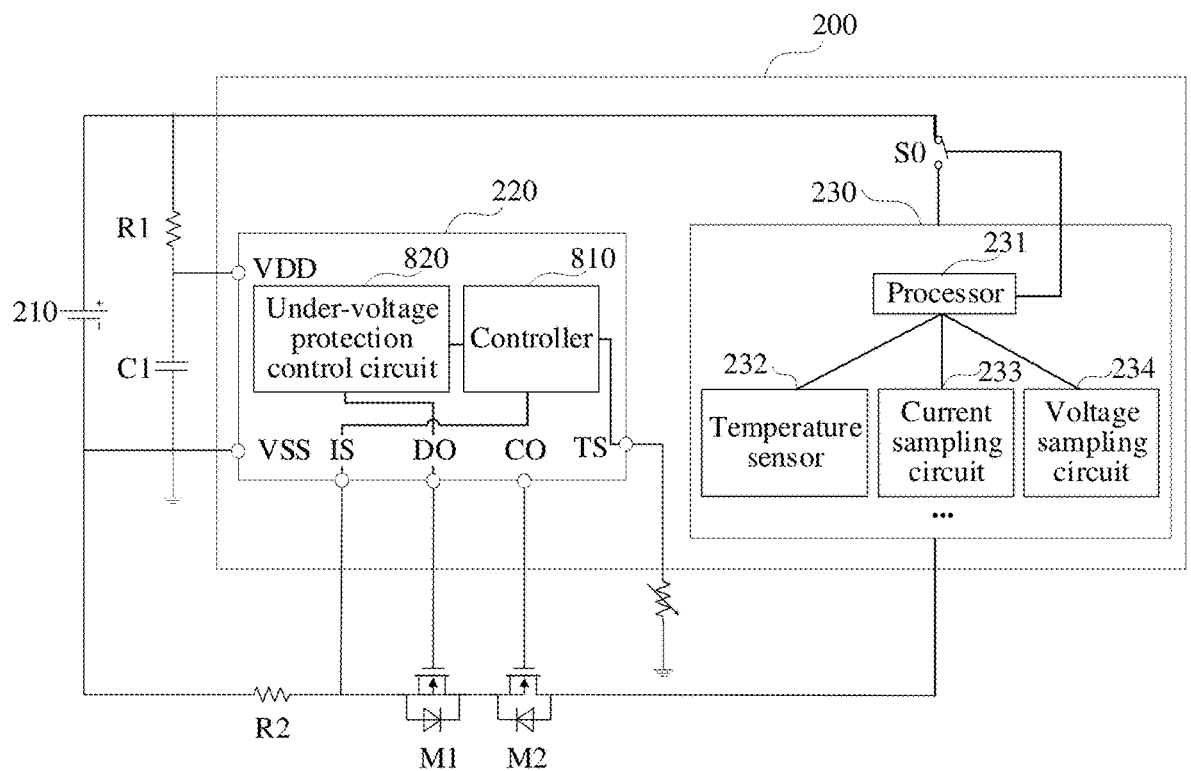
FIG. 8 is a third schematic structural diagram of a terminal device according to an embodiment of this application.

In a specific implementation, as shown in FIG. 8, the charging/discharging protection circuit 220 includes: a power supply end VDD, a grounding end VSS, a temperature sampling end TS, a current sampling end IS, a controller 810, and an under-voltage protection control circuit 820, where the power supply end VDD is connected to a positive electrode of the battery 210, the grounding end VDD is connected to a negative electrode of the battery 210, and the controller 810 is connected to each of the under-voltage protection control circuit 820, the temperature sampling end TS, and the current sampling end IS.

The controller 810 is configured to obtain a temperature of the battery 210 through the temperature sampling end TS and obtain a discharging current of the battery 210 through the current sampling end IS; and send a first control signal when the temperature of the battery 210 is smaller than a set temperature threshold and the discharging current of the battery 210 is greater than a set current threshold.

The under-voltage protection control circuit 820 is configured to reduce an under-voltage protection threshold of the battery 210 under the control of the first control signal.

It should be understood that, functions of the controller 810 may be implemented through software, that is, the controller 810 may implement the functions of the controller 810 by invoking code instructions stored in a memory (not shown) in the charging/discharging protection circuit 220; or functions of the controller 810 may be implemented through hardware, for example, a comparator.

Further, the charging/discharging protection circuit 220 further includes a discharging control end DO, and the under-voltage protection control circuit 820 is further configured to: compare the output voltage of the battery 210 and the under-voltage protection threshold of the battery 210 and output a third control signal through the discharging control end DO according to a comparison result, where the third control signal is used for controlling a discharging loop of the battery 210 to be switched on or switched off. When the output voltage of the battery 210 is greater than the under-voltage protection threshold of the battery 210, the third control signal is used for controlling the discharging loop of the battery 210 to be switched on; and when the output voltage of the battery 210 is smaller than the under-voltage protection threshold of the battery 210, the third control signal is used for controlling the discharging loop of the battery 210 to be switched off, to perform under-voltage protection.

In a specific implementation, the under-voltage protection control circuit 820 may be specifically implemented through, but not limited to, the structure shown in FIG. 6A or FIG. 7A. When the under-voltage protection control circuit 820 is implemented through the structure shown in FIG. 6A, the battery voltage sampling circuit and the reference voltage circuit in the under-voltage protection control circuit 820 may be specifically implemented through the structure shown in FIG. 6B. When the under-voltage protection control circuit 820 is implemented through the structure shown in FIG. 7A, the battery voltage sampling circuit and the reference voltage circuit in the under-voltage protection control circuit 820 may be specifically implemented through the structure shown in FIG. 7B. Details are not described herein again.

Through the foregoing solution, when the temperature of the battery 210 is smaller than the set temperature threshold and the discharging current of the battery 210 is greater than the set current threshold, the terminal device 200 reduces the under-voltage protection threshold of the battery 210 and the discharging cutoff voltage of the battery 210, to enable the battery 210 to continue to discharge, until the output voltage of the battery 210 is smaller than the reduced under-voltage protection threshold; and therefore, before the under-voltage protection threshold of the battery 210 is adjusted, the electric quantity in the battery 210 that cannot continue to be used because of the low temperature can be released, so that the terminal device 200 may continue to work, thereby improving the endurance capability of the terminal device 200.

Based on the foregoing embodiments, an embodiment of this application further provides a charging/discharging protection circuit 220, to adjust an under-voltage protection threshold of a battery in a low temperature environment.

In a possible implementation, as shown in FIG. 5, the charging/discharging protection circuit 220 includes a power supply end VDD, a grounding end VSS, and an under-voltage protection threshold control end UVC. The power supply end VDD is connected to a positive electrode of a battery 210, the grounding end VSS is connected to a negative electrode of the battery 210, and the under-voltage protection threshold control end UVC is configured to receive a first control signal. The charging/discharging protection circuit is configured to reduce an under-voltage protection threshold of the battery 210 under the control of the first control signal when the temperature of the battery 210 is smaller than a set temperature threshold and the discharging current of the battery 210 is greater than a set current threshold.

Further, the under-voltage protection threshold control end UVC is further configured to receive a second control signal; and the charging/discharging protection circuit 220 is further configured to increase the under-voltage protection threshold of the battery 210 under the control of the second control signal when an output voltage of the battery 210 is smaller than a discharging cutoff voltage of the battery 210.

Further, the charging/discharging protection circuit 220 further includes a discharging control end DO, where the discharging control end DO is configured to output a third control signal. The charging/discharging protection circuit 220 is further configured to: compare the output voltage of the battery and the under-voltage protection threshold of the battery and output the third control signal according to a comparison result, where the third control signal is used for controlling a discharging loop of the battery to be switched on or switched off.

In a specific implementation, the charging/discharging protection circuit 220 may be specifically implemented through, but not limited to, the structure shown in FIG. 6A or FIG. 7A. When the charging/discharging protection circuit 220 is implemented through the structure shown in FIG. 6A, the battery voltage sampling circuit and the reference voltage circuit in the charging/discharging protection circuit 220 may be specifically implemented through the structure shown in FIG. 6B. When the charging/discharging protection circuit 220 is implemented through the structure shown in FIG. 7A, the battery voltage sampling circuit and the reference voltage circuit in the charging/discharging protection circuit 220 may be specifically implemented through the structure shown in FIG. 7B. Details are not described herein again.

In another possible implementation, as shown in FIG. 8, the charging/discharging protection circuit 220 includes: a power supply end VDD, a grounding end VSS, a temperature sampling end TS, a current sampling end IS, a controller 810, and an under-voltage protection control circuit 820, where the power supply end VDD is connected to a positive electrode of the battery 210, the grounding end VDD is connected to a negative electrode of the battery 210, and the controller 810 is connected to each of the under-voltage protection control circuit 820, the temperature sampling end TS, and the current sampling end IS. The controller 810 is configured to obtain a temperature of the battery 210 through the temperature sampling end TS and obtain a discharging current of the battery 210 through the current sampling end IS; and send a first control signal when the temperature of the battery 210 is smaller than a set temperature threshold and the discharging current of the battery 210 is greater than a set current threshold. The under-voltage protection control circuit 820 is configured to reduce an under-voltage protection threshold of the battery 210 under the control of the first control signal.

Further, the controller 810 is further configured to send a second control signal when an output voltage of the battery 210 is smaller than a discharging cutoff voltage of the battery 210; and the under-voltage protection control circuit 820 is further configured to increase the under-voltage protection threshold of the battery 210 under the control of the second control signal.

Further, the charging/discharging protection circuit 220 further includes a discharging control end DO, where the discharging control end DO is connected to the under-voltage protection control circuit 820; and the under-voltage protection control circuit 820 is further configured to: compare the output voltage of the battery 210 and the under-voltage protection threshold of the battery 210 and output a third control signal through the discharging control end DO according to a comparison result, where the third control signal is used for controlling a discharging loop of the battery 210 to be switched on or switched off.

In a specific implementation, the under-voltage protection control circuit 820 may be specifically implemented through, but not limited to, the structure shown in FIG. 6A or FIG. 7A. When the under-voltage protection control circuit 820 is implemented through the structure shown in FIG. 6A, the battery voltage sampling circuit and the reference voltage circuit in the under-voltage protection control circuit 820 may be specifically implemented through the structure shown in FIG. 6B. When the under-voltage protection control circuit 820 is implemented through the structure shown in FIG. 7A, the battery voltage sampling circuit and the reference voltage circuit in the under-voltage protection control circuit 820 may be specifically implemented through the structure shown in FIG. 7B. Details are not described herein again.

Figure 9A:
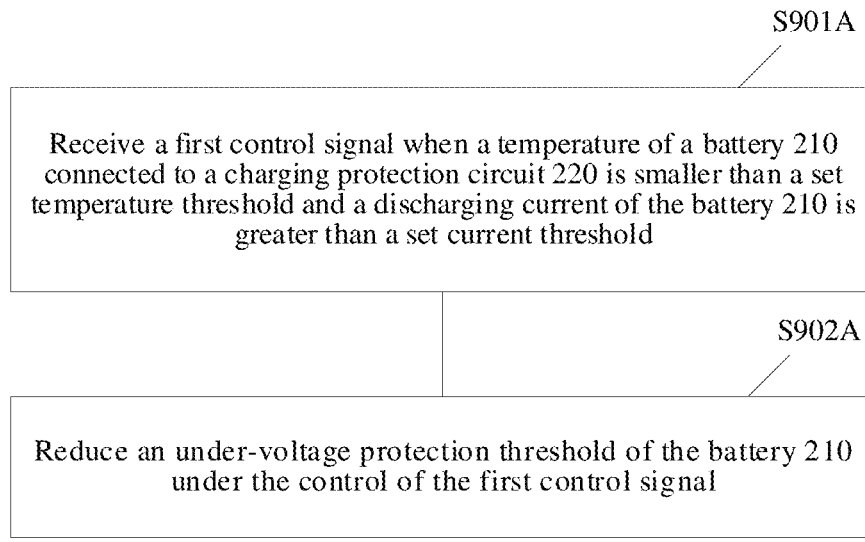
FIG. 9A is a schematic flowchart of a second battery discharging control method according to an embodiment of this application.

An embodiment of this application further provides a battery discharging control method, applicable to the foregoing first charging/discharging protection circuit 220, that is, the battery 210 works in a low temperature environment, and the charging/discharging protection circuit 220 adjusts the under-voltage protection threshold of the battery 210 through a control signal received from outside. As shown in FIG. 9A, the method includes:

S901A: Receive a first control signal when a temperature of a battery 210 connected to a charging protection circuit 220 is smaller than a set temperature threshold and a discharging current of the battery 210 is greater than a set current threshold.

S902A: Reduce an under-voltage protection threshold of the battery 210 under the control of the first control signal.

Further, the charging/discharging protection circuit 220 further receives a second control signal when an output voltage of the battery 210 is smaller than a discharging cutoff voltage of the battery 210 and increases the under-voltage protection threshold of the battery 210 under the control of the second control signal.

Further, the charging/discharging protection circuit 220 further compares the output voltage of the battery 210 and the under-voltage protection threshold of the battery 210 and outputs a third control signal according to a comparison result, where the third control signal is used for controlling a discharging loop of the battery 210 to be switched off or switched on. When the output voltage of the battery 210 is greater than the under-voltage protection threshold of the battery 210, the third control signal is used for controlling the discharging loop of the battery 210 to be switched on; and when the output voltage of the battery 210 is smaller than the under-voltage protection threshold of the battery 210, the third control signal is used for controlling the discharging loop of the battery 210 to be switched off.

Figure 9B:
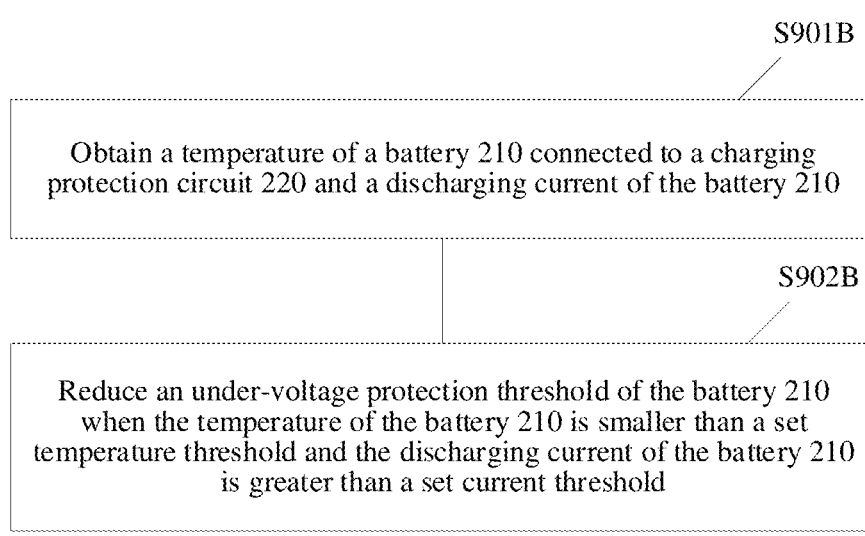
FIG. 9B is a schematic flowchart of a third battery discharging control method according to an embodiment of this application.

An embodiment of this application further provides a battery discharging control method, applicable to the foregoing second charging/discharging protection circuit 220, that is, the battery 210 works in a low temperature environment, and the charging/discharging protection circuit 220 adjusts the under-voltage protection threshold of the battery 210 by itself. As shown in FIG. 9B. The method includes:

S901B: Obtain a temperature of a battery 210 connected to a charging protection circuit 220 and a discharging current of the battery 210.

S901B: Reduce an under-voltage protection threshold of the battery 210 when the temperature of the battery 210 is smaller than a set temperature threshold and the discharging current of the battery 210 is greater than a set current threshold.

Further, the charging/discharging protection circuit 220 further increases the under-voltage protection threshold of the battery 210 when an output voltage of the battery 210 is smaller than a discharging cutoff voltage of the battery 210.

Further, the charging/discharging protection circuit 220 compares the output voltage of the battery 210 and the under-voltage protection threshold of the battery 210 and outputs a third control signal according to a comparison result, where the third control signal is used for controlling a discharging loop of the battery 210 to be switched off or switched on.

Through the foregoing solution, when the temperature of the battery 210 is smaller than the set temperature threshold and the discharging current of the battery 210 is greater than the set current threshold, the charging/discharging protection circuit 220 reduces the under-voltage protection threshold of the battery 210, to enable the battery 210 to continue to discharge, until the output voltage of the battery 210 is smaller than the reduced under-voltage protection threshold; and therefore, before the under-voltage protection threshold of the battery 210 is adjusted, the electric quantity in the battery 210 that cannot continue to be used because of the low temperature can be released and utilized by a load connected to the charging/discharging protection circuit 220.

The battery in the terminal device needs to cyclically perform a charging/discharging process when the terminal device works, and the battery is aging (for example, electrolyte fluid in the battery is reduced). As a result, the internal resistance R of the battery is increased. The output voltage of the battery is $U_o=V_{DD}-IR$. Therefore, compared with the new battery, the output voltage of the aged battery is reduced. However, currently, the under-voltage protection threshold and the discharging cutoff voltage of the battery are usually set according to the performance of the new battery at the normal temperature. Compared with the electric quantity of the battery remaining when the battery changes from the output voltage to the discharging cutoff voltage at the normal temperature, when the output voltage of the aged battery reaches the discharging cutoff voltage of the battery that is set at the normal temperature, the aged battery further has a more electric quantity, but the power consumption load connected to the battery cannot continue to obtain electric energy from the battery. As a result, the electric quantity of the battery cannot be effectively utilized.

Figure 10:
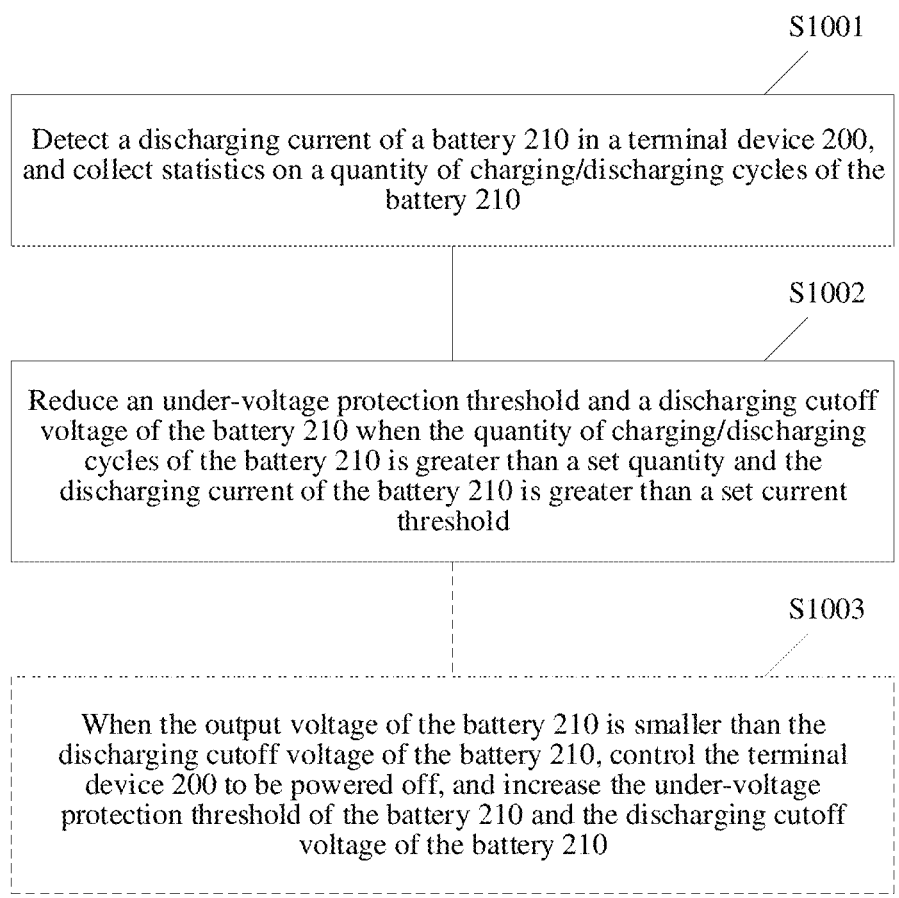
FIG. 10 is a schematic flowchart of a fourth battery discharging control method according to an embodiment of this application.

Therefore, to further improve a utilization rate of an electric quantity of a battery, this application further provides a battery discharging control method, applicable to the terminal device shown in FIG. 2. As shown in FIG. 10, the method mainly includes the following steps:

S1001: A terminal device 200 detects a discharging current of a battery 210 in the terminal device 200, and collects statistics on a quantity of charging/discharging cycles of the battery 210.

The quantity of charging/discharging cycles of the battery 210 may represent the aging extent of the battery 210, and a larger quantity of charging/discharging cycles of the battery 210 indicates a severer aging extent of the battery 210.

S1002: The terminal device 200 reduces an under-voltage protection threshold of the battery 210 and a discharging cutoff voltage of the battery 210 when the quantity of charging/discharging cycles of the battery 210 is greater than a set quantity and the discharging current of the battery 210 is greater than a set current threshold.

The under-voltage protection threshold of the battery 210 is smaller than the discharging cutoff voltage of the battery 210, and the set quantity may be 500 or may be 600 or 450, and may be specifically set according to an actual situation. When the quantity of charging/discharging cycles of the battery 210 is greater than the set quantity and the discharging current of the battery 210 is greater than the set current threshold, the battery 210 is aging, and the output voltage of the battery 210 is close to the current set discharging cutoff voltage. If the under-voltage protection threshold and the discharging cutoff voltage of the battery 210 are not adjusted, the power consumption load 230 connected to the battery 210 is disconnected, and the power consumption load 230 cannot continue to work.

Further, the terminal device 200 further performs step S1003: When the output voltage of the battery 210 is smaller than the reduced discharging cutoff voltage, control the terminal device 200 to be powered off (that is, disconnect the power consumption load 230 connected to the battery 210), and increase the under-voltage protection threshold of the battery 210 and the discharging cutoff voltage of the battery 210, to prevent the battery 210 from being damaged, thereby ensuring the service life and the service safety of the battery 210.

After the battery 210 in the terminal device 200 is disconnected from the power consumption load 230, the terminal device 200 is in a powered-off state, but the terminal device 200 still consumes the electric energy in the battery 210. If the under-voltage protection threshold of the battery 210 and the discharging cutoff voltage of the battery 210 are not increased, the battery 210 may be damaged in a scenario where the battery cannot be charged in time. Additionally, after the battery 210 is charged, the discharging current of the battery 210 is changed, and it is necessary to again determine, according to the current quantity of charging/discharging cycles of the battery 210 and the discharging current of the battery 210, whether the under-voltage protection threshold and the discharging cutoff voltage of the battery 210 need to be adjusted. For example, after the battery 210 is fully charged, if the discharging current of the battery 210 is relatively small, even if the quantity of charging/discharging cycles of the battery 210 is relatively large, the under-voltage protection threshold and the discharging cutoff voltage of the battery 210 may not be adjusted.

Specifically, in step S1003, the terminal device 200 may adjust the under-voltage protection threshold of the battery 210 to a first default value, and adjust the discharging cutoff voltage of the battery 210 to a second default value. The first default value is usually set to the under-voltage protection threshold of the battery 210 when being a new battery (having not aged), and the second default value is usually set to the discharging cutoff voltage of the battery 210 when being a new battery (having not aged).

Additionally, the terminal device 200 further compares the output voltage of the battery 210 and the under-voltage protection threshold of the battery 210, and controls, according to a comparison result, a discharging loop of the battery 210 to be switched on or switched off. When the output voltage of the battery 210 is greater than the under-voltage protection threshold of the battery 210, the discharging loop of the battery 210 is controlled to be switched on; and when the output voltage of the battery 210 is smaller than the under-voltage protection threshold of the battery 210, the discharging loop of the battery 210 is controlled to be switched off, to perform under-voltage protection.

In a specific implementation, the terminal device 200 may control, through a processor 231 in the terminal device 200, a charging/discharging protection circuit 220 to adjust the under-voltage protection threshold of the battery 210, and adjust the discharging cutoff voltage of the battery 210 through the processor 231 in the terminal device. In this case, the terminal device 200 includes the processor 231 and the charging/discharging protection circuit 220. The charging/discharging protection circuit 220 includes a power supply end VDD, a grounding end VSS, and an under-voltage protection threshold control end UVC, where the power supply end VDD is connected to a positive electrode of the battery 210, the grounding end VSS is connected to a negative electrode of the battery 210, and the under-voltage protection threshold control end UVC is connected to the processor 231, as shown in FIG. 5.

The processor 231 is configured to: when a quantity of charging/discharging cycles of the battery 210 is greater than a set quantity and a discharging current of the battery 210 is greater than a set current threshold, reduce a discharging cutoff voltage of the battery 210 and send a first control signal. Specifically, the processor 231 may reduce the discharging cutoff voltage of the battery 210 in the following manner: The processor 231 modifies a value of the stored discharging cutoff voltage from a first value to a second value, where the second value is smaller than the first value.

The charging/discharging protection circuit 220 is configured to receive the first control signal through the under-voltage protection threshold control end UVC and reduce an under-voltage protection threshold of the battery 210 under the control of the first control signal.

Specifically, the terminal device 200 further includes a current sampling circuit 233. The processor 231 obtains the discharging current of the battery 210 through the current sampling circuit 233, and determines, according to the obtained discharging current of the battery 210, whether the discharging current of the battery 210 is greater than the set current threshold. Alternatively, when the charging/discharging protection circuit 220 includes a current sampling end IS and a current output end, and the current output end is configured to transmit the discharging current of the battery 210 to the processor 231, the processor 231 may obtain, through the current output end on the charging/discharging protection circuit 220, the discharging current of the battery 210 detected by the current sampling end IS of the charging/discharging protection circuit 220.

Further, the processor 231 is further configured to: when an output voltage of the battery 210 is smaller than the discharging cutoff voltage of the battery 210, control the terminal device 200 to be powered off, increase the discharging cutoff voltage of the battery 210, and send a second control signal; and the charging/discharging protection circuit 220 is further configured to increase the under-voltage protection threshold of the battery 210 under the control of the second control signal.

Specifically, the terminal device 200 further includes a voltage sampling circuit 234. The processor 231 obtains the output voltage of the battery 210 through the voltage sampling circuit 234, and determines, according to the obtained output voltage of the battery 210, whether the output voltage of the battery 210 is smaller than the discharging cutoff voltage of the battery 210.

Further, the charging/discharging protection circuit 220 further includes a discharging control end DO, and the charging/discharging protection circuit 220 is further configured to: compare the output voltage of the battery 210 and the under-voltage protection threshold of the battery 210 and output a third control signal through the discharging control end DO according to a comparison result, where the third control signal is used for controlling a discharging loop of the battery 210 to be switched on or switched off. When the output voltage of the battery 210 is greater than the under-voltage protection threshold of the battery 210, the third control signal is used for controlling the discharging loop of the battery 210 to be switched on; and when the output voltage of the battery 210 is smaller than the under-voltage protection threshold of the battery 210, the third control signal is used for controlling the discharging loop of the battery 210 to be switched off, to perform under-voltage protection.

Specifically, a switch S1 is connected to a path between the power consumption load 230 and the battery 210, and when the output voltage of the battery 210 is smaller than the discharging cutoff voltage of the battery 210, the terminal device 200 controls the switch S0 to be off, to disconnect the power consumption load 230 connected to the battery 210, and the terminal device 200 is powered off.

In a specific implementation, the charging/discharging protection circuit 220 may be specifically implemented through, but not limited to, the structure shown in FIG. 6A or FIG. 7A. When the charging/discharging protection circuit 220 is implemented through the structure shown in FIG. 6A, the battery voltage sampling circuit and the reference voltage circuit in the charging/discharging protection circuit 220 may be specifically implemented through the structure shown in FIG. 6B. When the charging/discharging protection circuit 220 is implemented through the structure shown in FIG. 7A, the battery voltage sampling circuit and the reference voltage circuit in the charging/discharging protection circuit 220 may be specifically implemented through the structure shown in FIG. 7B. Details are not described herein again.

In another specific implementation, the terminal device 200 may adjust the under-voltage protection threshold of the battery 210 through the charging/discharging protection circuit 220 in the terminal device, and adjust the discharging cutoff voltage of the battery 210 through the processor 231. In this case, the terminal device 200 includes the processor 231 and the charging/discharging protection circuit 220, where the processor 231 is configured to reduce a discharging cutoff voltage of the battery 210 when a quantity of charging/discharging cycles of the battery 210 is greater than a set quantity and a discharging current of the battery 210 is greater than a set current threshold; and the charging/discharging protection circuit 220 is configured to reduce an under-voltage protection threshold of the battery 210 connected to the charging/discharging protection circuit 220 when the quantity of charging/discharging cycles of the battery 210 is greater than the set quantity and the discharging current of the battery 210 is greater than the set current threshold, as shown in FIG. 11.

Further, the processor 231 is further configured to: when an output voltage of the battery 210 is smaller than the discharging cutoff voltage of the battery 210, control the terminal device 200 to be powered off, and increase the discharging cutoff voltage of the battery 210; and the charging/discharging protection circuit 220 is further configured to increase the under-voltage protection threshold of the battery 210 when an output voltage of the battery 210 is smaller than a discharging cutoff voltage of the battery 210 and after the terminal device 200 is powered off.

Figure 11:
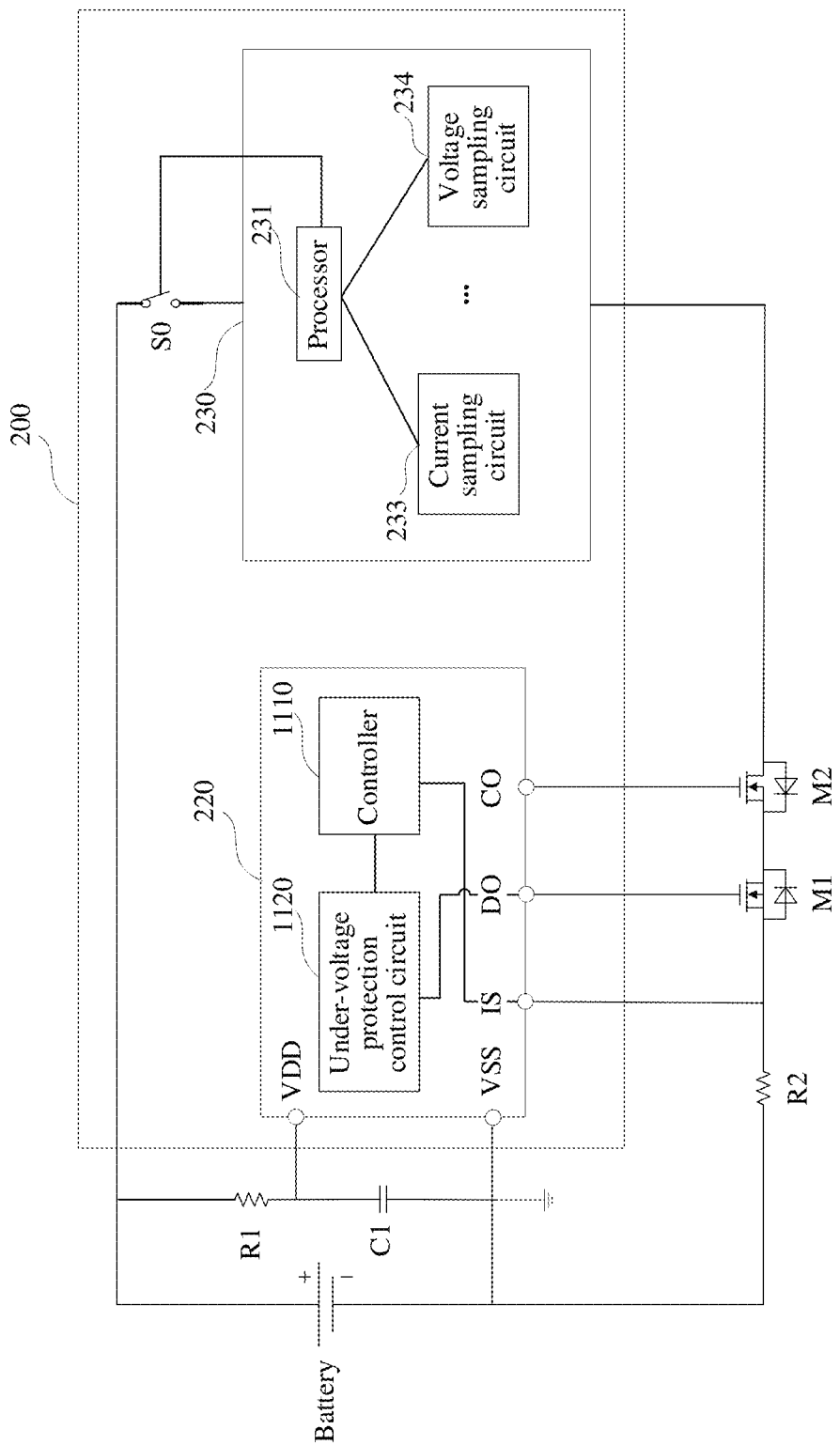
FIG. 11 is a fourth schematic structural diagram of a terminal device according to an embodiment of this application.

In a specific implementation, as shown in FIG. 11, the charging/discharging protection circuit 220 includes: a power supply end VDD, a grounding end VSS, a current sampling end IS, a controller 1110, and an under-voltage protection control circuit 820, where the power supply end VDD is connected to a positive electrode of the battery 210, the grounding end VDD is connected to a negative electrode of the battery 210, and the controller 1110 is connected to each of the under-voltage protection control circuit 1120, and the current sampling end IS.

The controller 1110 is configured to collect statistics on a quantity of charging/discharging cycles of the battery 210 and obtain a discharging current of the battery 210 through the current sampling end IS; and send a first control signal when the quantity of charging/discharging cycles of the battery 210 is greater than a set quantity and the discharging current of the battery 210 is greater than a set current threshold.

The under-voltage protection control circuit 1120 is configured to reduce an under-voltage protection threshold of the battery 210 under the control of the first control signal.

It should be understood that, functions of the controller 1110 may be implemented through software, that is, the controller 1110 may implement the functions of the controller 1110 by invoking code instructions stored in a memory (not shown) in the charging/discharging protection circuit 220; or functions of the controller 1110 may be implemented through hardware, for example, a comparator.

Further, the controller 1110 is further configured to send a second control signal when an output voltage of the battery 210 is smaller than a discharging cutoff voltage of the battery 210 and after the terminal device 200 is powered off; and the under-voltage protection control circuit 1120 is further configured to increase the under-voltage protection threshold of the battery 210 under the control of the second control signal.

Further, the charging/discharging protection circuit 220 further includes a discharging control end DO, and the under-voltage protection control circuit 1120 is further configured to: compare the output voltage of the battery 210 and the under-voltage protection threshold of the battery 210 and output a third control signal through the discharging control end DO according to a comparison result, where the third control signal is used for controlling a discharging loop of the battery 210 to be switched on or switched off. When the output voltage of the battery 210 is greater than the under-voltage protection threshold of the battery 210, the third control signal is used for controlling the discharging loop of the battery 210 to be switched on; and when the output voltage of the battery 210 is smaller than the under-voltage protection threshold of the battery 210, the third control signal is used for controlling the discharging loop of the battery 210 to be switched off, to perform under-voltage protection.

In a specific implementation, the under-voltage protection control circuit 1120 may be specifically implemented through, but not limited to, the structure shown in FIG. 6A or FIG. 7A. When the under-voltage protection control circuit 1120 is implemented through the structure shown in FIG. 6A, the battery voltage sampling circuit and the reference voltage circuit in the under-voltage protection control circuit 1120 may be specifically implemented through the structure shown in FIG. 6B. When the under-voltage protection control circuit 1120 is implemented through the structure shown in FIG. 7A, the battery voltage sampling circuit and the reference voltage circuit in the under-voltage protection control circuit 1120 may be specifically implemented through the structure shown in FIG. 7B. Details are not described herein again.

Through the foregoing solution, when the quantity of charging/discharging cycles of the battery 210 is greater than the set quantity, that is, the battery 210 is aging, and the discharging current of the battery 210 is greater than the set current threshold, the terminal device 200 reduces the under-voltage protection threshold of the battery 210 and the discharging cutoff voltage of the battery 210, to enable the battery 210 to continue to discharge, until the output voltage of the battery 210 is smaller than the reduced under-voltage protection threshold; and therefore, before the under-voltage protection threshold of the battery 210 is adjusted, the electric quantity in the battery 210 that cannot continue to be used because of the aging can be released, so that the terminal device 200 may continue to work, thereby improving the endurance capability of the terminal device 200.

Based on the foregoing embodiments, an embodiment of this application further provides a charging/discharging protection circuit 220, to adjust an under-voltage protection threshold of a battery in a scenario where the battery is aging.

In a possible implementation, as shown in FIG. 5, the charging/discharging protection circuit 220 includes a power supply end VDD, a grounding end VSS, and an under-voltage protection threshold control end UVC. The power supply end VDD is connected to a positive electrode of a battery 210, the grounding end VSS is connected to a negative electrode of the battery 210, and the under-voltage protection threshold control end UVC is configured to receive a first control signal. The charging/discharging protection circuit is configured to reduce an under-voltage protection threshold of the battery 210 under the control of the first control signal when a quantity of charging/discharging cycles of the battery 210 is greater than a set quantity and a discharging current of the battery 210 is greater than a set current threshold.

Further, the under-voltage protection threshold control end UVC is further configured to receive a second control signal; and the charging/discharging protection circuit 220 is further configured to increase the under-voltage protection threshold of the battery 210 under the control of the second control signal when an output voltage of the battery 210 is smaller than a discharging cutoff voltage of the battery 210.

Further, the charging/discharging protection circuit 220 further includes a discharging control end DO, where the discharging control end DO is configured to output a third control signal. The charging/discharging protection circuit 220 is further configured to: compare the output voltage of the battery and the under-voltage protection threshold of the battery and output the third control signal according to a comparison result, where the third control signal is used for controlling a discharging loop of the battery to be switched on or switched off.

In a specific implementation, the charging/discharging protection circuit 220 may be specifically implemented through, but not limited to, the structure shown in FIG. 6A or FIG. 7A. When the charging/discharging protection circuit 220 is implemented through the structure shown in FIG. 6A, the battery voltage sampling circuit and the reference voltage circuit in the charging/discharging protection circuit 220 may be specifically implemented through the structure shown in FIG. 6B. When the charging/discharging protection circuit 220 is implemented through the structure shown in FIG. 7A, the battery voltage sampling circuit and the reference voltage circuit in the charging/discharging protection circuit 220 may be specifically implemented through the structure shown in FIG. 7B. Details are not described herein again.

In another possible implementation, as shown in FIG. 11, the charging/discharging protection circuit 220 includes: a power supply end VDD, a grounding end VSS, a current sampling end IS, a controller 1110, and an under-voltage protection control circuit 1120, where the power supply end VDD is connected to a positive electrode of the battery 210, the grounding end VDD is connected to a negative electrode of the battery 210, and the controller 1110 is connected to each of the under-voltage protection control circuit 1120, and the current sampling end IS. The controller 1110 is configured to collect statistics on a quantity of charging/discharging cycles of the battery 210 and obtain a discharging current of the battery 210 through the current sampling end IS; and send a first control signal when the quantity of charging/discharging cycles of the battery 210 is greater than a set quantity and the discharging current of the battery 210 is greater than a set current threshold. The under-voltage protection control circuit 1120 is configured to reduce an under-voltage protection threshold of the battery 210 under the control of the first control signal.

Further, the controller 1110 is further configured to send a second control signal when an output voltage of the battery 210 is smaller than a discharging cutoff voltage of the battery 210; and the under-voltage protection control circuit 1120 is further configured to increase the under-voltage protection threshold of the battery 210 under the control of the second control signal.

Further, the charging/discharging protection circuit 220 further includes a discharging control end DO, where the discharging control end DO is connected to the under-voltage protection control circuit 1120; and the under-voltage protection control circuit 1120 is further configured to: compare the output voltage of the battery 210 and the under-voltage protection threshold of the battery 210 and output a third control signal through the discharging control end DO according to a comparison result, where the third control signal is used for controlling a discharging loop of the battery 210 to be switched on or switched off.

In a specific implementation, the under-voltage protection control circuit 1120 may be specifically implemented through, but not limited to, the structure shown in FIG. 6A or FIG. 7A. When the under-voltage protection control circuit 1120 is implemented through the structure shown in FIG. 6A, the battery voltage sampling circuit and the reference voltage circuit in the under-voltage protection control circuit 1120 may be specifically implemented through the structure shown in FIG. 6B. When the under-voltage protection control circuit 1120 is implemented through the structure shown in FIG. 7A, the battery voltage sampling circuit and the reference voltage circuit in the under-voltage protection control circuit 1120 may be specifically implemented through the structure shown in FIG. 7B. Details are not described herein again.

Figure 12A:
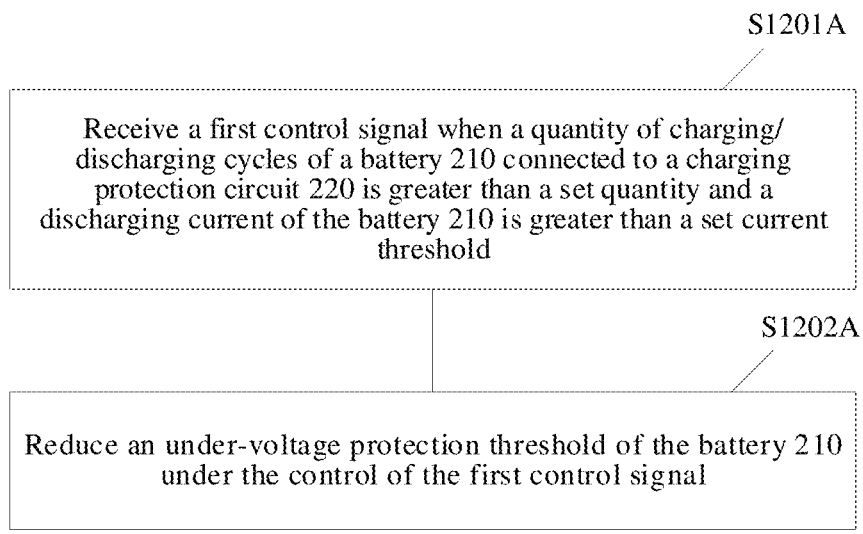
FIG. 12A is a schematic flowchart of a fifth battery discharging control method according to an embodiment of this application.

An embodiment of this application further provides a battery discharging control method, applicable to the foregoing first charging/discharging protection circuit 220, that is, in a scenario where the battery 210 is aging, the charging/discharging protection circuit 220 adjusts the under-voltage protection threshold of the battery 210 through a control signal received from outside. As shown in FIG. 12A, the method includes:

S1201A: Receive a first control signal when a quantity of charging/discharging cycles of a battery 210 connected to a charging protection circuit 220 is greater than a set quantity and a discharging current of the battery 210 is greater than a set current threshold.

S1202A: Reduce an under-voltage protection threshold of the battery 210 under the control of the first control signal.

Further, the charging/discharging protection circuit 220 further receives a second control signal when an output voltage of the battery 210 is smaller than a discharging cutoff voltage of the battery 210 and increases the under-voltage protection threshold of the battery 210 under the control of the second control signal.

Further, the charging/discharging protection circuit 220 further compares the output voltage of the battery 210 and the under-voltage protection threshold of the battery 210 and outputs a third control signal according to a comparison result, where the third control signal is used for controlling a discharging loop of the battery 210 to be switched off or switched on. When the output voltage of the battery 210 is greater than the under-voltage protection threshold of the battery 210, the third control signal is used for controlling the discharging loop of the battery 210 to be switched on; and when the output voltage of the battery 210 is smaller than the under-voltage protection threshold of the battery 210, the third control signal is used for controlling the discharging loop of the battery 210 to be switched off.

Figure 12B:
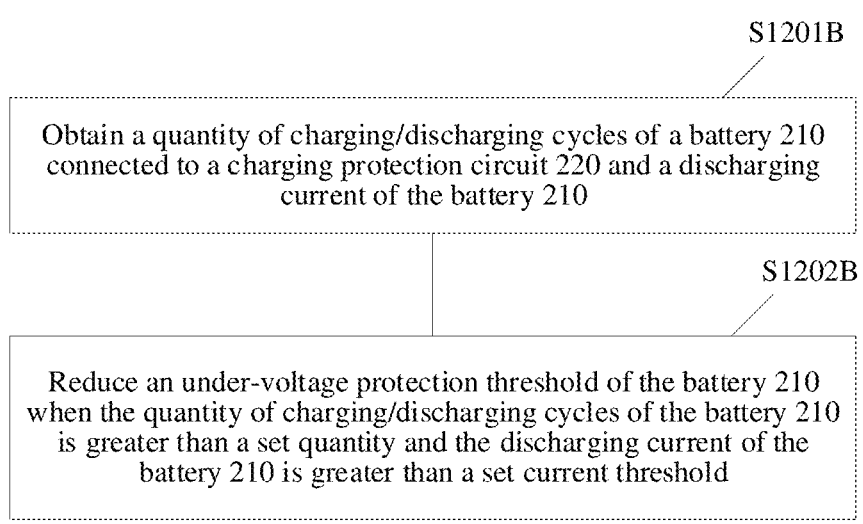
FIG. 12B is a schematic flowchart of a sixth battery discharging control method according to an embodiment of this application.

An embodiment of this application further provides a battery discharging control method, applicable to the foregoing second charging/discharging protection circuit 220, that is, in a scenario where the battery 210 is aging, the charging/discharging protection circuit 220 adjusts the under-voltage protection threshold of the battery 210 by itself. As shown in FIG. 12B, the method includes:

S1201B: Obtain a quantity of charging/discharging cycles of a battery 210 connected to a charging protection circuit 220 and a discharging current of the battery 210.

S1201B: Reduce an under-voltage protection threshold of the battery 210 when the quantity of charging/discharging cycles of the battery 210 is greater than a set quantity and the discharging current of the battery 210 is greater than a set current threshold.

Further, the charging/discharging protection circuit 220 further increases the under-voltage protection threshold of the battery 210 when an output voltage of the battery 210 is smaller than a discharging cutoff voltage of the battery 210.

Further, the charging/discharging protection circuit 220 compares the output voltage of the battery 210 and the under-voltage protection threshold of the battery 210 and outputs a third control signal according to a comparison result, where the third control signal is used for controlling a discharging loop of the battery 210 to be switched off or switched on.

Through the foregoing solution, when the quantity of charging/discharging cycles of the battery 210 is greater than the set quantity, that is, the battery 210 is aging, and the discharging current of the battery 210 is greater than the set current threshold, the charging/discharging protection circuit 220 reduces the under-voltage protection threshold of the battery 210, to enable the battery 210 to continue to discharge, until the output voltage of the battery 210 is smaller than the reduced under-voltage protection threshold; and therefore, before the under-voltage protection threshold of the battery 210 is adjusted, the electric quantity in the battery 210 that cannot continue to be used because of the aging can be released and utilized by a power consumption load connected to the charging/discharging protection circuit 220.

Embodiment 1

A charging/discharging protection circuit includes a power supply end (for example, VDD in FIG. 5), a grounding end (for example, VSS in FIG. 5), and an under-voltage protection threshold control end (for example, UVC in FIG. 5), where the power supply end is connected to a positive electrode of a battery, the grounding end is connected to a negative electrode of the battery, and the under-voltage protection threshold control end is configured to receive a first control signal; and the charging/discharging protection circuit is configured to reduce an under-voltage protection threshold of the battery under the control of the first control signal when a temperature of the battery is smaller than a set temperature threshold and a discharging current of the battery is greater than a set current threshold.

In an implementation, the under-voltage protection threshold control end is further configured to receive a second control signal; and the charging/discharging protection circuit is further configured to increase the under-voltage protection threshold of the battery under the control of the second control signal when an output voltage of the battery is smaller than a discharging cutoff voltage of the battery.

In an implementation, the charging/discharging protection circuit further includes a discharging control end (for example, DO), where the discharging control end is configured to output a third control signal; and the charging/discharging protection circuit is further configured to: compare the output voltage of the battery and the under-voltage protection threshold of the battery and output the third control signal according to a comparison result, where the third control signal is used for controlling a discharging loop of the battery to be switched on or switched off.

In an implementation, the charging/discharging protection circuit includes a battery voltage sampling circuit, a reference voltage circuit, and a comparator, where the battery sampling circuit is connected to each of the power supply end, the grounding end, the under-voltage protection threshold control end, and a first input end of the comparator, the reference voltage circuit is connected to a second input end of the comparator, and an output end of the comparator is connected to the discharging control end;

the battery voltage sampling circuit is configured to sample the output voltage of the battery and increase a sampling voltage under the control of the first control signal;

an output voltage of the reference voltage circuit is used for representing the under-voltage protection threshold of the battery; and the comparator is configured to compare the output voltage of the reference voltage circuit and the increased sampling voltage and output the third control signal according to a comparison result.

In an implementation, the battery voltage sampling circuit includes a first voltage divider resistor (for example, Ra in FIG. 6B), a second voltage divider resistor (for example, Rb in FIG. 6B), and a switch resistor array, the switch resistor array includes a plurality of branches connected to each other in parallel, and each branch includes a third voltage divider resistor and a switch connected to the third voltage divider resistor in series, where a first end of the first voltage divider resistor is connected to each of the power supply end and a first end of the switch resistor array, a second end of the first voltage divider resistor is connected to each of a first end of the second voltage divider resistor, a second end of the switch resistor array, and the first input end of the comparator, control ends of switches in the switch resistor array are connected to the under-voltage protection threshold control end, and a second end of the second voltage divider resistor is connected to the grounding end; and the first control signal is used for controlling at least one switch in the switch resistor array to switch from a switched-off state to a switched-on state.

In an implementation, the reference voltage circuit is a voltage source.

In an implementation, the charging/discharging protection circuit includes a battery voltage sampling circuit, a reference voltage circuit, and a comparator, where the battery sampling circuit is connected to each of the power supply end, the grounding end, and a first input end of the comparator, and the reference voltage circuit is connected to each of a second input end of the comparator and the under-voltage protection threshold control end;

the battery voltage sampling circuit is configured to sample the output voltage of the battery;

the reference voltage circuit is configured to reduce an output voltage of the reference voltage circuit under the control of the first control signal; and an output voltage of the reference voltage circuit is used for representing the under-voltage protection threshold of the battery; and the comparator is configured to compare an output voltage of the battery voltage sampling circuit and the output voltage of the reference voltage circuit and output the third control signal according to a comparison result.

In an implementation, the battery voltage sampling circuit includes a first sampling resistor and a second sampling resistor, where a first end of the first voltage divider resistor is connected to the power supply end, a second end of the first voltage divider resistor is connected to each of a first end of the second voltage divider resistor and the first input end of the comparator, and a second end of the second voltage divider resistor is connected to the grounding end.

In an implementation, the reference voltage circuit includes a plurality of branches connected to each other in parallel, and each branch includes a voltage source and a switch connected to the voltage source in series, where a first end of the reference voltage circuit is grounded, a second end of the reference voltage circuit is connected to the second input end of the comparator, and control ends of the switches in the reference voltage circuit are connected to the under-voltage protection threshold control end; and the first control signal is used for controlling a first switch in the reference voltage circuit to switch from a switched-on state to a switched-off state and controlling a second switch in the reference voltage circuit to switch from a switched-off state to a switched-on state, and a voltage of a voltage source connected to the first switch in series is greater than a voltage of a voltage source connected to the second switch in series.

Embodiment 2

A terminal device includes a processor and a charging/discharging protection circuit, where the charging/discharging protection circuit includes a power supply end, a grounding end, and an under-voltage protection threshold control end, where the power supply end is connected to a positive electrode of a battery, the grounding end is connected to a negative electrode of the battery, and the under-voltage protection threshold control end is connected to the processor;

the processor is configured to: when a temperature of the battery is smaller than a set temperature threshold and a discharging current of the battery is greater than a set current threshold, reduce a discharging cutoff voltage of the battery and send a first control signal; and the charging/discharging protection circuit is configured to receive the first control signal through the under-voltage protection threshold control end and reduce an under-voltage protection threshold of the battery under the control of the first control signal.

In an implementation, the processor is further configured to: when an output voltage of the battery is smaller than the discharging cutoff voltage of the battery, control the terminal device to be powered off, increase the discharging cutoff voltage of the battery, and send a second control signal; and the charging/discharging protection circuit is further configured to increase the under-voltage protection threshold of the battery under the control of the second control signal.

In an implementation, the charging/discharging protection circuit further includes a discharging control end; and the charging/discharging protection circuit is further configured to: compare the output voltage of the battery and the under-voltage protection threshold of the battery and output a third control signal through the discharging control end according to a comparison result, where the third control signal is used for controlling a discharging loop of the battery to be switched on or switched off.

In an implementation, the charging/discharging protection circuit includes a battery voltage sampling circuit, a reference voltage circuit, and a comparator, where the battery sampling circuit is connected to each of the power supply end, the grounding end, the under-voltage protection threshold control end, and a first input end of the comparator, the reference voltage circuit is connected to a second input end of the comparator, and an output end of the comparator is connected to the discharging control end;

the battery voltage sampling circuit is configured to sample the output voltage of the battery and increase a sampling voltage under the control of the first control signal;

an output voltage of the reference voltage circuit is used for representing the under-voltage protection threshold of the battery; and the comparator is configured to compare the output voltage of the reference voltage circuit and the increased sampling voltage and output the third control signal according to a comparison result.

In an implementation, the battery voltage sampling circuit includes a first voltage divider resistor, a second voltage divider resistor, and a switch resistor array, the switch resistor array includes a plurality of branches connected to each other in parallel, and each branch includes a third voltage divider resistor and a switch connected to the third voltage divider resistor in series, where a first end of the first voltage divider resistor is connected to each of the power supply end and a first end of the switch resistor array, a second end of the first voltage divider resistor is connected to each of a first end of the second voltage divider resistor, a second end of the switch resistor array, and the first input end of the comparator, control ends of switches in the switch resistor array are connected to the under-voltage protection threshold control end, and a second end of the second voltage divider resistor is connected to the grounding end; and the first control signal is used for controlling at least one switch in the switch resistor array to switch from a switched-off state to a switched-on state.

In an implementation, the reference voltage circuit is a voltage source.

In an implementation, the charging/discharging protection circuit includes a battery voltage sampling circuit, a reference voltage circuit, and a comparator, where the battery sampling circuit is connected to each of the power supply end, the grounding end, and a first input end of the comparator, the reference voltage circuit is connected to each of a second input end of the comparator and the under-voltage protection threshold control end, and an output end of the comparator is connected to the discharging control end;

the battery voltage sampling circuit is configured to sample the voltage of the battery;

the reference voltage circuit is configured to reduce an output voltage of the reference voltage circuit under the control of the first control signal, where the output voltage of the reference voltage circuit is used for representing the under-voltage protection threshold of the battery; and the comparator is configured to compare an output voltage of the battery voltage sampling circuit and the output voltage of the reference voltage circuit and output the third control signal according to a comparison result.

In an implementation, the battery voltage sampling circuit includes a first sampling resistor and a second sampling resistor, where a first end of the first voltage divider resistor is connected to the power supply end, a second end of the first voltage divider resistor is connected to each of a first end of the second voltage divider resistor and the first input end of the comparator, and a second end of the second voltage divider resistor is connected to the grounding end.

In an implementation, the reference voltage circuit includes a plurality of branches connected to each other in parallel, and each branch includes a voltage source and a switch connected to the voltage source in series, where a first end of the reference voltage circuit is grounded, a second end of the reference voltage circuit is connected to the second input end of the comparator, and control ends of the switches in the reference voltage circuit are connected to the under-voltage protection threshold control end; and the first control signal is used for controlling a first switch in the reference voltage circuit to switch from a switched-on state to a switched-off state and controlling a second switch in the reference voltage circuit to switch from a switched-off state to a switched-on state, and a voltage of a voltage source connected to the first switch in series is greater than a voltage of a voltage source connected to the second switch in series.

Embodiment 3

A charging/discharging protection circuit includes: a power supply end (for example, VDD in FIG. 8), a grounding end (for example, VSS in FIG. 8), a temperature sampling end (for example, TS in FIG. 8), a current sampling end (for example, IS in FIG. 8), a controller, and an under-voltage protection control circuit, where the power supply end is connected to a positive electrode of a battery, the grounding end is connected to a negative electrode of the battery, and the controller is connected to each of the under-voltage protection control circuit, the temperature sampling end, and the current sampling end;

the controller is configured to obtain a temperature of the battery through the temperature sampling end and obtain a discharging current of the battery through the current sampling end; and send a first control signal when the temperature of the battery is smaller than a set temperature threshold and the discharging current of the battery is greater than a set current threshold; and the under-voltage protection control circuit is configured to reduce an under-voltage protection threshold of the battery under the control of the first control signal.

In an implementation, the controller is further configured to send a second control signal when an output voltage of the battery is smaller than a discharging cutoff voltage of the battery; and the under-voltage protection control circuit is further configured to increase the under-voltage protection threshold of the battery under the control of the second control signal.

In an implementation, the charging/discharging protection circuit further includes a discharging control end, where the discharging control end is connected to the under-voltage protection control circuit; and the under-voltage protection control circuit is further configured to: compare the output voltage of the battery and the under-voltage protection threshold of the battery and output a third control signal through the discharging control end according to a comparison result, where the third control signal is used for controlling a discharging loop of the battery to be switched on or switched off.

In an implementation, the under-voltage protection control circuit includes a battery voltage sampling circuit, a reference voltage circuit, and a comparator, where the battery sampling circuit is connected to each of the power supply end, the grounding end, the under-voltage protection threshold control end, and a first input end of the comparator, the reference voltage circuit is connected to a second input end of the comparator, and an output end of the comparator is connected to the discharging control end;

the battery voltage sampling circuit is configured to sample the output voltage of the battery and increase a sampling voltage under the control of the first control signal;

an output voltage of the reference voltage circuit is used for representing the under-voltage protection threshold of the battery; and the comparator is configured to compare the output voltage of the reference voltage circuit and the increased sampling voltage and output the third control signal according to a comparison result.

In an implementation, the battery voltage sampling circuit includes a first voltage divider resistor, a second voltage divider resistor, and a switch resistor array, the switch resistor array includes a plurality of branches connected to each other in parallel, and each branch includes a third voltage divider resistor and a switch connected to the third voltage divider resistor in series, where a first end of the first voltage divider resistor is connected to each of the power supply end and a first end of the switch resistor array, a second end of the first voltage divider resistor is connected to each of a first end of the second voltage divider resistor, a second end of the switch resistor array, and the first input end of the comparator, control ends of switches in the switch resistor array are connected to the under-voltage protection threshold control end, and a second end of the second voltage divider resistor is connected to the grounding end; and the first control signal is used for controlling at least one switch in the switch resistor array to switch from a switched-off state to a switched-on state.

In an implementation, the reference voltage circuit is a voltage source.

In an implementation, the under-voltage protection control circuit includes a battery voltage sampling circuit, a reference voltage circuit, and a comparator, where the battery sampling circuit is connected to each of the power supply end, the grounding end, and a first input end of the comparator, and the reference voltage circuit is connected to each of a second input end of the comparator and the under-voltage protection threshold control end;

the battery voltage sampling circuit is configured to sample the output voltage of the battery;

the reference voltage circuit is configured to reduce an output voltage of the reference voltage circuit under the control of the first control signal; and an output voltage of the reference voltage circuit is used for representing the under-voltage protection threshold of the battery; and the comparator is configured to compare the output voltage of the reference voltage circuit and an output voltage of the battery voltage sampling circuit and output the third control signal according to a comparison result.

In an implementation, the battery voltage sampling circuit includes a first sampling resistor and a second sampling resistor, where a first end of the first voltage divider resistor is connected to the power supply end, a second end of the first voltage divider resistor is connected to each of a first end of the second voltage divider resistor and the first input end of the comparator, and a second end of the second voltage divider resistor is connected to the grounding end.

In an implementation, the reference voltage circuit includes a plurality of branches connected to each other in parallel, and each branch includes a voltage source and a switch connected to the voltage source in series, where a first end of the reference voltage circuit is grounded, a second end of the reference voltage circuit is connected to the second input end of the comparator, and control ends of the switches in the reference voltage circuit are connected to the under-voltage protection threshold control end; and the first control signal is used for controlling a first switch in the reference voltage circuit to switch from a switched-on state to a switched-off state and controlling a second switch in the reference voltage circuit to switch from a switched-off state to a switched-on state, and a voltage of a voltage source connected to the first switch in series is greater than a voltage of a voltage source connected to the second switch in series.

Embodiment 4

A terminal device includes a processor and a charging/discharging protection circuit, where the processor is configured to reduce a discharging cutoff voltage of a battery connected to the charging/discharging protection circuit when a temperature of the battery is smaller than a set temperature threshold and a discharging current of the battery is greater than a set current threshold; and the charging/discharging protection circuit is configured to reduce an under-voltage protection threshold of the battery when the temperature of the battery is smaller than a set temperature threshold and the discharging current of the battery is greater than a set current threshold.

In an implementation, the processor is further configured to: when an output voltage of the battery is smaller than the discharging cutoff voltage of the battery, control the terminal device to be powered off, and increase the discharging cutoff voltage of the battery; and the charging/discharging protection circuit is further configured to increase the under-voltage protection threshold of the battery when an output voltage of the battery is smaller than a discharging cutoff voltage of the battery and after the terminal device is powered off.

In an implementation, the charging/discharging protection circuit includes: a power supply end, a grounding end, a temperature sampling end, a current sampling end, a controller, and an under-voltage protection control circuit, where the power supply end is connected to a positive electrode of the battery, the grounding end is connected to a negative electrode of the battery, and the controller is connected to each of the under-voltage protection control circuit, the temperature sampling end, and the current sampling end;

the controller is configured to obtain a temperature of the battery through the temperature sampling end and obtain a discharging current of the battery through the current sampling end; and send a first control signal when the temperature of the battery is smaller than a set temperature threshold and the discharging current of the battery is greater than a set current threshold; and the under-voltage protection control circuit is configured to reduce an under-voltage protection threshold of the battery under the control of the first control signal.

In an implementation, the charging/discharging protection circuit further includes a discharging control end; and the under-voltage protection control circuit is further configured to: compare the output voltage of the battery and the under-voltage protection threshold of the battery and output a third control signal through the discharging control end according to a comparison result, where the third control signal is used for controlling a discharging loop of the battery to be switched on or switched off.

In an implementation, the under-voltage protection control circuit includes a battery voltage sampling circuit, a reference voltage circuit, and a comparator, where the battery sampling circuit is connected to each of the power supply end, the grounding end, the under-voltage protection threshold control end, and a first input end of the comparator, the reference voltage circuit is connected to a second input end of the comparator, and an output end of the comparator is connected to the discharging control end;

the battery voltage sampling circuit is configured to sample the output voltage of the battery and increase a sampling voltage under the control of the first control signal;

an output voltage of the reference voltage circuit is used for representing the under-voltage protection threshold of the battery; and the comparator is configured to compare the output voltage of the reference voltage circuit and the increased sampling voltage and output the third control signal according to a comparison result.

In an implementation, the battery voltage sampling circuit includes a first voltage divider resistor, a second voltage divider resistor, and a switch resistor array, the switch resistor array includes a plurality of branches connected to each other in parallel, and each branch includes a third voltage divider resistor and a switch connected to the third voltage divider resistor in series, where a first end of the first voltage divider resistor is connected to each of the power supply end and a first end of the switch resistor array, a second end of the first voltage divider resistor is connected to each of a first end of the second voltage divider resistor, a second end of the switch resistor array, and the first input end of the comparator, control ends of switches in the switch resistor array are connected to the under-voltage protection threshold control end, and a second end of the second voltage divider resistor is connected to the grounding end; and the first control signal is used for controlling at least one switch in the switch resistor array to switch from a switched-off state to a switched-on state.

In an implementation, the reference voltage circuit is a voltage source.

In an implementation, the under-voltage protection control circuit includes a battery voltage sampling circuit, a reference voltage circuit, and a comparator, where the battery sampling circuit is connected to each of the power supply end, the grounding end, and a first input end of the comparator, the reference voltage circuit is connected to each of a second input end of the comparator and the under-voltage protection threshold control end, and an output end of the comparator is connected to the discharging control end;

the battery voltage sampling circuit is configured to sample the voltage of the battery;

the reference voltage circuit is configured to reduce an output voltage of the reference voltage circuit under the control of the first control signal, where the output voltage of the reference voltage circuit is used for representing the under-voltage protection threshold of the battery; and the comparator is configured to compare the output voltage of the reference voltage circuit and an output voltage of the battery voltage sampling circuit and output the third control signal according to a comparison result.

In an implementation, the battery voltage sampling circuit includes a first sampling resistor and a second sampling resistor, where a first end of the first voltage divider resistor is connected to the power supply end, a second end of the first voltage divider resistor is connected to each of a first end of the second voltage divider resistor and the first input end of the comparator, and a second end of the second voltage divider resistor is connected to the grounding end.

In an implementation, the reference voltage circuit includes a plurality of branches connected to each other in parallel, and each branch includes a voltage source and a switch connected to the voltage source in series, where a first end of the reference voltage circuit is grounded, a second end of the reference voltage circuit is connected to the second input end of the comparator, and control ends of the switches in the reference voltage circuit are connected to the under-voltage protection threshold control end; and the first control signal is used for controlling a first switch in the reference voltage circuit to switch from a switched-on state to a switched-off state and controlling a second switch in the reference voltage circuit to switch from a switched-off state to a switched-on state, and a voltage of a voltage source connected to the first switch in series is greater than a voltage of a voltage source connected to the second switch in series.

Embodiment 5

A battery discharging control method includes:

detecting, by a terminal device, a temperature of a battery in the terminal device and a discharging current of the battery; and reducing, by the terminal device, an under-voltage protection threshold of the battery and a discharging cutoff voltage of the battery when the temperature of the battery is smaller than a set temperature threshold and the discharging current of the battery is greater than a set current threshold.

In an implementation, the method further includes:

when an output voltage of the battery is smaller than the discharging cutoff voltage of the battery, controlling, by the terminal device, the terminal device to be powered off, and increasing the under-voltage protection threshold of the battery and the discharging cutoff voltage of the battery.

In an implementation, the method further includes:

comparing, by the terminal device, the output voltage of the battery and the under-voltage protection threshold of the battery, and controlling, according to a comparison result, a discharging loop of the battery to be switched on or switched off.

Embodiment 6

A charging/discharging protection circuit includes a power supply end, a grounding end, and an under-voltage protection threshold control end, where the power supply end is connected to a positive electrode of a battery, the grounding end is connected to a negative electrode of the battery, and the under-voltage protection threshold control end is configured to receive a first control signal; and the charging/discharging protection circuit is configured to reduce an under-voltage protection threshold of the battery under the control of the first control signal when a quantity of charging/discharging cycles of the battery is greater than a set quantity and a discharging current of the battery is greater than a set current threshold.

In an implementation, the under-voltage protection threshold control end is further configured to receive a second control signal; and the charging/discharging protection circuit is further configured to increase the under-voltage protection threshold of the battery under the control of the second control signal when an output voltage of the battery is smaller than a discharging cutoff voltage of the battery.

In an implementation, the charging/discharging protection circuit further includes a discharging control end, where the discharging control end is configured to output a third control signal; and the charging/discharging protection circuit is further configured to: compare the output voltage of the battery and the under-voltage protection threshold of the battery and output the third control signal according to a comparison result, where the third control signal is used for controlling a discharging loop of the battery to be switched on or switched off.

In an implementation, the charging/discharging protection circuit includes a battery voltage sampling circuit, a reference voltage circuit, and a comparator, where the battery sampling circuit is connected to each of the power supply end, the grounding end, the under-voltage protection threshold control end, and a first input end of the comparator, the reference voltage circuit is connected to a second input end of the comparator, and an output end of the comparator is connected to the discharging control end;

the battery voltage sampling circuit is configured to sample the output voltage of the battery and increase a sampling voltage under the control of the first control signal;

an output voltage of the reference voltage circuit is used for representing the under-voltage protection threshold of the battery; and the comparator is configured to compare the output voltage of the reference voltage circuit and the increased sampling voltage and output the third control signal according to a comparison result.

In an implementation, the battery voltage sampling circuit includes a first voltage divider resistor, a second voltage divider resistor, and a switch resistor array, the switch resistor array includes a plurality of branches connected to each other in parallel, and each branch includes a third voltage divider resistor and a switch connected to the third voltage divider resistor in series, where a first end of the first voltage divider resistor is connected to each of the power supply end and a first end of the switch resistor array, a second end of the first voltage divider resistor is connected to each of a first end of the second voltage divider resistor, a second end of the switch resistor array, and the first input end of the comparator, control ends of switches in the switch resistor array are connected to the under-voltage protection threshold control end, and a second end of the second voltage divider resistor is connected to the grounding end; and the first control signal is used for controlling at least one switch in the switch resistor array to switch from a switched-off state to a switched-on state.

In an implementation, the reference voltage circuit is a voltage source.

In an implementation, the charging/discharging protection circuit includes a battery voltage sampling circuit, a reference voltage circuit, and a comparator, where the battery sampling circuit is connected to each of the power supply end, the grounding end, and a first input end of the comparator, and the reference voltage circuit is connected to each of a second input end of the comparator and the under-voltage protection threshold control end;

the battery voltage sampling circuit is configured to sample the output voltage of the battery;

the reference voltage circuit is configured to reduce an output voltage of the reference voltage circuit under the control of the first control signal; and an output voltage of the reference voltage circuit is used for representing the under-voltage protection threshold of the battery; and the comparator is configured to compare the output voltage of the reference voltage circuit and an output voltage of the battery voltage sampling circuit and output the third control signal according to a comparison result.

In an implementation, the battery voltage sampling circuit includes a first sampling resistor and a second sampling resistor, where a first end of the first voltage divider resistor is connected to the power supply end, a second end of the first voltage divider resistor is connected to each of a first end of the second voltage divider resistor and the first input end of the comparator, and a second end of the second voltage divider resistor is connected to the grounding end.

In an implementation, the reference voltage circuit includes a plurality of branches connected to each other in parallel, and each branch includes a voltage source and a switch connected to the voltage source in series, where a first end of the reference voltage circuit is grounded, a second end of the reference voltage circuit is connected to the second input end of the comparator, and control ends of the switches in the reference voltage circuit are connected to the under-voltage protection threshold control end; and the first control signal is used for controlling a first switch in the reference voltage circuit to switch from a switched-on state to a switched-off state and controlling a second switch in the reference voltage circuit to switch from a switched-off state to a switched-on state, and a voltage of a voltage source connected to the first switch in series is greater than a voltage of a voltage source connected to the second switch in series.

Embodiment 7

A terminal device includes a processor and a charging/discharging protection circuit, where the charging/discharging protection circuit includes a power supply end, a grounding end, and an under-voltage protection threshold control end, where the power supply end is connected to a positive electrode of a battery, the grounding end is connected to a negative electrode of the battery, and the under-voltage protection threshold control end is connected to the processor;

the processor is configured to: when a quantity of charging/discharging cycles of the battery is greater than a set quantity and a discharging current of the battery is greater than a set current threshold, reduce a discharging cutoff voltage of the battery and send a first control signal; and the charging/discharging protection circuit is configured to reduce an under-voltage protection threshold of the battery under the control of the first control signal.

In an implementation, the processor is further configured to: when an output voltage of the battery is smaller than the discharging cutoff voltage of the battery, control the terminal device to be powered off, increase the discharging cutoff voltage of the battery, and send a second control signal; and the charging/discharging protection circuit is further configured to increase the under-voltage protection threshold of the battery under the control of the second voltage signal.

In an implementation, the charging/discharging protection circuit further includes a discharging control end; and the charging/discharging protection circuit is further configured to: compare the output voltage of the battery and the under-voltage protection threshold of the battery and output a third control signal through the discharging control end according to a comparison result, where the third control signal is used for controlling a discharging loop of the battery to be switched on or switched off.

In an implementation, the charging/discharging protection circuit includes a battery voltage sampling circuit, a reference voltage circuit, and a comparator, where the battery sampling circuit is connected to each of the power supply end, the grounding end, the under-voltage protection threshold control end, and a first input end of the comparator, the reference voltage circuit is connected to a second input end of the comparator, and an output end of the comparator is connected to the discharging control end;

the battery voltage sampling circuit is configured to sample the output voltage of the battery and increase a sampling voltage under the control of the first control signal;

an output voltage of the reference voltage circuit is used for representing the under-voltage protection threshold of the battery; and the comparator is configured to compare the output voltage of the reference voltage circuit and the increased sampling voltage and output the third control signal according to a comparison result.

In an implementation, the battery voltage sampling circuit includes a first voltage divider resistor, a second voltage divider resistor, and a switch resistor array, the switch resistor array includes a plurality of branches connected to each other in parallel, and each branch includes a third voltage divider resistor and a switch connected to the third voltage divider resistor in series, where a first end of the first voltage divider resistor is connected to each of the power supply end and a first end of the switch resistor array, a second end of the first voltage divider resistor is connected to each of a first end of the second voltage divider resistor, a second end of the switch resistor array, and the first input end of the comparator, control ends of switches in the switch resistor array are connected to the under-voltage protection threshold control end, and a second end of the second voltage divider resistor is connected to the grounding end; and the first control signal is used for controlling at least one switch in the switch resistor array to switch from a switched-off state to a switched-on state.

In an implementation, the reference voltage circuit is a voltage source.

In an implementation, the charging/discharging protection circuit includes a battery voltage sampling circuit, a reference voltage circuit, and a comparator, where the battery sampling circuit is connected to each of the power supply end, the grounding end, and a first input end of the comparator, the reference voltage circuit is connected to each of a second input end of the comparator and the under-voltage protection threshold control end, and an output end of the comparator is connected to the discharging control end;

the battery voltage sampling circuit is configured to sample the voltage of the battery;

the reference voltage circuit is configured to reduce an output voltage of the reference voltage circuit under the control of the first control signal, where the output voltage of the reference voltage circuit is used for representing the under-voltage protection threshold of the battery; and the comparator is configured to compare the output voltage of the reference voltage circuit and an output voltage of the battery voltage sampling circuit and output the third control signal according to a comparison result.

In an implementation, the battery voltage sampling circuit includes a first sampling resistor and a second sampling resistor, where a first end of the first voltage divider resistor is connected to the power supply end, a second end of the first voltage divider resistor is connected to each of a first end of the second voltage divider resistor and the first input end of the comparator, and a second end of the second voltage divider resistor is connected to the grounding end.

In an implementation, the reference voltage circuit includes a plurality of branches connected to each other in parallel, and each branch includes a voltage source and a switch connected to the voltage source in series, where a first end of the reference voltage circuit is grounded, a second end of the reference voltage circuit is connected to the second input end of the comparator, and control ends of the switches in the reference voltage circuit are connected to the under-voltage protection threshold control end; and the first control signal is used for controlling a first switch in the reference voltage circuit to switch from a switched-on state to a switched-off state and controlling a second switch in the reference voltage circuit to switch from a switched-off state to a switched-on state, and a voltage of a voltage source connected to the first switch in series is greater than a voltage of a voltage source connected to the second switch in series.

Embodiment 8

A charging/discharging protection circuit includes: a power supply end, a grounding end, a current sampling end, a controller, and an under-voltage protection control circuit, where the power supply end is connected to a positive electrode of a battery, the grounding end is connected to a negative electrode of the battery, and the controller is connected to each of the under-voltage protection control circuit and the current sampling end;

the controller is configured to collect statistics on a quantity of charging/discharging cycles of the battery and obtain a discharging current of the battery through the current sampling end; and send a first control signal when the quantity of charging/discharging cycles of the battery is greater than a set quantity and the discharging current of the battery is greater than a set current threshold; and the under-voltage protection control circuit is configured to reduce an under-voltage protection threshold of the battery under the control of the first control signal.

In an implementation, the controller is further configured to send a second control signal when an output voltage of the battery is smaller than a discharging cutoff voltage of the battery; and the under-voltage protection control circuit is further configured to increase the under-voltage protection threshold of the battery under the control of the second control signal.

In an implementation, the charging/discharging protection circuit further includes a discharging control end, where the discharging control end is connected to the under-voltage protection control circuit; and the under-voltage protection control circuit is further configured to: compare the output voltage of the battery and the under-voltage protection threshold of the battery and output a third control signal through the discharging control end according to a comparison result, where the third control signal is used for controlling a discharging loop of the battery to be switched on or switched off.

In an implementation, the under-voltage protection control circuit includes a battery voltage sampling circuit, a reference voltage circuit, and a comparator, where the battery sampling circuit is connected to each of the power supply end, the grounding end, the under-voltage protection threshold control end, and a first input end of the comparator, the reference voltage circuit is connected to a second input end of the comparator, and an output end of the comparator is connected to the discharging control end;

the battery voltage sampling circuit is configured to sample the output voltage of the battery and increase a sampling voltage under the control of the first control signal;

an output voltage of the reference voltage circuit is used for representing the under-voltage protection threshold of the battery; and the comparator is configured to compare the output voltage of the reference voltage circuit and the increased sampling voltage and output the third control signal according to a comparison result.

In an implementation, the battery voltage sampling circuit includes a first voltage divider resistor, a second voltage divider resistor, and a switch resistor array, the switch resistor array includes a plurality of branches connected to each other in parallel, and each branch includes a third voltage divider resistor and a switch connected to the third voltage divider resistor in series, where a first end of the first voltage divider resistor is connected to each of the power supply end and a first end of the switch resistor array, a second end of the first voltage divider resistor is connected to each of a first end of the second voltage divider resistor, a second end of the switch resistor array, and the first input end of the comparator, control ends of switches in the switch resistor array are connected to the under-voltage protection threshold control end, and a second end of the second voltage divider resistor is connected to the grounding end; and the first control signal is used for controlling at least one switch in the switch resistor array to switch from a switched-off state to a switched-on state.

In an implementation, the reference voltage circuit is a voltage source.

In an implementation, the under-voltage protection control circuit includes a battery voltage sampling circuit, a reference voltage circuit, and a comparator, where the battery sampling circuit is connected to each of the power supply end, the grounding end, and a first input end of the comparator, and the reference voltage circuit is connected to each of a second input end of the comparator and the under-voltage protection threshold control end;

the battery voltage sampling circuit is configured to sample the output voltage of the battery;

the reference voltage circuit is configured to reduce an output voltage of the reference voltage circuit under the control of the first control signal; and an output voltage of the reference voltage circuit is used for representing the under-voltage protection threshold of the battery; and the comparator is configured to compare the output voltage of the reference voltage circuit and an output voltage of the battery voltage sampling circuit and output the third control signal according to a comparison result.

In an implementation, the battery voltage sampling circuit includes a first sampling resistor and a second sampling resistor, where a first end of the first voltage divider resistor is connected to the power supply end, a second end of the first voltage divider resistor is connected to each of a first end of the second voltage divider resistor and the first input end of the comparator, and a second end of the second voltage divider resistor is connected to the grounding end.

In an implementation, the reference voltage circuit includes a plurality of branches connected to each other in parallel, and each branch includes a voltage source and a switch connected to the voltage source in series, where
 a first end of the reference voltage circuit is grounded, a second end of the reference voltage circuit is connected to the second input end of the comparator, and control ends of the switches in the reference voltage circuit are connected to the under-voltage protection threshold control end; and the first control signal is used for controlling a first switch in the reference voltage circuit to switch from a switched-on state to a switched-off state and controlling a second switch in the reference voltage circuit to switch from a switched-off state to a switched-on state, and a voltage of a voltage source connected to the first switch in series is greater than a voltage of a voltage source connected to the second switch in series.

Embodiment 9

A terminal device includes a processor and a charging/discharging protection circuit, where
 the processor is configured to reduce a discharging cutoff voltage of a battery connected to the charging/discharging protection circuit when a quantity of charging/discharging cycles of the battery is greater than a set quantity and a discharging current of the battery is greater than a set current threshold; and
 the charging/discharging protection circuit is configured to reduce an under-voltage protection threshold of the battery when the quantity of charging/discharging cycles of the battery is greater than the set quantity and the discharging current of the battery is greater than the set current threshold.

In an implementation, the processor is further configured to: when an output voltage of the battery is smaller than the discharging cutoff voltage of the battery, control the terminal device to be powered off, and increase the discharging cutoff voltage of the battery; and
 the charging/discharging protection circuit is further configured to increase the under-voltage protection threshold of the battery when an output voltage of the battery is smaller than a discharging cutoff voltage of the battery and after the terminal device is powered off.

In an implementation, the charging/discharging protection circuit includes: a power supply end, a grounding end, a current sampling end, a controller, and an under-voltage protection control circuit, where the power supply end is connected to a positive electrode of the battery, the grounding end is connected to a negative electrode of the battery, and the controller is connected to each of the under-voltage protection control circuit and the current sampling end;
 the controller is configured to collect statistics on a quantity of charging/discharging cycles of the battery and obtain a discharging current of the battery through the current sampling end; and send a first control signal when the quantity of charging/discharging cycles of the battery is greater than a set quantity and the discharging current of the battery is greater than a set current threshold; and
 the under-voltage protection control circuit is configured to reduce an under-voltage protection threshold of the battery under the control of the first control signal.

In an implementation, the charging/discharging protection circuit further includes a discharging control end; and
 the charging/discharging protection circuit is further configured to: compare the output voltage of the battery and the under-voltage protection threshold of the battery and output a third control signal through the discharging control end according to a comparison result, where the third control signal is used for controlling a discharging loop of the battery to be switched on or switched off.

In an implementation, the under-voltage protection control circuit includes a battery voltage sampling circuit, a reference voltage circuit, and a comparator, where the battery sampling circuit is connected to each of the power supply end, the grounding end, the under-voltage protection threshold control end, and a first input end of the comparator, the reference voltage circuit is connected to a second input end of the comparator, and an output end of the comparator is connected to the discharging control end;
 the battery voltage sampling circuit is configured to sample the output voltage of the battery and increase a sampling voltage under the control of the first control signal;
 an output voltage of the reference voltage circuit is used for representing the under-voltage protection threshold of the battery; and
 the comparator is configured to compare the output voltage of the reference voltage circuit and the increased sampling voltage and output the third control signal according to a comparison result.

In an implementation, the battery voltage sampling circuit includes a first voltage divider resistor, a second voltage divider resistor, and a switch resistor array, the switch resistor array includes a plurality of branches connected to each other in parallel, and each branch includes a third voltage divider resistor and a switch connected to the third voltage divider resistor in series, where
 a first end of the first voltage divider resistor is connected to each of the power supply end and a first end of the switch resistor array, a second end of the first voltage divider resistor is connected to each of a first end of the second voltage divider resistor, a second end of the switch resistor array, and the first input end of the comparator, control ends of switches in the switch resistor array are connected to the under-voltage protection threshold control end, and a second end of the second voltage divider resistor is connected to the grounding end; and the first control signal is used for controlling at least one switch in the switch resistor array to switch from a switched-off state to a switched-on state.

In an implementation, the reference voltage circuit is a voltage source.

In an implementation, the under-voltage protection control circuit includes a battery voltage sampling circuit, a reference voltage circuit, and a comparator, where the battery sampling circuit is connected to each of the power supply end, the grounding end, and a first input end of the comparator, the reference voltage circuit is connected to each of a second input end of the comparator and the under-voltage protection threshold control end, and an output end of the comparator is connected to the discharging control end;

the battery voltage sampling circuit is configured to sample the voltage of the battery;

the reference voltage circuit is configured to reduce an output voltage of the reference voltage circuit under the control of the first control signal, where the output voltage of the reference voltage circuit is used for representing the under-voltage protection threshold of the battery; and the comparator is configured to compare the output voltage of the reference voltage circuit and an output voltage of the battery voltage sampling circuit and output the third control signal according to a comparison result.

In an implementation, the battery voltage sampling circuit includes a first sampling resistor and a second sampling resistor, where a first end of the first voltage divider resistor is connected to the power supply end, a second end of the first voltage divider resistor is connected to each of a first end of the second voltage divider resistor and the first input end of the comparator, and a second end of the second voltage divider resistor is connected to the grounding end.

In an implementation, the reference voltage circuit includes a plurality of branches connected to each other in parallel, and each branch includes a voltage source and a switch connected to the voltage source in series, where a first end of the reference voltage circuit is grounded, a second end of the reference voltage circuit is connected to the second input end of the comparator, and control ends of the switches in the reference voltage circuit are connected to the under-voltage protection threshold control end; and the first control signal is used for controlling a first switch in the reference voltage circuit to switch from a switched-on state to a switched-off state and controlling a second switch in the reference voltage circuit to switch from a switched-off state to a switched-on state, and a voltage of a voltage source connected to the first switch in series is greater than a voltage of a voltage source connected to the second switch in series.

Embodiment 10

A battery discharging control method includes:

detecting, by a terminal device, a discharging current of a battery in the terminal device, and collecting statistics on a quantity of charging/discharging cycles of the battery; and reducing, by the terminal device, an under-voltage protection threshold of the battery and a discharging cutoff voltage of the battery when the quantity of charging/discharging cycles of the battery is greater than a set quantity and the discharging current of the battery is greater than a set current threshold.

In an implementation, the method further includes:

when an output voltage of the battery is smaller than the discharging cutoff voltage of the battery, controlling, by the terminal device, the terminal device to be powered off, and increasing the under-voltage protection threshold of the battery and the discharging cutoff voltage of the battery.

In an implementation, the method further includes:

comparing, by the terminal device, the output voltage of the battery and the under-voltage protection threshold of the battery, and controlling, according to a comparison result, a discharging loop of the battery to be switched on or switched off.

It may be understood that, for descriptions of the foregoing embodiments 1 to 10, reference is made to descriptions for FIG. 1 to FIG. 12B, and details are not described again.

This application is described with reference to flowcharts and/or block diagrams of the method, the device (system), and the computer program product according to the embodiments of this application. It should be understood that computer program instructions can implement each procedure and/or block in the flowcharts and/or block diagrams and a combination of procedures and/or blocks in the flowcharts and/or block diagrams. These computer program instructions may be provided to a general-purpose computer, a special-purpose computer, an embedded processor, or a processor of another programmable data processing device to generate a machine, so that an apparatus configured to implement functions specified in one or more procedures in the flowcharts and/or one or more blocks in the block diagrams is generated by using instructions executed by the computer or the processor of another programmable data processing device.

These computer program instructions may be alternatively stored in a computer-readable memory that can instruct a computer or another programmable data processing device to work in a specific manner, so that the instructions stored in the computer-readable memory generate an artifact that includes an instruction apparatus. The instruction apparatus implements a specific function in one or more procedures in the flowcharts and/or in one or more blocks in the block diagrams.

These computer program instructions may further be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Obviously, a person skilled in the art can make various modifications and variations to the embodiments of this application without departing from the spirit and scope of the embodiments of this application. In this way, if these modifications and variations made to the embodiments of this application fall within the scope of the claims of this application and equivalent technologies thereof, this application also intends to include these changes and variations.

What is claimed is:

1. A charging/discharging protection circuit, comprising:
   a power supply end;
   a grounding end;
   an under-voltage protection threshold control end; and
   a discharging control end;
   wherein the power supply end is connected to a positive electrode of a battery, the grounding end is connected to a negative electrode of the battery, the under-voltage protection threshold control end is configured to receive a first control signal and a second control signal, and the discharging control end is configured to output a third control signal; and
   wherein the charging/discharging protection circuit is configured to:
      reduce an under-voltage protection threshold of the battery and a discharging cutoff voltage of the battery under the control of the first control signal based on a temperature of the battery being smaller than a set temperature threshold and a discharging current of the battery being greater than a set current threshold, wherein the discharging cutoff voltage of the battery is greater than the under-voltage protection threshold of the battery;
increase the under-voltage protection threshold of the battery and the discharging cutoff voltage of the battery under the control of the second control signal based on an output voltage of the battery being smaller than the discharging cutoff voltage of the battery; and
compare the output voltage of the battery and the under-voltage protection threshold of the battery, and output the third control signal according to a comparison result, wherein the third control signal is used for controlling a discharging loop of the battery to be switched on or switched off.

2. The charging/discharging protection circuit according to claim 1, further comprising:
a battery voltage sampling circuit, a reference voltage circuit, and a comparator;
wherein the battery voltage sampling circuit is connected to each of the power supply end, the grounding end, the under-voltage protection threshold control end, and a first input end of the comparator;
wherein the reference voltage circuit is connected to a second input end of the comparator, and an output end of the comparator is connected to the discharging control end;
wherein the battery voltage sampling circuit is configured to sample the output voltage of the battery and increase a sampling voltage under the control of the first control signal;
wherein an output voltage of the reference voltage circuit is used for representing the under-voltage protection threshold of the battery; and
wherein the comparator is configured to compare the output voltage of the reference voltage circuit and the increased sampling voltage and output the third control signal according to a comparison result.

3. The charging/discharging protection circuit according to claim 2,
wherein the battery voltage sampling circuit comprises a first voltage divider resistor, a second voltage divider resistor, and a switch resistor array, the switch resistor array comprises a plurality of branches connected to each other in parallel, and each branch of the plurality of branches comprises a third voltage divider resistor and a switch connected to the third voltage divider resistor in series;
wherein a first end of the first voltage divider resistor is connected to each of the power supply end and a first end of the switch resistor array, a second end of the first voltage divider resistor is connected to each of a first end of the second voltage divider resistor, a second end of the switch resistor array, and the first input end of the comparator, control ends of switches in the switch resistor array are connected to the under-voltage protection threshold control end, and a second end of the second voltage divider resistor is connected to the grounding end; and
wherein the first control signal is used for controlling at least one switch in the switch resistor array to switch from a switched-off state to a switched-on state.

4. The charging/discharging protection circuit according to claim 2, wherein the reference voltage circuit is a voltage source.

5. The charging/discharging protection circuit according to claim 1, further comprising:
a battery voltage sampling circuit, a reference voltage circuit, and a comparator;
wherein the battery voltage sampling circuit is connected to each of the power supply end, the grounding end, and a first input end of the comparator;
wherein the reference voltage circuit is connected to each of a second input end of the comparator and the under-voltage protection threshold control end;
wherein the battery voltage sampling circuit is configured to sample the output voltage of the battery;
wherein the reference voltage circuit is configured to reduce an output voltage of the reference voltage circuit under the control of the first control signal;
wherein an output voltage of the reference voltage circuit is used for representing the under-voltage protection threshold of the battery; and
wherein the comparator is configured to compare an output voltage of the battery voltage sampling circuit and the output voltage of the reference voltage circuit and output the third control signal according to a comparison result.

6. The charging/discharging protection circuit according to claim 5, wherein the battery voltage sampling circuit comprises a first sampling resistor and a second sampling resistor, wherein a first end of the first sampling resistor is connected to the power supply end, a second end of the first sampling resistor is connected to each of a first end of the second sampling resistor and the first input end of the comparator, and a second end of the second sampling resistor is connected to the grounding end.

7. The charging/discharging protection circuit according to claim 5,
wherein the reference voltage circuit comprises a plurality of branches connected to each other in parallel, and each branch of the plurality of branches comprises a voltage source and a switch connected to the voltage source in series;
wherein a first end of the reference voltage circuit is grounded, a second end of the reference voltage circuit is connected to the second input end of the comparator, and control ends of the switches in the reference voltage circuit are connected to the under-voltage protection threshold control end; and
wherein the first control signal is used for controlling a first switch in the reference voltage circuit to switch from a switched-on state to a switched-off state and controlling a second switch in the reference voltage circuit to switch from a switched-off state to a switched-on state, and a voltage of a voltage source connected to the first switch in series is greater than a voltage of a voltage source connected to the second switch in series.

8. A terminal device, comprising:
a processor; and
a charging/discharging protection circuit, wherein the charging/discharging protection circuit comprises a power supply end, a grounding end, and an under-voltage protection threshold control end, wherein the power supply end is connected to a positive electrode of a battery, the grounding end is connected to a negative electrode of the battery, and the under-voltage protection threshold control end is connected to the processor;
wherein the processor is configured to: based on a temperature of the battery being smaller than a set temperature threshold and a discharging current of the battery being greater than a set current threshold, send a first control signal;

wherein the charging/discharging protection circuit is configured to receive the first control signal through the under-voltage protection threshold control end and reduce an under-voltage protection threshold of the battery and a discharging cutoff voltage of the battery under the control of the first control signal, wherein the discharging cutoff voltage of the battery is greater than the under-voltage protection threshold of the battery;

wherein the processor is further configured to: based on an output voltage of the battery being smaller than the discharging cutoff voltage of the battery, control the terminal device to be powered off, and send a second control signal; and wherein the charging/discharging protection circuit is further configured to receive the second control signal through the under-voltage protection threshold control end and increase the under-voltage protection threshold of the battery and the discharging cutoff voltage of the battery under the control of the second control signal.

9. The terminal device according to claim 8, wherein the charging/discharging protection circuit further comprises a discharging control end; and the charging/discharging protection circuit is further configured to: compare the output voltage of the battery and the under-voltage protection threshold of the battery and output a third control signal through the discharging control end according to a comparison result, wherein the third control signal is used for controlling a discharging loop of the battery to be switched on or switched off.

10. The terminal device according to claim 9,
wherein the charging/discharging protection circuit comprises a battery voltage sampling circuit, a reference voltage circuit, and a comparator;

wherein the battery voltage sampling circuit is connected to each of the power supply end, the grounding end, the under-voltage protection threshold control end, and a first input end of the comparator;

wherein the reference voltage circuit is connected to a second input end of the comparator, and an output end of the comparator is connected to the discharging control end;

wherein the battery voltage sampling circuit is configured to sample the output voltage of the battery and increase a sampling voltage under the control of the first control signal;

wherein an output voltage of the reference voltage circuit is used for representing the under-voltage protection threshold of the battery; and wherein the comparator is configured to compare the output voltage of the reference voltage circuit and the increased sampling voltage and output the third control signal according to a comparison result.

11. The terminal device according to claim 10,
wherein the battery voltage sampling circuit comprises a first voltage divider resistor, a second voltage divider resistor, and a switch resistor array, the switch resistor array comprises a plurality of branches connected to each other in parallel, and each branch of the plurality of branches comprises a third voltage divider resistor and a switch connected to the third voltage divider resistor in series;

wherein a first end of the first voltage divider resistor is connected to each of the power supply end and a first end of the switch resistor array, a second end of the first voltage divider resistor is connected to each of a first end of the second voltage divider resistor, a second end of the switch resistor array, and the first input end of the comparator, control ends of switches in the switch resistor array are connected to the under-voltage protection threshold control end, and a second end of the second voltage divider resistor is connected to the grounding end; and wherein the first control signal is used for controlling at least one switch in the switch resistor array to switch from a switched-off state to a switched-on state.

12. The terminal device according to claim 10, wherein the reference voltage circuit is a voltage source.

13. The terminal device according to claim 9,
wherein the charging/discharging protection circuit comprises a battery voltage sampling circuit, a reference voltage circuit, and a comparator;

wherein the battery voltage sampling circuit is connected to each of the power supply end, the grounding end, and a first input end of the comparator;

wherein the reference voltage circuit is connected to each of a second input end of the comparator and the under-voltage protection threshold control end, and an output end of the comparator is connected to the discharging control end;

wherein the battery voltage sampling circuit is configured to sample the voltage of the battery;

wherein the reference voltage circuit is configured to reduce an output voltage of the reference voltage circuit under the control of the first control signal, wherein the output voltage of the reference voltage circuit is used for representing the under-voltage protection threshold of the battery; and wherein the comparator is configured to compare an output voltage of the battery voltage sampling circuit and the output voltage of the reference voltage circuit and output the third control signal according to a comparison result.

14. The terminal device according to claim 13, wherein the battery voltage sampling circuit comprises a first sampling resistor and a second sampling resistor, wherein a first end of the first sampling resistor is connected to the power supply end, a second end of the first sampling resistor is connected to each of a first end of the second sampling resistor and the first input end of the comparator, and a second end of the second sampling resistor is connected to the grounding end.

15. The terminal device according to claim 13,
wherein the reference voltage circuit comprises a plurality of branches connected to each other in parallel, and each branch of the plurality of branches comprises a voltage source and a switch connected to the voltage source in series;

wherein a first end of the reference voltage circuit is grounded, a second end of the reference voltage circuit is connected to the second input end of the comparator, and control ends of the switches in the reference voltage circuit are connected to the under-voltage protection threshold control end; and wherein the first control signal is used for controlling a first switch in the reference voltage circuit to switch from a switched-on state to a switched-off state and controlling a second switch in the reference voltage circuit to switch from a switched-off state to a switched-on state, and a voltage of a voltage source connected to the first switch in series is greater than a voltage of a voltage source connected to the second switch in series.

* * * * *